(12) United States Patent
Fujita et al.

(10) Patent No.: US 12,504,632 B2
(45) Date of Patent: Dec. 23, 2025

(54) OPTICAL DEVICE

(71) Applicant: SEMICONDUCTOR ENERGY LABORATORY CO., LTD., Atsugi (JP)

(72) Inventors: Masashi Fujita, Tokyo (JP); Yoshiyuki Kurokawa, Kanagawa (JP); Hiromichi Godo, Kanagawa (JP); Seiko Inoue, Kanagawa (JP); Kazuma Furutani, Kanagawa (JP); Kouhei Toyotaka, Kanagawa (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 0 days.

(21) Appl. No.: 18/698,873

(22) PCT Filed: Oct. 6, 2022

(86) PCT No.: PCT/IB2022/059526
§ 371 (c)(1),
(2) Date: Apr. 5, 2024

(87) PCT Pub. No.: WO2023/067424
PCT Pub. Date: Apr. 27, 2023

(65) Prior Publication Data
US 2024/0411134 A1 Dec. 12, 2024

(30) Foreign Application Priority Data
Oct. 19, 2021 (JP) .................................. 2021-170920

(51) Int. Cl.
*G02B 27/01* (2006.01)
*G02B 27/00* (2006.01)
(Continued)

(52) U.S. Cl.
CPC ..... *G02B 27/0172* (2013.01); *G02B 27/0093* (2013.01); *H04N 13/344* (2018.05); *H04N 13/383* (2018.05)

(58) Field of Classification Search
CPC ................ G02B 27/0093; G02B 27/01; G02B 27/0172; G02B 27/02; H04N 13/327; H04N 13/344; H04N 13/383; H04N 5/64
See application file for complete search history.

(56) References Cited

U.S. PATENT DOCUMENTS 9,791,924 B2 * 10/2017 Shiu ................... G02B 27/0172
10,460,165 B2 10/2019 Wilson et al.
(Continued)

FOREIGN PATENT DOCUMENTS

CN 106796354 A 5/2017
CN 115298597 A 11/2022
(Continued)

OTHER PUBLICATIONS

International Search Report (Application No. PCT/IB2022/059526), dated Dec. 13, 2022.
(Continued)

*Primary Examiner* — Nelson M Rosario
(74) *Attorney, Agent, or Firm* — Fish & Richardson P.C.

(57) ABSTRACT

An optical device of the present invention includes a display apparatus and an optical system. The display apparatus includes a display region and a sensor region. The optical system includes a first mirror and a second mirror. The first mirror includes a first surface and a second surface. The display region has a function of emitting first light. The first mirror is provided on an optical path of the first light and has a function of transmitting the first light incident on the first surface to the second surface and a function of reflecting second light incident on the second surface. The second
(Continued)

mirror is provided on an optical path of the second light and has a function of reflecting the second light. The sensor region has a function of detecting the second light via the first mirror and the second mirror.

9 Claims, 27 Drawing Sheets

(51) Int. Cl.
*H04N 13/344* (2018.01)
*H04N 13/383* (2018.01)

(56) References Cited

U.S. PATENT DOCUMENTS

| | | | |
|---|---|---|---|
| 11,022,809 B1* | 6/2021 | Richards | G02B 27/0093 |
| 2017/0262703 A1 | 9/2017 | Wilson et al. | |
| 2019/0050051 A1* | 2/2019 | Cirucci | G02B 27/0172 |
| 2021/0294106 A1 | 9/2021 | Meitav et al. | |

FOREIGN PATENT DOCUMENTS

| | | |
|---|---|---|
| JP | 2010-102215 A | 5/2010 |
| KR | 2017-0039621 A | 4/2017 |
| WO | WO-2016/157485 | 10/2016 |
| WO | WO-2019/158709 | 8/2019 |
| WO | WO-2021/188926 | 9/2021 |

OTHER PUBLICATIONS

Written Opinion (Application No. PCT/IB2022/059526), dated Dec. 13, 2022.

\* cited by examiner

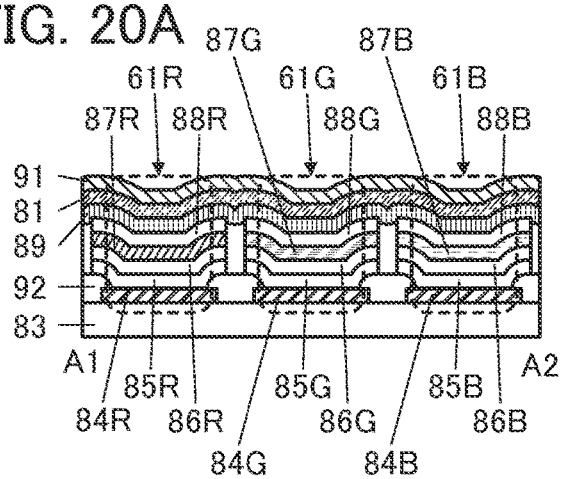
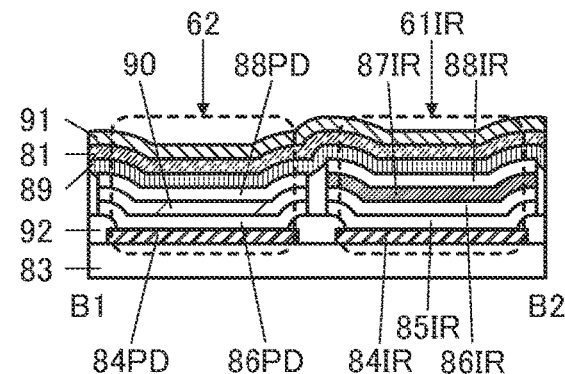
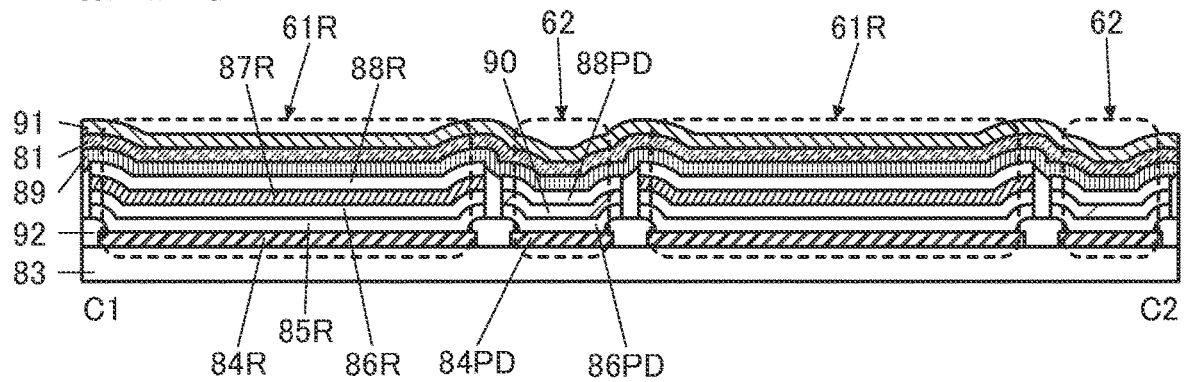
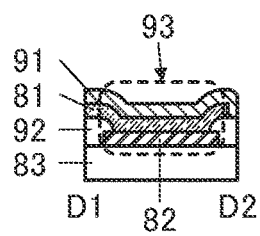
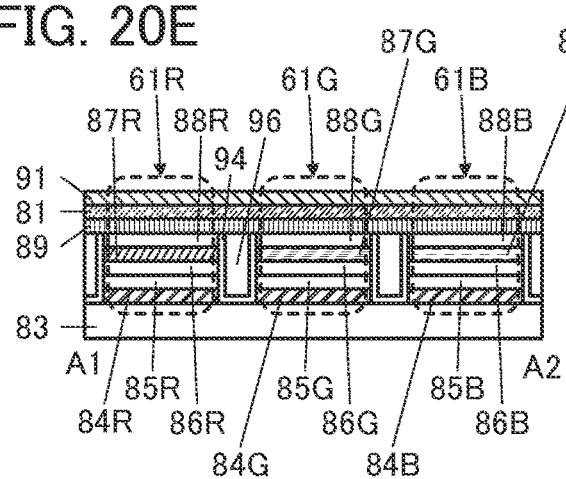

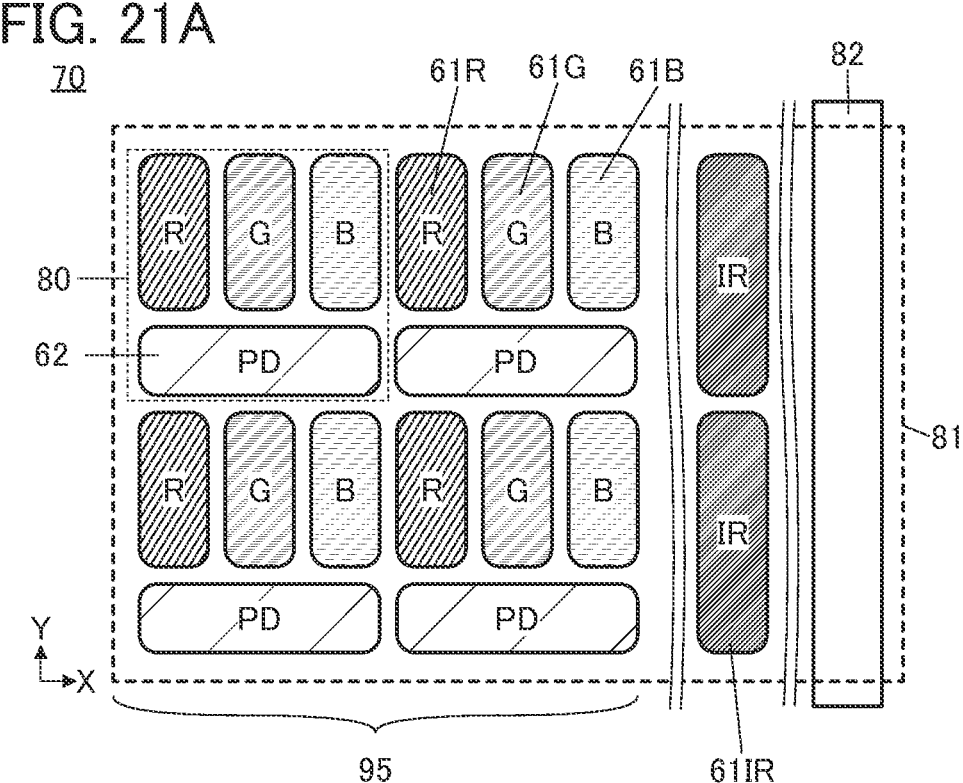
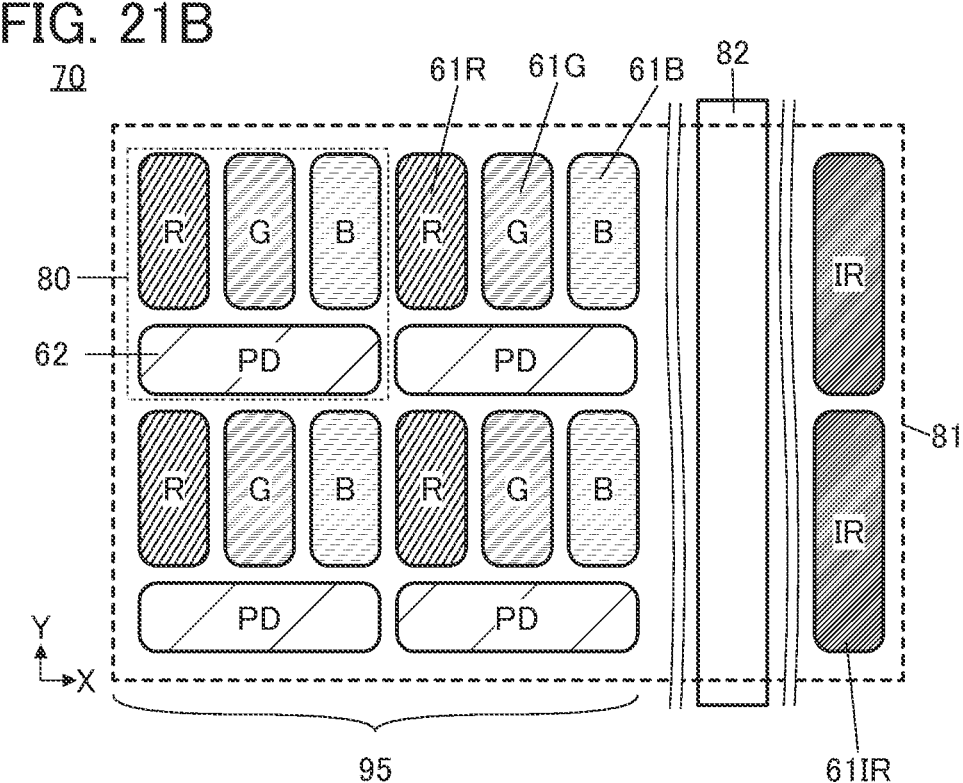

OPTICAL DEVICE

CROSS REFERENCE TO RELATED APPLICATIONS

This application is a U.S. National Phase Application under 35 U.S.C. § 371 of International Application PCT/IB2022/059526, filed on Oct. 6, 2022, which is incorporated by reference and claims the benefit of a foreign priority application filed in Japan on Oct. 19, 2021, as Application No. 2021-170920.

TECHNICAL FIELD

One embodiment of the present invention relates to an optical device.

Note that one embodiment of the present invention is not limited to the above technical field. The technical field of one embodiment of the invention disclosed in this specification and the like relates to an object, a method, a driving method, or a manufacturing method. Alternatively, one embodiment of the present invention relates to a process, a machine, manufacture, or a composition of matter. Thus, specific examples of the technical field of one embodiment of the present invention disclosed in this specification and the like include a semiconductor device, a display apparatus, a light-emitting apparatus, a power storage device, an optical device, an imaging device, a memory device, a signal processing device, an electronic device, a lighting device, an input device, an input/output device, a driving method thereof, and a manufacturing method thereof.

BACKGROUND ART

In recent years, electronic devices for virtual reality (sometimes referred to as VR) or augmented reality (sometimes referred to as AR) have been attracting attention. Furthermore, electronic devices with a gaze sensing (eye tracking) function for VR or AR have been developed. Such electronic devices with a gaze sensing function for VR or AR can be used for analysis of consumer behavior, image processing, avatar creation, and an operation using gaze, for example.

For example, Patent Document 1 discloses electronic devices with a gaze sensing function for VR or AR.

REFERENCE

Patent Document

[Patent Document 1] PCT International Publication No. 2019/158709

SUMMARY OF THE INVENTION

Problems to be Solved by the Invention

In an electronic device with a gaze sensing function for VR or AR, an imaging system (e.g., an image sensor or a control IC) as well as a display system (e.g., a display or a driver) need to be provided. The optical system needs to be appropriately adjusted in accordance with a positional relationship between eyes of the user of the electronic device and the display system and imaging system.

One object of one embodiment of the present invention is to provide a downsized optical device or electronic device. Another object of one embodiment of the present invention is to provide a downsized optical device or electronic device with a gaze sensing function. Another object of one embodiment of the present invention is to provide a novel optical device or electronic device. Another object of one embodiment of the present invention is to provide a novel optical device or electronic device with a gaze sensing function.

Note that the description of these objects does not preclude the existence of other objects. One embodiment of the present invention does not have to achieve all of these objects. Note that objects other than these can be derived from the description of this specification, the drawings, the claims, and the like.

Means for Solving the Problems (1)

One embodiment of the present invention is an optical device including a display apparatus and an optical system. The display apparatus includes a display region and a sensor region. The optical system includes a first mirror and a second mirror. The first mirror includes a first surface and a second surface. The display region has a function of emitting first light. The first mirror is provided on an optical path of the first light and has a function of transmitting the first light incident on the first surface to the second surface and a function of reflecting second light incident on the second surface. The second mirror is provided on an optical path of the second light and has a function of reflecting the second light. The sensor region has a function of detecting the second light via the first mirror and the second mirror.

(2)

In the above (1), one embodiment of the present invention may be the optical device in which the optical system includes a light source, the light source has a function of emitting third light, and the second light is light reflected by an object irradiated with the third light.

(3)

In the above (1), one embodiment of the present invention may be the optical device in which the display apparatus includes a light source, the light source has a function of emitting third light, and the second light is light reflected by an object irradiated with the third light.

(4)

In the above (2) or the above (3), it is preferable that the third light be infrared light.

(5)

In any one of the above (1) to the above (4), the sensor region may be provided to overlap with the display region.

(6)

In any one of the above (1) to the above (5), the optical system may include a first lens, and the first lens may be provided on the optical path of the first light and may have a function of controlling the optical path of the first light.

(7)

In any one of the above (1) to the above (6), the display apparatus may include a second lens, and the second lens may be provided between the second mirror and the sensor region and may have a function of controlling the optical path of the second light.

(8)

In any one of the above (1) to the above (6), the display apparatus may include a pinhole, and the pinhole may be provided between the second mirror and the sensor region and may have a function of controlling the optical path of the second light.

(9)

In any one of the above (1) to the above (8), the display apparatus may include a gaze sensing portion, and the gaze sensing portion may have a function of sensing a user's gaze with the use of imaging data obtained in the sensor region.

Effect of the Invention

According to one embodiment of the present invention, a downsized optical device or electronic can be provided. According to another embodiment of the present invention, a downsized optical device or electronic device with a gaze sensing function can be provided. According to another embodiment of the present invention, a novel optical device or electronic device can be provided. According to another embodiment of the present invention, a novel optical device or electronic device with a gaze sensing function can be provided.

Note that the description of these effects does not preclude the existence of other effects. One embodiment of the present invention does not need to have all of these effects. Note that effects other than these can be derived from the description of this specification, the drawings, the claims, and the like.

BRIEF DESCRIPTION OF THE DRAWINGS

FIG. 20A to FIG. 20E are diagrams each illustrating a structure example of a display apparatus.

FIG. 21A and FIG. 21B are diagrams each illustrating a structure example of a display apparatus.

MODE FOR CARRYING OUT THE INVENTION

Figure 1A:
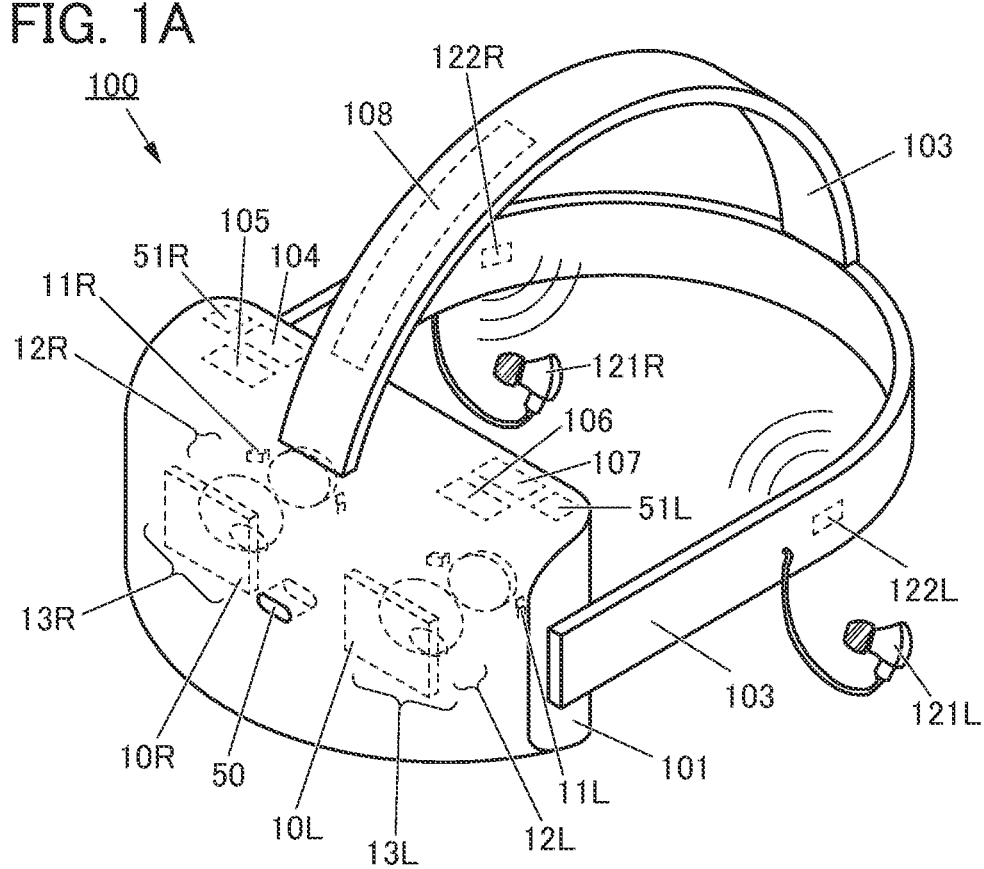
FIG. 1A and FIG. 1B are diagrams illustrating a structure example of an electronic device.

In this specification and the like, a semiconductor device refers to a device that utilizes semiconductor characteristics, and means a circuit including a semiconductor element (e.g., a transistor, a diode, or a photodiode) or a device including the circuit, for example. The semiconductor device also means all devices that can function by utilizing semiconductor characteristics. For example, an integrated circuit, a chip including an integrated circuit, and an electronic component including a chip in a package are examples of the semiconductor device. Moreover, for example, a memory device, a display apparatus, a light-emitting apparatus, a lighting device, an electronic device, and the like themselves may be semiconductor devices and may each include a semiconductor device.

In the case where there is description "X and Y are connected" in this specification and the like, the case where X and Y are electrically connected, the case where X and Y are functionally connected, and the case where X and Y are directly connected are regarded as being disclosed in this specification and the like. Accordingly, without being limited to a predetermined connection relationship, e.g., a connection relationship shown in drawings or texts, a connection relationship other than one shown in drawings or texts is regarded as being disclosed in the drawings or the texts. Each of X and Y denotes an object (e.g., a device, an element, a circuit, a wiring, an electrode, a terminal, a conductive film, or a layer).

For example, in the case where X and Y are electrically connected, one or more elements that allow electrical connection between X and Y (e.g., a switch, a transistor, a capacitor, an inductor, a resistor, a diode, a display device, a light-emitting device, or a load) can be connected between X and Y.

For example, in the case where X and Y are functionally connected, one or more circuits that allow functional connection between X and Y (e.g., a logic circuit (e.g., an inverter, a NAND circuit, or a NOR circuit); a signal converter circuit (e.g., a digital-analog converter circuit, an analog-digital converter circuit, or a gamma correction circuit); a potential level converter circuit (e.g., a power supply circuit (e.g., a step-up circuit and a step-down circuit) or a level shifter circuit for changing the potential level of a signal); a voltage source; a current source; a switch circuit; an amplifier circuit (e.g., a circuit that can increase signal amplitude, the current amount, or the like, an operational amplifier, a differential amplifier circuit, a source follower circuit, or a buffer circuit); a signal generation circuit; a memory circuit; or a control circuit) can be connected between X and Y. For example, even if another circuit is interposed between X and Y, X and Y are regarded as being functionally connected when a signal output from X is transmitted to Y.

Note that an explicit description that X and Y are electrically connected includes the case where X and Y are electrically connected (i.e., the case where X and Y are connected with another element or another circuit interposed therebetween) and the case where X and Y are directly connected (i.e., the case where X and Y are connected without another element or another circuit interposed therebetween).

It can be expressed as, for example, "X, Y, a source (or a first terminal or the like) of a transistor, and a drain (or a second terminal or the like) of the transistor are electrically connected to each other, and X, the source (or the first terminal or the like) of the transistor, the drain (or the second terminal or the like) of the transistor, and Y are electrically connected to each other in this order". Alternatively, it can be expressed as "a source (or a first terminal or the like) of a transistor is electrically connected to X, a drain (or a second terminal or the like) of the transistor is electrically connected to Y, and X, the source (or the first terminal or the like) of the transistor, the drain (or the second terminal or the like) of the transistor, and Y are electrically connected to each other in this order". Alternatively, it can be expressed as "X is electrically connected to Y through a source (or a first terminal or the like) and a drain (or a second terminal or the like) of a transistor, and X, the source (or the first terminal or the like) of the transistor, the drain (or the second terminal or the like) of the transistor, and Y are provided in this connection order". When the connection order in a circuit structure is defined by an expression similar to the above examples, a source (or a first terminal or the like) and a drain (or a second terminal or the like) of a transistor can be distinguished from each other to specify the technical scope. Note that these expressions are examples and the expression is not limited to these expressions. Here, X and Y each denote an object (e.g., a device, an element, a circuit, a wiring, an electrode, a terminal, a conductive film, or a layer).

Even when independent components are electrically connected to each other in a circuit diagram, one component has functions of a plurality of components in some cases. For example, when part of a wiring also functions as an electrode, one conductive film has functions of both components: the wiring and the electrode. Thus, electrical connection in this specification and the like includes, in its category, such a case where one conductive film has functions of a plurality of components.

In this specification and the like, as a "resistor", a circuit element, a wiring, or the like having a resistance value higher than $0\Omega$ can be used, for example. Accordingly, in this specification and the like, examples of the "resistor" include a wiring having a resistance value, a transistor in which current flows between its source and drain, a diode, and a coil. Thus, the term "resistor" can be replaced with the terms "resistance", "load", "region having a resistance value", and the like; conversely, the terms "resistance", "load", and "region having a resistance value" can be replaced with the term "resistor", and the like. The resistance value can be, for example, preferably higher than or equal to 1 m$\Omega$ and lower than or equal to 10$\Omega$, further preferably higher than or equal to 5 m$\Omega$ and lower than or equal to 5$\Omega$, still further preferably higher than or equal to 10 m$\Omega$ and lower than or equal to 1$\Omega$. As another example, the resistance value may be higher than or equal to 1$\Omega$ and lower than or equal to $1\times10^9\Omega$.

In the case where a wiring is used as a resistor, the resistance value of the resistor is sometimes determined depending on the length of the wiring. Alternatively, a conductor with resistivity different from that of a conductor used as a wiring is sometimes used as a resistor. Alternatively, in the case where a semiconductor is used as a resistor, the resistance value of the resistor is sometimes determined by doping a semiconductor with an impurity.

In this specification and the like, a "capacitor" can be, for example, a circuit element having an electrostatic capacitance value higher than 0 F, a region of a wiring having an electrostatic capacitance value higher than 0 F, parasitic capacitance, or gate capacitance of a transistor. Thus, in this specification and the like, a "capacitor" is not limited to only a circuit element that has a pair of electrodes and a dielectric between the electrodes. A "capacitor" includes, for example, parasitic capacitance generated between wirings, gate capacitance generated between a gate and one of a source and a drain of a transistor, and the like. The term "capacitor", "parasitic capacitance", "gate capacitance", or the like can be replaced with the term "capacitance" and the like, for example. Conversely, the term "capacitance" can be replaced with the term "capacitor", "parasitic capacitance", "gate capacitance", or the like, for example. The term "a pair of electrodes" of a "capacitor" can be replaced with "a pair of conductors", "a pair of conductive regions", "a pair of regions", or the like, for example. Note that the electrostatic capacitance value can be higher than or equal to 0.05 fF and lower than or equal to 10 pF, for example. As another example, the electrostatic capacitance value may be higher than or equal to 1 pF and lower than or equal to 10 mF.

In this specification and the like, a transistor includes three terminals called a gate, a source, and a drain. The gate is a control terminal for controlling the amount of current flowing between the source and the drain. Two terminals functioning as the source and the drain are input/output terminals of the transistor. One of the two input/output terminals serves as the source and the other serves as the drain depending on the conductivity type (n-channel type or p-channel type) of the transistor and the levels of potentials supplied to the three terminals of the transistor. Thus, the terms "source" and "drain" can be replaced with each other in this specification and the like. Furthermore, in this specification and the like, expressions "one of a source and a drain" (or a first electrode or a first terminal) and "the other of the source and the drain" (or a second electrode or a second terminal) are used in the description of the connection relationship of a transistor. Depending on the structure, a transistor may include a back gate in addition to the above three terminals. In that case, in this specification and the like, one of the gate and the back gate of the transistor may be referred to as a first gate and the other of the gate and the back gate of the transistor may be referred to as a second gate. Moreover, the terms "gate" and "back gate" can be replaced with each other in one transistor in some cases. In the case where a transistor includes three or more gates, the gates may be referred to as a first gate, a second gate, and a third gate, for example, in this specification and the like.

In this specification and the like, a "node" can be referred to as a "terminal", a "wiring", an "electrode", a "conductive layer", a "conductor", an "impurity region", or the like depending on the circuit structure, the device structure, or the like, for example. Furthermore, a "terminal", a "wiring", or the like can be referred to as a "node", for example.

In this specification and the like, "voltage" and "potential" can be replaced with each other as appropriate. "Voltage" refers to a potential difference from a reference potential, and when the reference potential is a ground potential, for example, "voltage" can be replaced with "potential". Note that the ground potential does not necessarily mean 0 V. Moreover, potentials are relative values, and a potential supplied to a wiring, a potential applied to a circuit and the like, and a potential output from a circuit and the like, for example, are changed with a change of the reference potential, for example.

In this specification and the like, the terms "high-level potential" (also referred to as "H potential" or "H") and "low-level potential" (also referred to as "L potential" or "L") do not mean a particular potential. For example, in the case where two wirings are both described as "functioning as a wiring for supplying a high-level potential", the levels of the high-level potentials supplied from the wirings are not necessarily equal to each other. Similarly, in the case where two wirings are both described as "functioning as a wiring for supplying a low-level potential", the levels of the low-level potentials supplied from the wirings are not necessarily equal to each other.

In this specification and the like, "current" means a charge transfer (electrical conduction). For example, the description "electrical conduction of positively charged particles occurs" can be rephrased as "electrical conduction of negatively charged particles occurs in the opposite direction". Thus, unless otherwise specified, "current" in this specification and the like refers to a charge transfer (electrical conduction) accompanied by carrier movement. Examples of a carrier here include an electron, a hole, an anion, a cation, and a complex ion. The type of carrier differs between current flow systems (e.g., a semiconductor, a metal, an electrolyte solution, and a vacuum). The "direction of current" in a wiring or the like refers to the direction in which a positive carrier moves, and the amount of current is expressed as a positive value. In other words, the direction in which a negative carrier moves is opposite to the direction of current, and the amount of current is expressed as a negative value. Thus, in the case where the polarity of current (or the direction of current) is not specified in this specification and the like, the description "current flows from element A to element B" can be rephrased as "current flows from element B to element A", for example. The description "current is input to element A" can be rephrased as "current is output from element A", for example.

Ordinal numbers such as "first", "second", and "third" in this specification and the like are used to avoid confusion among components. Thus, the ordinal numbers do not limit the number of components. In addition, the ordinal numbers do not limit the order of components. For example, a "first" component in one embodiment in this specification and the like can be referred to as a "second" component in other embodiments, the scope of claims, or the like. Furthermore, for example, a "first" component in one embodiment in this specification and the like can be omitted in other embodiments, the scope of claims, or the like.

In this specification and the like, for example, terms for describing arrangement, such as "over", "under", "above", and "below" are sometimes used for convenience to describe the positional relationship between components with reference to drawings. The positional relationship between components is changed as appropriate in accordance with a direction in which each component is described. Thus, the terms for describing arrangement in this specification and the like are not limited to those and can be replaced with another term as appropriate depending on the situation. For example, the expression "an insulator positioned over (on) a top surface of a conductor" can be replaced with the expression "an insulator positioned under (on) a bottom surface of a conductor" when the direction of a drawing illustrating these components is rotated by 180°. Moreover, the expression "an insulator positioned over (on) a top surface of a conductor" can be replaced with the expression "an insulator positioned on a left surface (or a right surface) of a conductor" when the direction of a drawing showing these components is rotated by 90°.

The term "over" or "under" does not necessarily mean that a component is placed directly over or directly under and directly in contact with another component. For example, the expression "electrode B over insulating layer A" does not necessarily mean that the electrode B is formed over and in direct contact with the insulating layer A, and does not exclude the case where another component is provided between the insulating layer A and the electrode B.

Furthermore, the term "overlap", for example, in this specification and the like does not limit a state such as the stacking order of components. For example, the expression "electrode B overlapping with insulating layer A" does not necessarily mean the state where the electrode B is formed over the insulating layer A. The expression "electrode B overlapping with insulating layer A", for example, does not exclude the state where the electrode B is formed under the insulating layer A and the state where the electrode B is formed on the right side (or the left side) of the insulating layer A.

The term "adjacent" or "proximity" in this specification and the like does not necessarily mean that a component is directly in contact with another component. For example, the expression "electrode B adjacent to insulating layer A" does not necessarily mean that the electrode B is formed in direct contact with the insulating layer A and does not exclude the case where another component is provided between the insulating layer A and the electrode B.

In this specification and the like, the term "film", "layer", or the like can be, for example, interchanged with each other depending on the situation, in some cases. For example, the term "conductive layer" can be changed into the term "conductive film" in some cases. For another example, the term "insulating film" can be changed into the term "insulating layer" in some cases. In addition, for example, the term "film", "layer", or the like is not used and can be interchanged with another term depending on the situation, in some cases. For example, the term "conductive layer" or "conductive film" can be changed into the term "conductor" in some cases. Furthermore, the term "conductor" can be changed into the term "conductive layer" or "conductive film" in some cases. For example, the term "insulating layer" or "insulating film" can be changed into the term "insulator" in some cases. Furthermore, the term "insulator" can be changed into the term "insulating layer" or "insulating film" in some cases.

In addition, in this specification and the like, for example, the term such as "electrode", "wiring", or "terminal" does not limit the function of a component. For example, an "electrode" is used as part of a wiring in some cases, and vice versa. Furthermore, the term "electrode" or "wiring" also includes, for example, the case where a plurality of "electrodes" or "wirings" are formed in an integrated manner. For example, a "terminal" is used as part of a "wiring", an "electrode", or the like in some cases, and vice versa. Furthermore, the term "terminal" also includes the case where a plurality of "electrodes", "wirings", "terminals", or the like are formed in an integrated manner, for example. Thus, for example, an "electrode" can be part of a "wiring" or a "terminal". Furthermore, a "terminal" can be part of a "wiring" or an "electrode". Moreover, the term "electrode", "wiring", "terminal", or the like is sometimes replaced with the term "region", for example.

In addition, in this specification and the like, for example, the terms such as "wiring", "signal line", and "power supply line" can be interchanged with each other depending on the situation, in some cases. For example, the term "wiring" can be changed into the term "signal line" in some cases. For another example, the term "wiring" can be changed into the term "power supply line" or the like in some cases. Conversely, for example, the term "signal line", "power supply line", or the like can be changed into the term "wiring" in some cases. Furthermore, for example, the term "power supply line" or the like can be changed into the term "signal line" or the like in some cases. Conversely, for example, the term "signal line" or the like can be changed into the term "power supply line" or the like in some cases. Moreover, the term "potential" that is applied to a wiring can be changed into the term "signal" or the like depending on the situation, for example. Conversely, for example, the term "signal" or the like can be changed into the term "potential" in some cases.

In this specification and the like, a "switch" includes a plurality of terminals and has a function of switching (selecting) electrical continuity and discontinuity between the terminals. For example, in the case where a switch includes two terminals and electrical continuity is established between the two terminals, the switch is in a "conduction state" or an "on state". In the case where electrical continuity is not established between the two terminals, the switch is in a "non-conduction state" or an "off state". Note that switching to one of a conduction state and a non-conduction state or maintaining one of a conduction state and a non-conduction state is sometimes referred to as "controlling a conduction state".

That is, a switch has a function of controlling whether current flows therethrough or not. Alternatively, a switch has a function of selecting and changing a current path. For example, an electrical switch or a mechanical switch can be used as the switch. That is, a switch can be any element capable of controlling current, and is not limited to a particular element.

Note that as a kind of a switch, there is a switch which is normally in a non-conduction state and brought into a conduction state by controlling a conduction state; such a switch is referred to as an "A contact" in some cases. Furthermore, as another kind of a switch, there is a switch which is normally in a conduction state and brought into a non-conduction state by controlling a conduction state; such a switch is referred to as a "B contact" in some cases.

Examples of a switch include a transistor (e.g., a bipolar transistor or a MOS transistor), a diode (e.g., a PN diode, a PIN diode, a Schottky diode, a MIM (Metal Insulator Metal) diode, a MIS (Metal Insulator Semiconductor) diode, or a diode-connected transistor), and a logic circuit in which such elements are combined. Note that in the case where a transistor is used as a switch, a "conduction state" or "on state" of the transistor refers to a state where a source electrode and a drain electrode of the transistor can be regarded as being electrically short-circuited. Furthermore, a "non-conduction state" or "off state" of the transistor refers to a state where the source electrode and the drain electrode of the transistor can be regarded as being electrically disconnected. Note that in the case where a transistor operates just as a switch, there is no particular limitation on the polarity (conductivity type) of the transistor.

An example of a mechanical switch is a switch formed using a MEMS (micro electro mechanical systems) technology. Such a switch includes an electrode that can be moved mechanically, and selects a conduction or non-conduction state with the movement of the electrode.

In this specification and the like, "parallel" indicates a state where two straight lines are placed at an angle greater than or equal to −10° and less than or equal to 10°. Thus, the case where the angle is greater than or equal to −5° and less than or equal to 5° is also included. In addition, "approximately parallel" or "substantially parallel" indicates a state where two straight lines are placed at an angle greater than or equal to −30° and less than or equal to 30°. Moreover, "perpendicular" indicates a state where two straight lines are placed at an angle greater than or equal to 800 and less than or equal to 100°. Thus, the case where the angle is greater than or equal to 850 and less than or equal to 950 is also included. Furthermore, "approximately perpendicular" or "substantially perpendicular" indicates a state where two straight lines are placed at an angle greater than or equal to 600 and less than or equal to 120°.

Note that in this specification and the like, the terms "identical", "the same", "equal", "uniform", and the like (including synonyms thereof) used in describing calculation values and measurement values or in describing objects, methods, events, and the like that can be converted into calculation values or measurement values allow for a margin of error of ±20% unless otherwise specified.

In this specification and the like, an impurity in a semiconductor refers to, for example, an element other than a main component of a semiconductor layer. For example, an element with a concentration of lower than 0.1 atomic % is an impurity. When an impurity is contained in a semiconductor, for example, the density of defect states in a semiconductor is increased, carrier mobility is decreased, or crystallinity is decreased in some cases. In the case where the semiconductor is an oxide semiconductor, examples of an impurity that changes the characteristics of the semiconductor include Group 1 elements, Group 2 elements, Group 13 elements, Group 14 elements, Group 15 elements, and transition metals other than the main components of the oxide semiconductor. Specific examples include hydrogen (included in water), lithium, sodium, silicon, boron, phosphorus, carbon, and nitrogen. Moreover, in the case where the semiconductor is a silicon layer, examples of an impurity which changes characteristics of the semiconductor include oxygen, Group 1 elements except hydrogen, Group 2 elements, Group 13 elements, and Group 15 elements.

In this specification and the like, a metal oxide is an oxide of metal in a broad sense. Metal oxides are classified into an oxide insulator, an oxide conductor (including a transparent oxide conductor), an oxide semiconductor (also simply referred to as an OS), and the like, for example. For example, in the case where a metal oxide is used in a semiconductor layer of a transistor, the metal oxide is referred to as an oxide semiconductor in some cases. That is, when a metal oxide is used as a material that can be used for a channel formation region of a transistor that has at least one of an amplifying function, a rectifying function, and a switching function, the metal oxide can be referred to as a metal oxide semiconductor. In addition, the description "OS transistor" can also be rephrased as "a transistor including a metal oxide or an oxide semiconductor".

In this specification and the like, a metal oxide containing nitrogen is also collectively referred to as a metal oxide in some cases. A metal oxide containing nitrogen may be called a metal oxynitride.

In this specification and the like, one embodiment of the present invention can be constituted by appropriately combining a structure described in an embodiment with any of the structures described in the other embodiments. In addition, in the case where a plurality of structure examples are described in one embodiment, the structure examples can be combined with each other as appropriate.

Embodiments described in this specification are described with reference to the drawings. Note that the embodiments can be implemented in many different modes. Accordingly, it will be readily understood by those skilled in the art that the modes and details can be changed in various ways without departing from the spirit and scope thereof. Thus, the present invention should not be interpreted as being limited to the description in the embodiments. As for the drawings illustrating the embodiments, in the structures of the invention, the same reference numerals are used in common for the same portions or portions having similar functions in different drawings, and repeated description thereof is omitted in some cases. Furthermore, the same hatch pattern is used for the portions having similar functions throughout the drawings, and the portions are not especially denoted by reference numerals in some cases. Moreover, some components are omitted in a perspective view, a top view, and the like for easy understanding of the drawings in some cases. In the drawings, for example, a hatching pattern or the like may be omitted.

In addition, in the drawings and the like in this specification, the size, the layer thickness, or the region is exaggerated for clarity in some cases. Thus, the drawings are not necessarily limited to the drawings with the illustrated size, aspect ratio, and the like, for example. Note that the drawings schematically illustrate ideal examples, and embodiments of the present invention are not limited to shapes, values, and the like illustrated in the drawings, for example. For example, variation in signal, voltage, or current due to noise or variation in signal, voltage, or current due to difference in timing can be included.

In the drawings and the like in this specification, arrows indicating the X direction, the Y direction, and the Z direction are illustrated in some cases. In this specification and the like, the "X direction" is a direction along the X-axis, and the forward direction and the reverse direction are not distinguished in some cases, unless otherwise specified. The same applies to the "Y direction" and the "Z direction". The X direction, the Y direction, and the Z direction are directions intersecting with each other. More specifically, the X direction, the Y direction, and the Z direction are directions orthogonal to each other. In this specification and the like, one of the X direction, the Y direction, and the Z direction is referred to as a "first direction" in some cases. Another one of the directions is referred to as a "second direction" in some cases. The remaining one of the directions is referred to as a "third direction" in some cases.

In this specification and the like, when a plurality of components are denoted by the same reference numerals, and in particular need to be distinguished from each other, an identification sign such as "A", "b", "_1", "[n]", or "[m, n]" is sometimes added to the reference numerals, for example. For example, a plurality of light-emitting elements 61 are sometimes shown individually as a light-emitting element 61R, a light-emitting element 61G, and a light-emitting element 61B. In other words, in the cases where matters that apply to the light-emitting element 61R, the light-emitting element 61G, and the light-emitting element 61B are described and they do not need to be differentiated from each other, the light-emitting elements may be simply referred to as the light-emitting element 61.

Embodiment 1

An electronic device 100 of one embodiment of the present invention is described.

<Structure Example of Electronic Device>

FIG. 1A is a perspective external view illustrating a structure example of the electronic device 100. The electronic device 100 may be used for a goggles-type electronic device for virtual reality (VR), for example. The electronic device 100 includes a housing 101. The electronic device 100 is provided with a wearing portion 103 having a belt shape. The length of the wearing portion 103 can be adjusted as appropriate. The user of the electronic device 100 can wear the wearing portion 103 around his/her head and on top of the head and can peep into an inner portion of the housing 101.

The electronic device 100 also includes an optical device 13 (an optical device 13R and an optical device 13L) inside the housing 101. The optical device 13 includes a display apparatus 10 (a display apparatus 10R and a display apparatus 10L), a light source 11 (a light source 11R and a light source 11L), and an optical system 12 (an optical system 12R and an optical system 12L). A detailed description of a structure example of the optical device 13, the display apparatus 10, the light source 11, and the optical system 12 is made later.

Furthermore, the electronic device 100 is provided with a sensor portion 50, a sensor portion 51 (a sensor portion 51R and a sensor portion 51L), a power supply portion (a battery 104 and a voltage generation portion 105), a control portion 106, a communication portion 107, and an antenna 108. For example, in the electronic device 100, the sensor portion 50, the sensor portion 51, the battery 104, the voltage generation portion 105, the control portion 106, and the communication portion 107 are provided in the housing 101, and the antenna 108 is provided in the wearing portion 103.

The electronic device 100 also includes an earphone 121 (an earphone 121R and an earphone 121L). Instead of the earphone 121, a bone conduction acoustic device 122 (an acoustic device 122R and an acoustic device 122L) may be provided. Either one or both of the earphone 121 and the bone conduction acoustic device 122 may be provided. For example, the electronic device 100 includes the bone-conduction acoustic device 122 in the wearing portion 103. With the bone conduction acoustic device 122, the user can catch an acoustic signal transmitted from the electronic device 100 and an ambient sound at the same time.

[Sensor Portion]

The sensor portion 50 and the sensor portion 51 each have a function of obtaining information on one or more of the senses of sight, hearing, touch, taste, and smell of the user, for example. More specifically, the sensor portion 50 and the sensor portion 51 each have a function of sensing or measuring any one or more of force, displacement, position, speed, acceleration, angular velocity, rotational frequency, distance, light, magnetism, temperature, sound, time, an electric field, current, voltage, electric power, radiation, humidity, a gradient, oscillation, odor, and infrared rays. The electronic device 100 may be provided with one or more sensor portions 50. The electronic device 100 may be provided with one or more sensor portions 51.

An image sensor may be used as the sensor portion 50, for example. When an image sensor is used as the sensor portion 50, the surroundings can be captured, for example. As the sensor portion 50, for example, a sensor capable of measuring any one or more of an ambient temperature, humidity, illumination, odor, and the like may be used.

As the sensor portion 51, a biosensor may be used, for example. When a biosensor is used as the sensor portion 51, body temperature, pulse, oxygen saturation in blood, and the like of the user can be measured, so that the user's fatigue level, health condition, and the like can be sensed.

At least one of the sensor portion 50 and the sensor portion 51 preferably has a function of measuring brain waves in addition to the above functions. For example, the sensor portion 50 and/or the sensor portion 51, which has a plurality of electrodes in contact with the user's head, can have a mechanism of measuring brain waves from a weak current flowing through the electrodes. When the sensor portion 50 or the sensor portion 51 has/have a function of measuring brain waves, an operation of displaying an image or part of an image at a place the user expects the image or the part of the image to be displayed on the display region can be achieved. Since the user does not need to use both hands to operate the electronic device 100, an input operation or the like can be performed with holding nothing in both hands.

[Power Supply Portion]

The battery 104 has a function of storing electric power needed for the operation of the electronic device 100 and a function of supplying electric power needed for the operation. The voltage generation portion 105 has a function of generating a voltage needed for the operation of the electronic device 100 and a function of keeping the voltage constant. A primary battery or a secondary battery can be used as the battery 104. Note that a lithium-ion secondary battery can be used as the secondary battery, for example. The battery 104 and the voltage generation portion 105 can be collectively referred to as the power supply portion.

Although FIG. 1A illustrates the structure including the battery 104, one embodiment of the present invention is not limited thereto. The electronic device 100 may have a structure without the battery 104, in which electric power is directly supplied from an external power supply. Alternatively, the electronic device 100 may be provided with the battery 104 and have a function of being supplied with electric power from the outside.

[Control Portion]

The control portion 106 has a function of controlling the operation of the electronic device 100. The control portion 106 can be provided with a CPU, a memory, or the like. The memory has a function of retaining a variety of programs used in the electronic device 100, data needed for the operation of the electronic device 100, and the like.

The control portion 106 has a function of supplying an image signal to a display apparatus. Furthermore, the control portion 106 can perform processing to increase the definition of an image signal (upconversion) or processing to decrease the definition of an image signal (downconversion). Thus, low-definition image data can be upconverted in accordance with the definition of the display region (also referred to as "display portion"). High-definition image data can be downconverted. Thus, an image with high display quality can be displayed on the display apparatus.

The control portion 106 may be provided with a GPU or the like as necessary. The control portion 106 can function as an application processor having functions needed for the operation of the electronic device 100.

[Communication Portion]

The communication portion 107 has a function of communicating with other terminals or the like by wire or wirelessly. In particular, the communication portion 107 preferably has a wireless communication function, in which case the number of parts such as a connection cable can be decreased.

In the case where the communication portion 107 has a wireless communication function, the communication portion 107 can perform communication via the antenna 108. It is possible to use, as a communication protocol or a communication technology, a communications standard such as LTE (Long Term Evolution), or a communications standard developed by IEEE, such as Wi-Fi (registered trademark), Bluetooth (registered trademark), ZigBee (registered trademark), or the like. The third-generation mobile communication system (3G), the fourth-generation mobile communication system (4G), or the fifth-generation mobile communication system (5G) defined by the International Telecommunication Union (ITU) or the like can be used.

The communication portion 107 can perform input/output of information by connecting the electronic device 100 to another device via a computer network such as the Internet, which is an infrastructure of the World Wide Web (WWW), an intranet, an extranet, a PAN (Personal Area Network), a LAN (Local Area Network), a CAN (Campus Area Network), a MAN (Metropolitan Area Network), a WAN (Wide Area Network), a GAN (Global Area Network), or the like.

Although FIG. 1A illustrates an example in which the electronic device 100 includes one antenna 108, one embodiment of the present invention is not limited thereto, and a plurality of antennas may be provided. When the plurality of antennas are provided, the stability of wireless communication can be enhanced.

The communication portion 107 may be electrically connected to an external port (not illustrated) provided in the electronic device 100. The external port can be connected to an external device such as a computer and a printer through a cable, for example. A USB terminal or the like is a typical example. As the external port, a LAN (Local Area Network) connection terminal, a digital broadcast-receiving terminal, an AC adaptor connection terminal, or the like may be provided. Without limitation to wired communication, a transceiver for optical communication using infrared rays, visible light, ultraviolet rays, or the like may be provided. The communication portion 107 may be electrically connected to one or more buttons or switches (also referred to as "housing switches" and not illustrated) provided in the electronic device 100, for example.

[Optical Device]

Figure 1B:
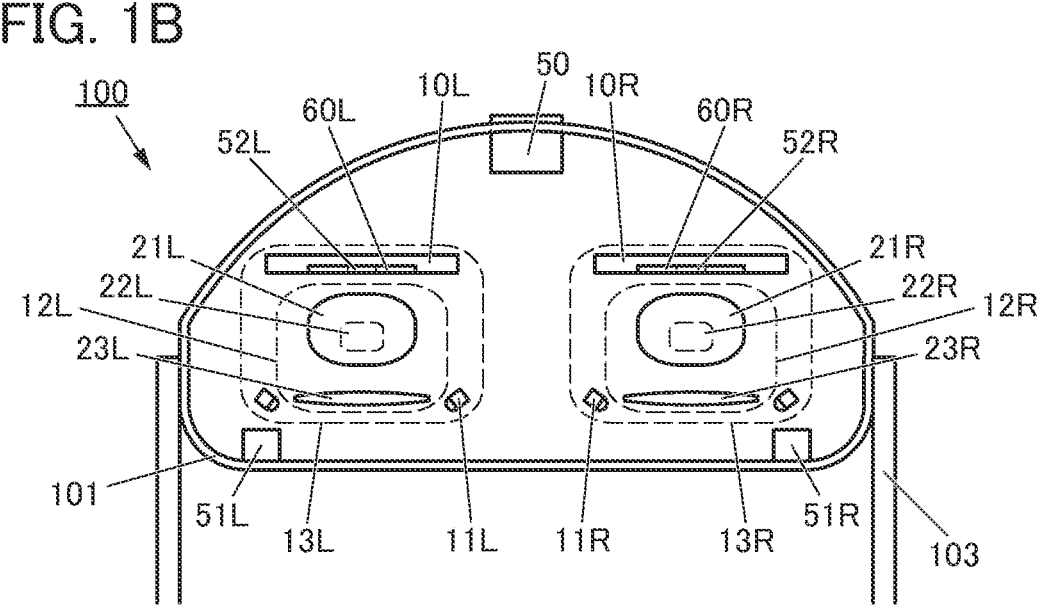

A structure example of the inside of the housing 101 included in the electronic device 100 is described. FIG. 1B is a schematic view of the inside of the housing 101 when seen from above.

The electronic device 100 includes the optical device 13R that can be used for the right eye and the optical device 13L that can be used for the left eye inside the housing 101. The optical device 13R includes the display apparatus 10R, the light source 11R, and the optical system 12R. The display apparatus 10R includes a display region 60R and a sensor region 52R. The optical system 12R includes a mirror 21R, a mirror 22R, and a lens 23R. The optical device 13L includes the display apparatus 10L, the light source 11L, and the optical system 12L. The display apparatus 10L includes a display region 60L and a sensor region 52L. The optical system 12L includes a mirror 21L, a mirror 22L, and a lens 23L.

Although the optical device 13R for the right eye and the optical device 13L for the left eye are separately provided inside the housing 101 in this embodiment, one embodiment of the present invention is not limited thereto. For example, part of a display apparatus may be used for the right eye, and another part of the display apparatus may be used for the left eye. For another example, a light source may be shared between the right eye and the left eye. For another example, part of an optical system may be shared between the right eye and the left eye. In this manner, separation for the right eye and the left eye is sometimes difficult. Moreover, similar structures of the display apparatus, the light source, and the optical system can be used for the right eye and the left eye.

Note that since the electronic device 100 has a structure in which external light does not enter the inside of the housing 101, the user can feel a high sense of immersion. The electronic device 100 includes the sensor portion 50 on the front of the housing 101; accordingly, an image capture element may be used as the sensor portion 50 so that a picture of the surrounding scenery is taken and displayed on one or both of the display apparatus 10R and the display apparatus 10L. The electronic device 100 can also display information superimposed on the image of the surrounding scenery. Thus, the electronic device 100 can also function as a wearable electronic device for augmented reality (AR) applications.

<Structure Example of Optical Device>

Figure 2:
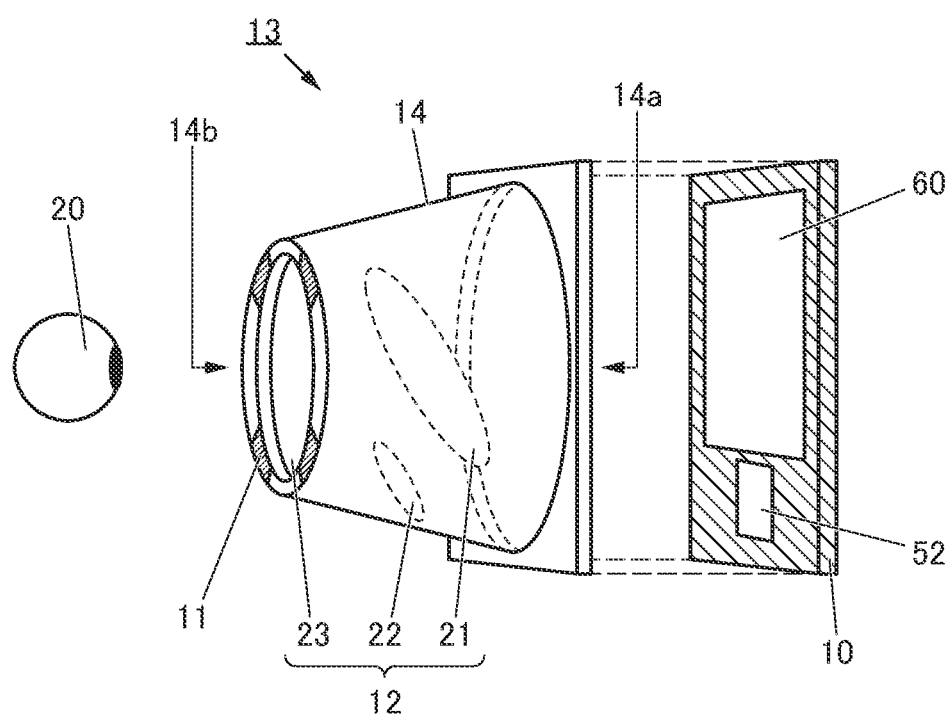
FIG. 2 is a diagram illustrating a structure example of an optical device.

A structure example of the optical device 13 is described. FIG. 2 is a schematic view of the optical device 13 seen from the side. The optical device 13 includes the display apparatus 10, the light source 11, the optical system 12, and a housing 14. Note that FIG. 2 illustrates an eyeball 20 of the user of the electronic device 100. The optical device 13 can be used as each of the optical device 13R for the right eye and the optical device 13L for the left eye included in the electronic device 100.

The optical system 12 is covered with the housing 14 and is provided between the eyeball 20 and the display apparatus 10. The housing 14 is provided with an opening 14*a* on the display apparatus 10 side and an opening 14*b* on the eyeball 20 side. The housing 14 has a function of blocking light except light from the opening 14*a* and the opening 14*b*. The light source 11 may be provided in the periphery of the opening 14*b* of the housing 14, for example.

Note that as long as the housing 14 has a function of blocking light other than light from the opening 14*a* and the opening 14*b*, the shape of the housing 14 is not limited to the cylindrical shape illustrated in FIG. 2. The housing 14 can have an appropriate shape in accordance with the display apparatus 10 and the optical system 12. For example, the shape may be a truncated cone shape, a truncated pyramid shape, a cylinder, a quadrangular prism, or a shape obtained by combining any of these shapes.

Figure 3:
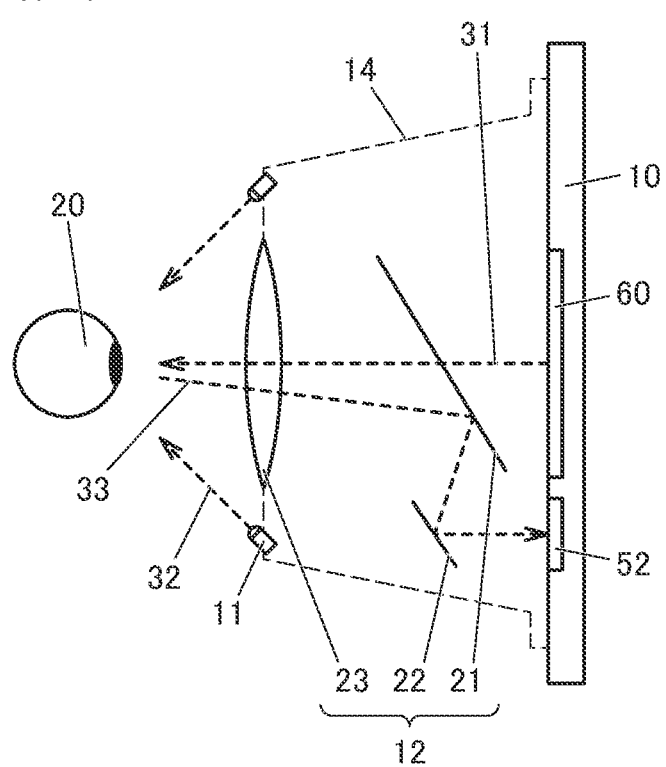
FIG. 3 is a diagram illustrating a structure example of an optical device.

FIG. 3 is a schematic view illustrating a structure example of the optical system 12. Note that FIG. 3 illustrates the eyeball 20 of the user of the electronic device 100.

[Light Source]

The light source 11 has a function of emitting light 32 which is delivered to the eyeball 20. The light 32 is preferably light other than visible light. Furthermore, the light 32 preferably includes infrared light. That is, the light source 11 preferably has a function of emitting infrared light. Specifically, the light source 11 has a function of emitting light with a wavelength greater than or equal to 780 nm and less than or equal to 3000 nm, preferably greater than or equal to 780 nm and less than or equal to 2500 nm. Light with such a wavelength that is not visually recognized by the user is preferable because it does not impair the visibility of an image displayed on the display apparatus. Note that light with a wavelength greater than or equal to 780 nm and less than or equal to 3000 nm is referred to as infrared light, and light with a wavelength greater than or equal to 780 nm and less than or equal to 2500 nm is referred to as near-infrared light in some cases. Although the light source 11 is often described as emitting infrared light, the light source 11 may emit near-infrared light and preferably emits light with a wavelength greater than or equal to 830 nm and less than or equal to 870 nm in gaze sensing, for example. As the light source 11, a light-emitting diode (sometimes referred to as an LED) can be used, for example.

[Display Apparatus]

The display apparatus 10 includes the display region 60 and the sensor region 52. The display region 60 and the sensor region 52 are provided such that when the display apparatus 10 and the housing 14 are superposed on each other, part or all of each of the display region 60 and the sensor region 52 are included in an opening on the display apparatus 10 side of the housing 14 (the opening corresponds to the opening 14*a* in FIG. 2). The sensor region 52 is preferably provided so as to be positioned below the display region 60 when the user sees the display apparatus 10 through the optical system 12.

The display region 60 has a function of displaying an image. Specifically, the display region 60 includes a light-emitting element, and the image is expressed by light 31 emitted from the light-emitting element. Thus, the light 31 emitted from the display region 60 includes visible light. The light 31 is delivered to the eyeball 20 through the optical system 12. Accordingly, the user can see the image.

The sensor region 52 has a function of detecting light incident from an opening on the eyeball 20 side of the housing 14 (the opening corresponds to the opening 14*b* in FIG. 2) through the optical system 12. Light detected by the sensor region 52 is preferably infrared light, for example. For example, the sensor region 52 can detect, among the light 32 emitted from the light source 11, light reflected by the eyeball 20, i.e., the light 33. That is, the sensor region 52 can capture an image of the eyeball 20 irradiated with infrared light emitted from the light source 11.

Note that the object captured by the sensor region 52 is not limited only to the eyeball 20, and for example, an image in a wider area than the eyeball 20 including the user's eyeball, eyelid, or the like may be captured. Moreover, the sensor region 52 may be used to measure the number of blinks, eyelid behavior, change in pupil size, movement of a gaze, and the like, whereby the user's fatigue level, health condition, and the like may be sensed. Furthermore, by combining information obtained from the above-described sensor portion 51 as appropriate, the sensing accuracy can be increased.

A user's focus area can be found by sensing the user's gaze. For example, a combination of the sense of the focus area with the measurement of the number of blinks per unit time enables an operation of selecting an icon displayed on a display region of the display apparatus 10. In other words, an operation of clicking an icon with a mouse can be achieved by sensing the user's gaze and a movement of eyelids. In other words, an operation of the electronic device 100 can be controlled by sensing a user's gaze and movement of eyelids. Since the user does not need to use both hands to operate the electronic device 100, an input operation or the like can be performed with holding nothing in both hands.

Figure 4A:
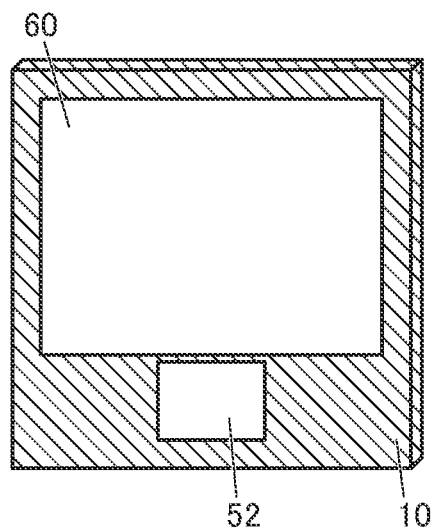
FIG. 4A and FIG. 4B are diagrams each illustrating a structure example of a display apparatus.
Figure 4B:
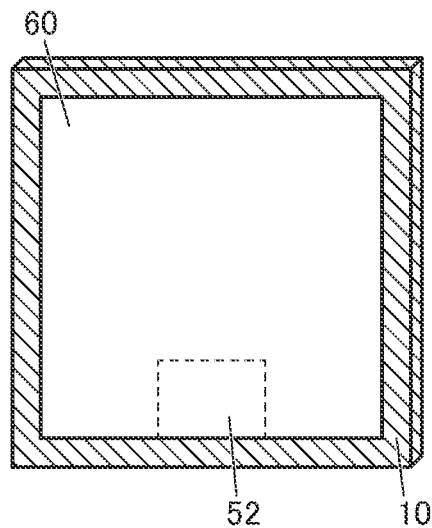

Note that the sensor region 52 may be separately provided from the display region 60 or may be provided to overlap with the display region 60. For example, the sensor region 52 and the display region 60 are separately provided as illustrated in FIG. 4A, whereby the influence of light emitted from the display region 60 on the sensor region 52 can be reduced. For example, when the sensor region 52 and the display region 60 are provided to overlap with each other as illustrated in FIG. 4B, the sensor region 52 can function as the display region 60 all the time except for a period during which the sensor region 52 detects the light 33 as a sensor region, so that a large display region of an image can be obtained.

Note that more detailed structure examples of the display apparatus 10 are described later.

[Optical System]

The optical system 12 has a function of appropriately controlling an optical path so that the light 31 emitted from the display region 60 in the display apparatus 10 is incident on the eyeball 20. The optical system 12 also has a function of appropriately controlling an optical path so that the light 33 reflected by the eyeball 20 is incident on the sensor region 52 in the display apparatus 10.

The optical system 12 includes one or more optical elements. As the optical element, one or more selected from a lens, a prism, a mirror, a filter, a diffraction grating, and the like can be used.

The optical system 12 includes the mirror 21 and the mirror 22, for example. The mirror 21 can be provided on the optical path of the light 31. The mirror 21 preferably has a function of transmitting visible light and reflecting infrared light. Such a mirror is referred to as a hot mirror. For example, in this embodiment and the like, the light 31 includes visible light. Thus, the light 31 incident on one surface of the mirror 21 (sometimes referred to as a first surface) passes through the other surface of the mirror 21 (sometimes referred to as a second surface). In this embodiment and the like, when the eyeball 20 is irradiated with the light 32 including infrared light, the light 33 reflected by the eyeball 20 includes infrared light. Thus, the light 33 incident on the other surface (second surface) of the mirror 21 is reflected.

The mirror 21 is provided between the display region 60 and the eyeball 20. The optical system 12 may be provided with the lens 23. The lens 23 is provided between the mirror 21 and the eyeball 20. For example, the lens 23 is preferably provided in the opening 14b. Thus, the light 31 emitted from the display region 60 passes through the mirror 21 and the lens 23 in this order and reaches the eyeball 20.

The mirror 22 can be provided on the optical path of the light 33. The light 33 passes through the lens 23, and is incident on and reflected by the other surface (second surface) of the mirror 21. The light 33 reflected by the other surface (second surface) of the mirror 21 is reflected also by the mirror 22 and reaches the sensor region 52. That is, the mirror 22 is provided such that the light 33 is reflected by the mirror 21 and the mirror 22 in this order and incident on the sensor region 52.

The optical system that can be used for the optical device of one embodiment of the present invention is not limited to the structure example illustrated in FIG. 3. Although FIG. 3 illustrates an example in which plane mirrors are used as the mirror 21 and the mirror 22, one embodiment of the present invention is not limited thereto, and a concave mirror, a convex mirror, or the like may be used, for example. As the lens 23, a spherical lens, an aspheric lens, a Fresnel lens, or the like can be used. When these are appropriately selected, the optical path can be appropriately controlled such that an image is formed at the eyeball 20 by the light 31 emitted from the display region 60 and an image is formed at the sensor region 52 by the light 33 reflected by the eyeball 20.

Figure 5:
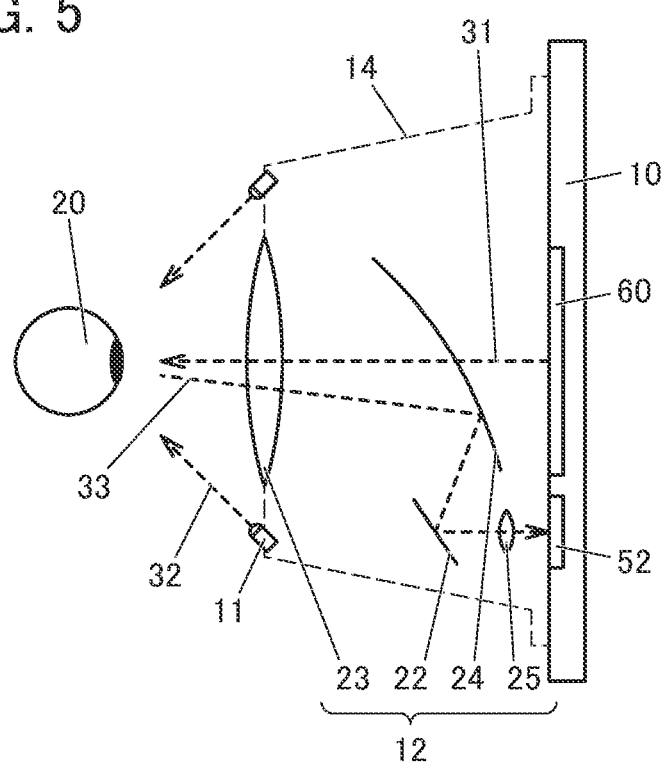
FIG. 5 is a diagram illustrating a structure example of an optical device.
Figure 6:
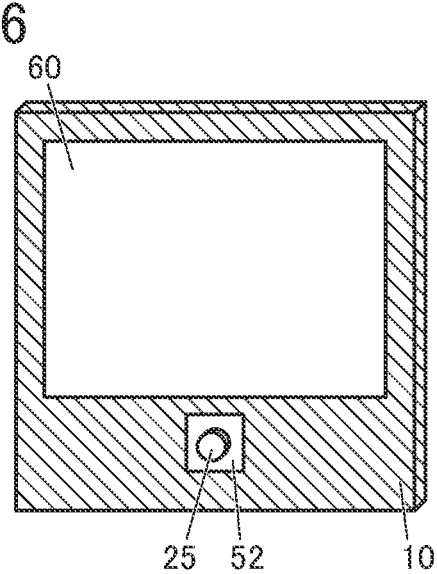
FIG. 6 is a diagram illustrating a structure example of a display apparatus.

In order to appropriately control the optical paths of the light 31 and the light 33, one or more optical elements can be used in combination as appropriate. For another structure example of the optical system 12, as illustrated in FIG. 5, the mirror 21 which is a flat mirror may be replaced with a mirror 24 which is a concave mirror, and a lens 25 may be provided between the mirror 22 and the sensor region 52. Note that the lens 25 may be provided in the optical system 12 or may be provided in the display apparatus 10. FIG. 6 is a schematic view in which the lens 25 is provided over the sensor region 52 of the display apparatus 10, for example. Note that as the lens 25, a microlens, a pinhole, or the like may be provided over the sensor region 52.

<Modification Example of Structure of Optical Device>

The structure of the optical device 13 is not limited to the example illustrated in FIG. 2. For example, an optical element may be provided between the light source 11 and the eyeball 20. For example, when a filter that cuts visible light is provided between the light source 11 and the eyeball 20, only infrared light can be delivered to the eyeball 20 even in the case where the light 32 emitted from the light source 11 includes visible light components. Thus, the visibility of an image can be enhanced. For example, when a lens is provided between the light source 11 and the eyeball 20, the light 32 emitted from the light source 11 can be efficiently delivered to the eyeball 20. Thus, clearer imaging data can be obtained in the image capturing of the eyeball 20 by the sensor region 52.

The position where the light source 11 is provided is not limited to the periphery of the opening 14b of the housing 14. For example, the light source 11 may be provided in the display apparatus 10. As the light source 11, other than an LED, a light-emitting element having a function of emitting infrared light (e.g., an organic electroluminescent element) may be used.

Figure 7:
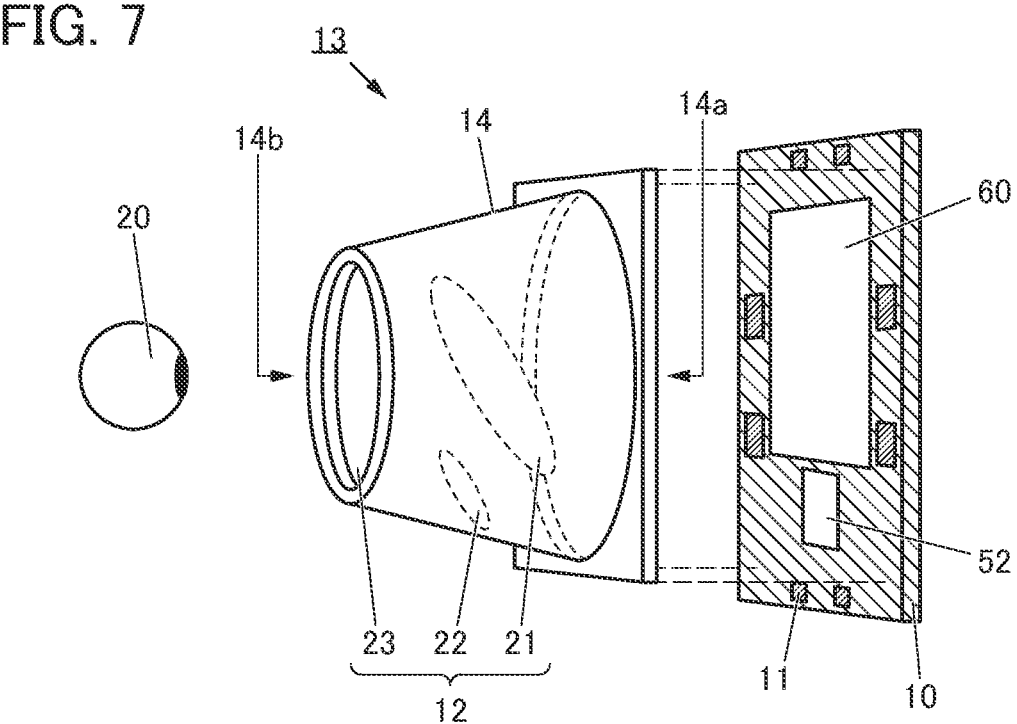
FIG. 7 is a diagram illustrating a structure example of an optical device.
Figure 8A:
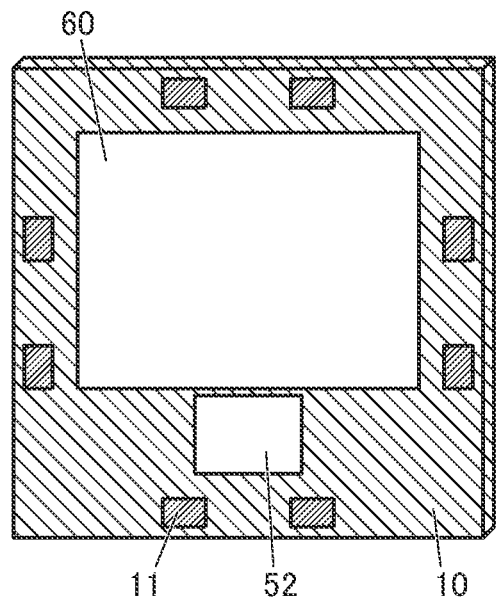
FIG. 8A and FIG. 8B are diagrams each illustrating a structure example of a display apparatus.
Figure 8B:
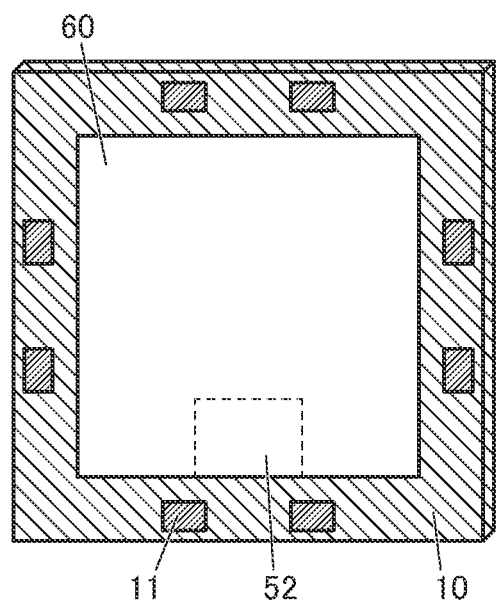

For example, as illustrated in FIG. 7 and FIG. 8, the light source 11 may be provided on the periphery of the display region 60 and the sensor region 52 of the display apparatus 10. Note that FIG. 8A is a schematic view of the case where the sensor region 52 and the display region 60 are separately provided, and FIG. 8B is a schematic view of the case where the sensor region 52 is provided in the display region 60. When the light source 11 is provided in the display apparatus 10, space saving of the electronic device 100 can be achieved. That is, the size and weight of the electronic device 100 can be reduced.

An optical element may be provided between the light source 11 and the eyeball 20. For example, by providing a mirror between the light source 11 and the eyeball 20, the light 32 emitted from the light source 11 can be efficiently delivered to the eyeball 20.

<Structure Example of Display Region and Peripheral Circuit of Sensor Region>

Figure 9:
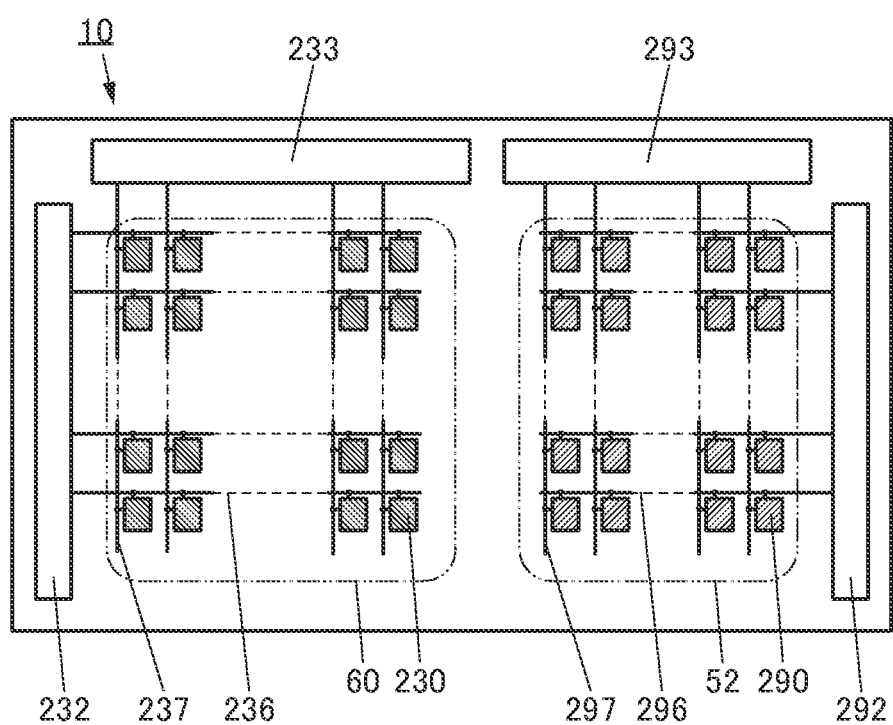
FIG. 9 is a diagram illustrating a structure example of a display apparatus.

A structure example of the display apparatus 10 is described. FIG. 9 is a block diagram illustrating the display apparatus 10. The display apparatus 10 includes the display region 60, a sensor region 52, a peripheral circuit region 232, a peripheral circuit region 233, a peripheral circuit region 292, and a peripheral circuit region 293.

A circuit included in the peripheral circuit region 232 functions as, for example, a scan line driver circuit of the display region 60. A circuit included in the peripheral circuit region 233 functions as, for example, a signal line driver circuit of the display region 60. A circuit included in the peripheral circuit region 292 functions as, for example, a signal line driver circuit of the sensor region 52. A circuit included in the peripheral circuit region 293 functions as, for example, a reading circuit of the sensor region 52. Note that circuits included in the peripheral circuit region 232, the peripheral circuit region 233, the peripheral circuit region 292, and the peripheral circuit region 293 are collectively referred to as a "peripheral driver circuit" in some cases.

Any of various circuits such as a shift register, a level shifter, an inverter, a latch, an analog switch, a logic circuit, a source follower, an operational amplifier, and an amplifier circuit can be used as the peripheral driver circuit, for example. In the peripheral driver circuit, a transistor, a capacitor, or the like can be used, for example. A transistor included in the peripheral driver circuit can be formed in the same steps as the transistors included in pixels 230 and pixels 290.

The display apparatus 10 includes m wirings 236 (m is an integer of 1 or more) which are arranged substantially parallel to each other and whose potentials are controlled by the circuits included in the peripheral circuit region 232, and n wirings 237 (n is an integer of 1 or more) which are arranged substantially parallel to each other and whose potentials are controlled by the circuits included in the peripheral circuit region 233. The display apparatus 10 also includes p wirings 296 (p is an integer of 1 or more) which are arranged substantially parallel to each other and whose potentials are controlled by the circuits included in the peripheral circuit region 292, and q wirings 297 (q is an integer of 1 or more) which are arranged substantially parallel to each other and whose potentials are controlled by the circuits included in the peripheral circuit region 293.

The display region 60 includes a plurality of the pixels 230 arranged in a matrix. Full-color display can be achieved by making the pixel 230 that controls the emission amount of red light, the pixel 230 that controls the emission amount of green light, and the pixel 230 that controls the emission amount of blue light collectively function as one pixel and by controlling the emission amount (emission luminance) of each of the pixels 230. Thus, the three pixels 230 each function as a subpixel. That is, three subpixels control the emission amount of red light, green light, and blue light. Note that the light colors controlled by the three subpixels are not limited to a combination of red (R), green (G), and blue (B) and may be cyan (C), magenta (M), and yellow (Y).

Four subpixels may collectively function as one pixel. For example, a subpixel that controls the emission amount of white light may be added to the three subpixels that control the emission amounts of red light, green light, and blue light. The addition of the subpixel that controls the emission amount of white light can increase the luminance of a display region. Alternatively, a subpixel that controls the emission amount of yellow light may be added to the three subpixels that control the emission amounts of red light, green light, and blue light. Alternatively, a subpixel that controls the emission amount of white light may be added to the three subpixels that control the emission amounts of cyan light, magenta light, and yellow light.

When the number of subpixels functioning as one pixel is increased and a subpixel that controls the emission amount of light of red, green, blue, cyan, magenta, yellow, or the like is used appropriately in combination, the reproducibility of halftones can be increased. Thus, display quality can be improved.

The display apparatus of one embodiment of the present invention can reproduce the color gamut of various standards. For example, the display apparatus of one embodiment of the present invention can reproduce the color gamut of the following standards: the PAL (Phase Alternating Line) standard and NTSC (National Television System Committee) standard used for TV broadcasting; the sRGB (standard RGB) standard and Adobe RGB standard used widely for display apparatus, for example, in electronic devices such as personal computers, digital cameras, and printers; the ITU-R BT.709 (International Telecommunication Union Radiocommunication Sector Broadcasting Service (Television) 709) standard used for HDTV (High Definition Televisions, also referred to as Hi-Vision); the DCI-P3 (Digital Cinema Initiatives P3) standard used for digital cinema projection; the ITU-R BT.2020 (REC.2020 (Recommendation 2020)) standard used for UHDTV (Ultra High Definition Television, also referred to as Super Hi-Vision); and the like.

The definition of the display region 60 can be HD (number of pixels: 1280×720), FHD (number of pixels: 1920×1080), or WQHD (number of pixels: 2560×1440), for example. For example, the definition of the display region 60 is preferably as high as WQXGA (number of pixels: 2560×1600), 4K2K (number of pixels: 3840×2160), or 8K4K (number of pixels: 7680×4320). In particular, definition of 4K2K, 8K4K, or higher is preferable.

The pixel density (resolution) of the display region 60 is preferably higher than or equal to 1000 ppi and lower than or equal to 10000 ppi. For example, the resolution may be higher than or equal to 2000 ppi and lower than or equal to 6000 ppi, or higher than or equal to 3000 ppi and lower than or equal to 5000 ppi.

Note that there is no particular limitation on the screen ratio (aspect ratio) of the display region 60. For example, the display region 60 of the display apparatus 10 is compatible with a variety of screen ratios such as 1:1 (a square), 4:3, 16:9, and 16:10.

The refresh rate of the display apparatus of one embodiment of the present invention can be variable. For example, the refresh rate is adjusted (in the range from 0.01 Hz to 240 Hz inclusive, for example) in accordance with contents displayed on the display apparatus, whereby power consumption can be reduced. Moreover, driving with a lowered refresh rate that reduces the power consumption of the display apparatus may be referred to as idling stop (IDS) driving.

The sensor region 52 includes a plurality of the pixels 290 arranged in a matrix. The pixel 290 has a function of outputting a signal corresponding to the amount of received light.

The resolution of the sensor region 52 can be set as appropriate in accordance with the size of the eyeball 20. The resolution of the sensor region 52 may be, for example, the number of pixels 200×200, the number of pixels 400×400, or the number of pixels 640×480.

The sensor region 52 can be provided in the display region 60 (see FIG. 4B). That is, for example, the pixel 290 and the three pixels 230 may each be a subpixel, and four subpixels may be collectively referred to as one pixel. In the display region 60, full-color display can be achieved when the three pixels 230 function. In the sensor region 52, a function of outputting a signal corresponding to the amount of received light can be achieved when the pixel 290 functions.

In the sensor region 52, for example, in a period during which the amount of received light is detected, the functions of the three pixels 230 is stopped to stop the light emission, whereby the influence of the pixels 230 on the pixels 290 can be reduced.

<Circuit Structure Example of Pixel>

Figure 10A:
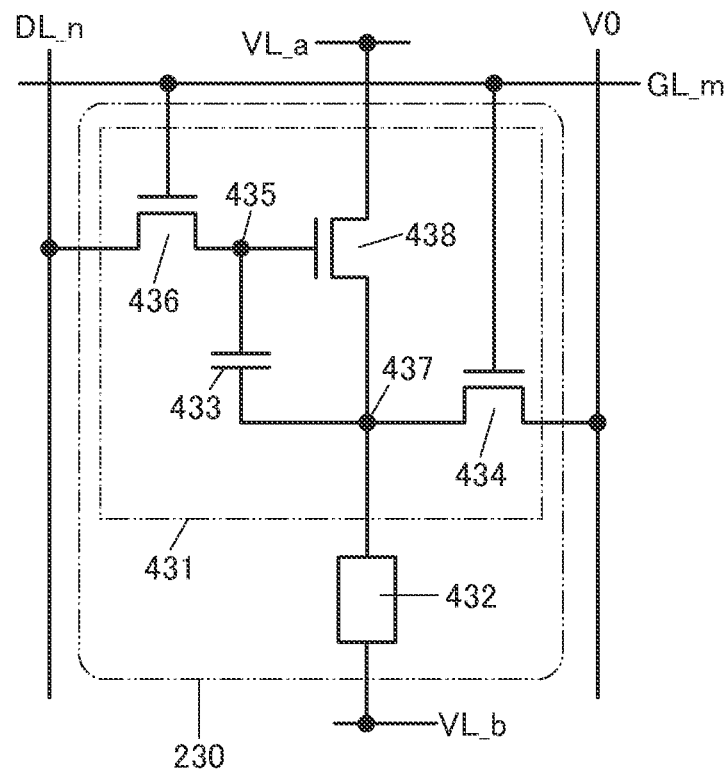
FIG. 10A and FIG. 10B are diagrams each illustrating a structure example of a display apparatus.

FIG. 10A is a diagram illustrating a circuit structure example of the pixel 230 included in the display region 60. The pixel 230 includes a pixel circuit 431 and a light-emitting element 432.

Each of the wirings 236 is electrically connected to n pixel circuits 431 in a given row among the pixel circuits 431 arranged in m rows and n columns in the display region 60. Each of the wirings 237 is electrically connected to m pixel circuits 431 arranged in a given column among the pixel circuits 431 arranged in m rows and n columns. Note that m and n are each an integer of 1 or more.

The pixel circuit 431 includes a transistor 436, a capacitor 433, a transistor 438, and a transistor 434. The pixel circuit 431 is electrically connected to the light-emitting element 432.

In this specification and the like, the term "element" can be replaced with the term "device" in some cases. For example, a display element, a light-emitting element, and a liquid crystal element can be rephrased as a display device, a light-emitting device, and a liquid crystal device, respectively.

One of a source and a drain of the transistor 436 is electrically connected to a wiring to which a data signal (also referred to as "video signal") is supplied (hereinafter, referred to as a signal line DL_n). A gate of the transistor 436 is electrically connected to a wiring to which a gate signal is supplied (hereinafter, referred to as a scan line GL_m). The signal line DL_n and the scan line GL_m correspond to the wiring 237 and the wiring 236, respectively.

The transistor 436 has a function of controlling the writing of the data signal to a wiring 435.

One of a pair of electrodes of the capacitor element 433 is electrically connected to the wiring 435, and the other is electrically connected to a wiring 437. The other of the source and the drain of the transistor 436 is electrically connected to the wiring 435.

The capacitor 433 has a function of a storage capacitor for storing data written to the wiring 435.

One of a source and a drain of the transistor 438 is electrically connected to a potential supply line VL_a, and the other is electrically connected to the wiring 437. A gate of the transistor 438 is electrically connected to the wiring 435.

One of a source and a drain of the transistor 434 is electrically connected to a potential supply line V0, and the other is electrically connected to the wiring 437. Furthermore, a gate of the transistor 434 is electrically connected to the scan line GL_m.

One of an anode and a cathode of the light-emitting element 432 is electrically connected to a potential supply line VL_b, and the other is electrically connected to the wiring 437.

As the light-emitting element 432, an organic electroluminescent element (also referred to as an organic EL element) can be used, for example. Note that the light-emitting element 432 is not limited thereto; an inorganic EL element formed of an inorganic material may be used, for example. Note that an "organic EL element" and an "inorganic EL element" are collectively referred to as "EL element" in some cases.

The emission color of the EL element can be, for example, white, red, green, blue, cyan, magenta, yellow, or the like depending on materials included in the EL element.

Examples of a method for achieving color display include a method in which the light-emitting element 432 whose emission color is white is combined with a coloring layer and a method in which the light-emitting element 432 with a different emission color is provided in each pixel. The former method is more productive than the latter method. In contrast, the latter method, which requires separate formation of the light-emitting element 432 pixel by pixel, is less productive than the former method. However, the latter method can provide higher color purity of the emission color than the former method. When the light-emitting element 432 has a microcavity structure in addition to the latter method, the color purity can be further increased.

Either a low molecular compound or a high molecular compound can be used for the display element 432, and an inorganic compound may also be contained. The layers included in the light-emitting element 432 can each be formed, for example, by a method such as an evaporation method (including a vacuum evaporation method), a transfer method, a printing method, an inkjet method, or a coating method.

The light-emitting element 432 may contain an inorganic compound (e.g., quantum dots). For example, when used for a light-emitting layer, the quantum dots can function as a light-emitting material.

As a power supply potential, a power supply potential on the relatively high potential side or a power supply potential on the relatively low potential side can be used, for example. A power supply potential on the high potential side can be referred to as a high power supply potential VDD1, and a power supply potential on the low potential side can be referred to as a low power supply potential VSS1. The high power supply potential VDD1 is supplied to one of the potential supply line VL_a and the potential supply line VL_b, and the low power supply potential VSS1 is supplied to the other, for example.

Note that a ground potential, for example, can be used as the high power supply potential or the low power supply potential. For example, in the case where a ground potential is used as the high power supply potential, the low power supply potential is a potential lower than the ground potential, and in the case where a ground potential is used as the low power supply potential, the high power supply potential is a potential higher than the ground potential.

In the display apparatus including the pixel circuits 431, the pixel circuits 431 are sequentially selected row by row by the circuits included in the peripheral driver circuit, whereby the transistors 436 and the transistors 434 are turned on and data signals are written to the wirings 435. When the transistors 436 and the transistors 434 are turned off, the pixel circuits 431 in which the data has been written to the wirings 435 are brought into a retention state. Furthermore, the amount of current flowing between the source and the drain of the transistor 438 is controlled in accordance with the potential of the data written to the wiring 435, and the light-emitting element 432 emits light with a luminance corresponding to the amount of current flow. This operation is sequentially performed row by row; thus, an image can be displayed.

Figure 10B:
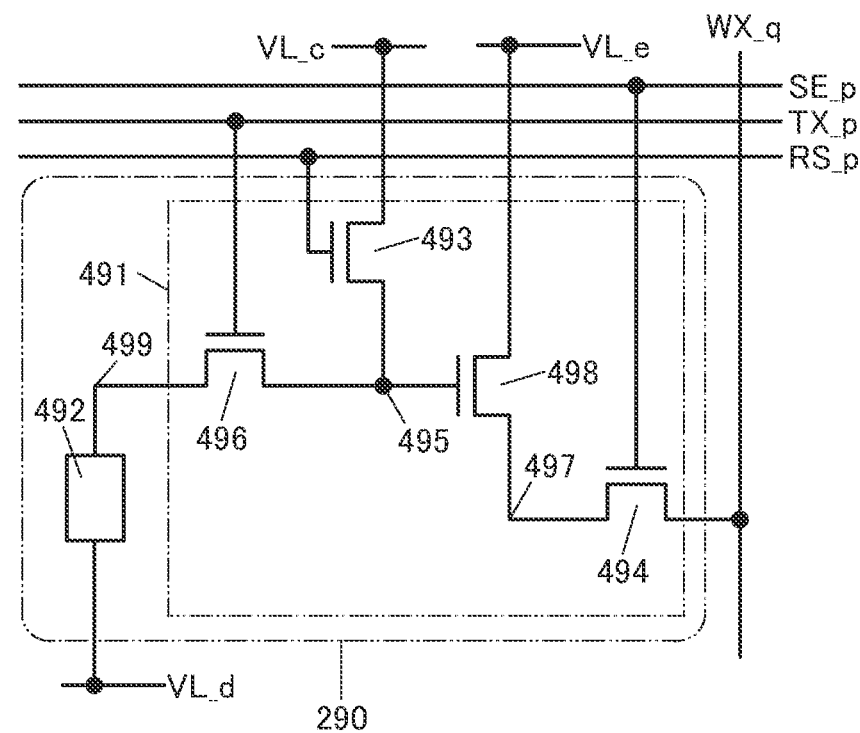

FIG. 10B is a diagram illustrating a circuit structure example of the pixel 290 included in the sensor region 52. The pixel 290 includes a pixel circuit 491 and a light-receiving element 492.

Each of the wirings 296 is electrically connected to q pixel circuits 491 arranged in a given row among the pixel circuits 491 arranged in p rows and q columns in the sensor region 52. Each of the wirings 297 is electrically connected top pixel circuits 491 arranged in a given column among the pixel circuits 491 arranged in p rows and q columns. Note that p and q are each an integer greater than or equal to 1.

The pixel circuit 491 includes a transistor 496, a transistor 493, a transistor 498, and a transistor 494. The pixel circuit 491 is electrically connected to the light-receiving element 492.

In this specification and the like, the term "element" can be replaced with the term "device" in some cases. For example, "light-receiving element" can be replaced with "light-receiving device."

One of a source and a drain of the transistor 496 is electrically connected to a wiring 499, and the other is electrically connected to a wiring 495. A gate of the transistor 496 is electrically connected to a wiring to which a first row selection signal is supplied (hereinafter, referred to as a row selection line TX_p).

The transistor 496 has a function of controlling transfer of electric charge between the wiring 499 and the wiring 495.

One of a source and a drain of the transistor 493 is electrically connected to a potential supply line VL_c, and the other is electrically connected to the wiring 495. A gate electrode of the transistor 493 is electrically connected to a wiring to which a second row selection signal is supplied (hereinafter, referred to as a row selection line RS_p).

One of a source and a drain of the transistor 498 is electrically connected to a potential supply line VL_e, and the other is electrically connected to a wiring 497. Furthermore, a gate of the transistor 498 is electrically connected to the wiring 495.

One of a source and a drain of the transistor 494 is electrically connected to a wiring from which a detection signal is read (hereinafter, referred to as a signal line WX_q), and the other is connected to the wiring 497. A gate of the transistor 494 is electrically connected to a wiring to which a third row selection signal is supplied (hereinafter, referred to as a row selection line SE_p).

Note that wiring groups of the row selection line TX_p, the row selection line RS_p, and the row selection line SE_p correspond to the wirings 296. The signal line WX_q corresponds to the wiring 297.

One of an anode and a cathode of the light-receiving element 492 is electrically connected to a potential supply line VL_d, and the other is electrically connected to the wiring 499.

As the light-receiving element 492, a photoelectric conversion element formed of an organic material (also referred to as an organic photodiode, an organic light-receiving element, or an OPD element) can be used, for example. Note that the light-receiving element 492 is not limited thereto; for example, a photoelectric conversion element formed of an inorganic material (also referred to as a photodiode or a photodetector) may be used.

As a power supply potential, a power supply potential on the relatively high potential side or a power supply potential on the relatively low potential side can be used, for example. A power supply potential on the high potential side can be referred to as a high power supply potential VDD2, and a power supply potential on the low potential side can be referred to as a low power supply potential VSS2. Furthermore, a power supply potential on the relatively higher potential side then the high power supply potential VDD2 can be referred to as a high power supply potential VDD3. The high power supply potential VDD2 is supplied to one of the potential supply line VL_c and the potential supply line VL_d, and the low power supply potential VSS2 is supplied to the other, for example. For example, the high power supply potential VDD3 is supplied to the potential supply line VL_e.

For example, the potential of the high power supply potential VDD2 or the low power supply potential VSS2 may be the same as that of the low power supply potential VSS1.

In the display apparatus including the pixel circuits 491, one or more rows of the pixel circuits 491 are sequentially selected by a circuit included in the peripheral driver circuit, so that image capturing and reading are performed.

In the case of performing image capturing, first, the transistor 493 and the transistor 496 are turned on, so that a potential supplied to the potential supply line VL_c is supplied to the wiring 499 (this step is also referred to as initialization). Next, the transistor 493 and the transistor 496 are turned off, so that electric charge corresponding to the amount of light received by the light-receiving element 492 is gradually accumulated in the wiring 499 (this step is also referred to as light exposure). Next, after a given time (light exposure time) elapses, the transistor 496 is turned on, so that the electric charge accumulated in the wiring 499 is transferred to the wiring 495 (this step is also referred to as transfer). Then, the potential of the wiring 495 becomes a value corresponding to the amount of light received by the light-receiving element 492. Finally, the transistor 496 is turned off, whereby image capturing is completed.

In the case where reading is performed, the transistor 494 is turned on, so that current whose amount corresponds to the potential of the wiring 495 flows to the signal line WX_q. That is, current whose amount corresponds to the amount of light received by the light-receiving element 492 flows. The current is detected by a circuit included in the peripheral circuit region 293. This operation is performed row by row, whereby signals obtained by imaging can be read.

Note that some or all of the transistors included in the pixel circuit 431 and the pixel circuit 491 may be transistors including backgates. For example, when transistors including backgates are used as some or all of the transistors included in the pixel circuit 431 and the pixel circuit 491, the backgates and gates may be electrically connected to each other. For another example, when transistors including backgates are used as some or all of the transistors included in the pixel circuit 431 and the pixel circuit 491, the backgates and ones of sources and drains may be electrically connected to each other.

<Specific Structure Example of Display Apparatus>

Figure 11:
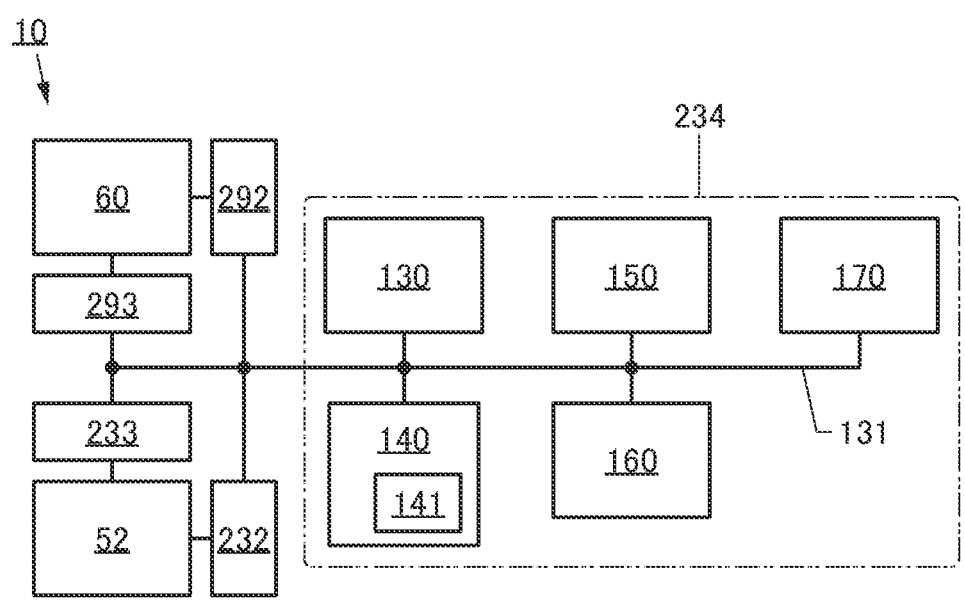
FIG. 11 is a diagram illustrating a structure example of a display apparatus.

FIG. 11 is a block diagram illustrating a structure example of the display apparatus 10. The display apparatus 10 may include a functional circuit region 234 in addition to the display region 60, the sensor region 52, the peripheral circuit region 232, the peripheral circuit region 233, the peripheral circuit region 292, and the peripheral circuit region 293. When the display apparatus 10 includes the functional circuit region 234, a variety of functions such as generation of image data and gaze sensing can be achieved, for example. The functional circuit region 234 includes a CPU, a GPU, a storage circuit, and the like, for example. The functional circuit region 234 can include one or more functional circuits for each component that implements a function. In FIG. 11, a control portion 130, an arithmetic portion 140, a memory portion 150, an input/output portion 160, and a gaze sensing portion 170 are illustrated as examples of functional circuits provided in the functional circuit region 234. The control portion 130, the arithmetic portion 140, the memory portion 150, the input/output portion 160, and the gaze sensing portion 170 are electrically connected to each other through a bus line 131.

[Control Portion]

The control portion 130 has a function of controlling the operation of the whole display apparatus 10. The control portion 130 controls the operation of the display region 60, the peripheral circuit region 232, the peripheral circuit region 233, the sensor region 52, the peripheral circuit region 292, the peripheral circuit region 293, the arithmetic portion 140, the memory portion 150, the input/output portion 160, and the gaze sensing portion 170.

[Arithmetic Portion]

The arithmetic portion 140 has a function of executing an arithmetic operation associated with the operation of the whole display apparatus 10, and a central processing unit (CPU) or the like can be used, for example. The arithmetic portion 140 has a function of generating an image displayed on the display region 60.

A CPU and other microprocessors such as a DSP (Digital Signal Processor) and a GPU (Graphics Processing Unit) can be used alone or in combination as the arithmetic portion 140. A structure may be employed in which such a microprocessor is obtained with a PLD (Programmable Logic Device) such as an FPGA (Field Programmable Gate Array) or an FPAA (Field Programmable Analog Array).

The arithmetic portion 140 includes a neural network 141. The neural network 141 may be formed using software. As the neural network 141, one or more of a deep neural network, a convolutional neural network, a recurrent neural network, an autoencoder, a deep Boltzmann machine, and a deep belief network can be used.

The arithmetic portion 140 interprets and executes instructions from various programs with the use of a processor to process various kinds of data and control programs. Programs that might be executed by the processor may be stored in a memory region of the processor or may be stored in the memory portion 150.

The arithmetic portion 140 may include a main memory. The main memory can include a volatile memory such as a RAM (Random Access Memory) or a nonvolatile memory such as a ROM (Read Only Memory).

For example, a DRAM (Dynamic Random Access Memory) is used for the RAM provided in the main memory, in which case a memory space as a workspace for the arithmetic portion 140 is virtually allocated and used. An operating system, an application program, a program module, program data, and the like which are stored in the memory portion 150 are loaded into the RAM to be executed. The data, program, and program module which are loaded into the RAM are directly accessed and operated by the arithmetic portion 140.

Meanwhile, a BIOS (Basic Input/Output System), firmware, and the like for which rewriting is not needed can be stored in the ROM. As the ROM, a mask ROM, an OTPROM (One Time Programmable Read Only Memory), an EPROM (Erasable Programmable Read Only Memory), or the like can be used. Examples of the EPROM include a UV-EPROM (Ultra-Violet Erasable Programmable Read Only Memory) which can erase stored data by ultraviolet irradiation, an EEPROM (Electrically Erasable Programmable Read Only Memory), and a flash memory.

[Memory Portion]

As the memory portion 150, a memory device using a nonvolatile memory element, such as a flash memory, an MRAM (Magnetoresistive Random Access Memory), a PRAM (Phase change RAM), an ReRAM (Resistive RAM), or an FeRAM (Ferroelectric RAM); a memory device using a volatile memory element, such as a DRAM (Dynamic RAM) or an SRAM (Static RAM); or the like may be used, for example.

A plurality of algorithms for performing upconversion of image data, a weight coefficient for each algorithm, and the like are stored in the memory portion 150. An image source displayed on the display region 60 may be stored in the memory portion 150.

[Input/Output Portion]

The input/output portion 160 is electrically connected to the control portion 106 of the electronic device 100. The input/output portion 160 may be electrically connected to the communication portion 107 of the electronic device 100. Information necessary for the operation of the display apparatus 10 is supplied to the display apparatus 10 through the input/output portion 160. The input/output portion 160 may be electrically connected to one or more buttons or switches (also referred to as "housing switches") provided in the electronic device 100, for example. The input/output portion 160 may be electrically connected to an external port to which other input components can be connected.

Although a structure example in which the display apparatus 10 includes the functional circuit region 234 is described in this embodiment and the like, one embodiment of the present invention is not limited thereto. Some or all of the functional circuits included in the functional circuit region 234 may be provided outside the display apparatus 10. For example, the memory portion 150 is not incorporated in the display apparatus 10, and a memory device located outside the display apparatus 10 may be used as the memory portion 150. In that case, the memory portion 150 is electrically connected to a functional circuit (e.g., the arithmetic portion 140) included in the display apparatus 10 through the input/output portion 160. Alternatively, a structure provided with a communication unit, by which data transmission and reception are wirelessly performed, may be employed.

[Gaze Sensing Portion]

The gaze sensing portion 170 has a function of sensing a user's gaze with the use of information obtained from the sensor region 52. The user's gaze can be sensed by an existing eye tracking method. For example, the sensing is possible by a pupil centre corneal reflection (PCCR) method, a bright/dark pupil effect method, or the like.

For example, a PCCR method is a method for sensing a user's gaze from the position of the pupil center of a user and the relative position of a corneal reflection image (purkinje image) generated when light is delivered to an eyeball. In the case where a user's gaze is sensed by a PCCR method, an image of the user's pupil and a purkinje image can be taken with the sensor portions 52, and a user's gaze can be sensed with the gaze sensing portion 170. Note that the gaze sensing method using the gaze sensing portion 170 is not limited to the above-described sensing method. For example, the gaze sensing portion 170 preferably has a function of sensing any one or more selected from the user's corneal, iris, crystalline lens, and retina.

<Example of Image Processing>

The electronic device of one embodiment of the present invention may perform image processing using one or more functional circuits provided in the functional circuit region 234. For example, in the control portion 130, a region overlapping with the gaze may be determined in the display region 60 on the basis of information on the user's gaze sensed by the gaze sensing portion 170, whereby image processing corresponding to the position of the gaze is performed.

Figure 12A:
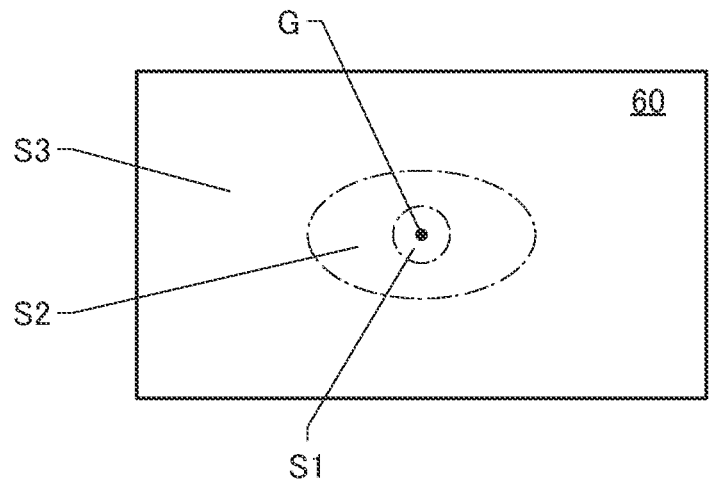
FIG. 12A and FIG. 12B are diagrams each illustrating an operation example of an electronic device.

An example of image processing corresponding to the user's gaze is described. FIG. 12A illustrates a gaze point G of the user and a first region S1 including the gaze point G that are superimposed on an image displayed on the display region 60. Furthermore, a second region S2 which is outside the first region S1 and a third region S3 which is outside the second region S2 are illustrated to be superimposed on the image displayed on the display region 60.

Figure 12B:
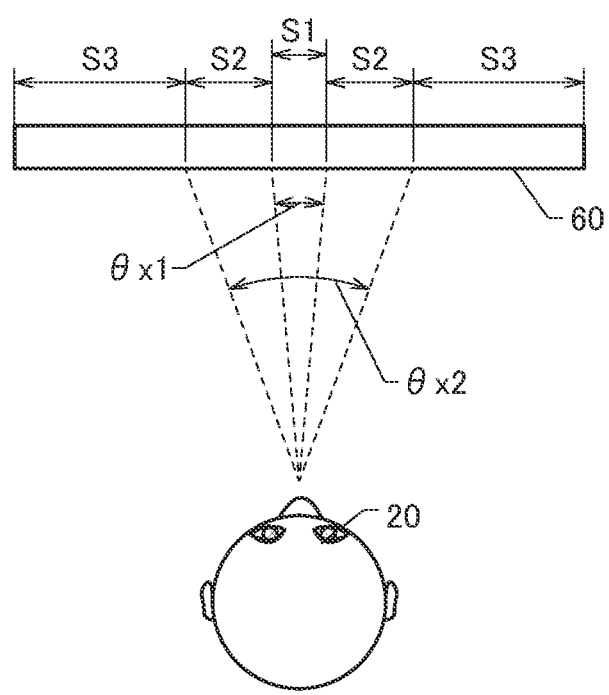

The human visual field is classified into the discriminating visual field, the effective visual field, the stable visual field, the inducting visual field, and the supplementary visual field although varying between individuals. The discriminating visual field is, for example, a region where visual performance such as eyesight and color discrimination is the highest. Considered using a line of intersection of the user's gaze and the display region 60, the discriminating visual field refers to a region extending to an angle θx1 of approximately 5° in the horizontal direction with the line of intersection used as the center (FIG. 12B is referred to for the angle θx1). That is, the discriminating visual field corresponds to the first region S1 in FIG. 12A.

The effective visual field is a region where specific information can be instantaneously discriminated only by the eye movement and refers to a region extending to an angle θx2 of less than or equal to approximately 30° in the horizontal direction and, although not shown in FIG. 12B, to an angle of less than or equal to approximately 200 in the vertical direction, with the line of intersection used as the center (FIG. 12B is referred to for the angle θx2). That is, the effective visual field corresponds to the second region S2 in FIG. 12A.

The stable gaze visual field is the region where specific information can be discriminated without much difficulty but with head movement. The induced visual field is the region where the presence of a specific object can be perceived but discrimination performance is low. The auxiliary visual field is the region where discrimination performance for a specific object is considerably low and the presence of a stimulus can be perceived. One or more selected from the stable gaze visual field, the induced visual field, and the auxiliary visual field correspond to the third region S3 in FIG. 12A.

From the above, it is found that the image quality in the discriminating visual field and the effective visual field is important in a moving image. It is particularly essential to increase the image quality in the discriminating visual field. Accordingly, it is preferable that the control portion 130 perform image processing to increase the image quality in the first region S1 or the first region S1 and the second region S2 shown in FIG. 12A. In other words, the image in the first region S1 or the first region S1 and the second region S2 is preferably enhanced. The image processing includes increasing resolution of a moving image by upconversion.

Even when the first region S1 to the third region S3 perform the same color display, e.g., white display, the image in the first region S1 or the first region S1 and the second region S2 is preferably enhanced by image processing.

In the control portion 130, for example, image data displayed on the display region 60 can be generated on the basis of information from software incorporated in the electronic device 100, information from the sensor portion 50, the sensor portion 51, and the sensor region 52, information that is obtained by the above image processing, and the like. The image data is transmitted to the peripheral circuit region 293 via the bus line 131 and displayed on the display region 60.

<Operation Example of Electronic Device>

An operation example of the electronic device of one embodiment of the present invention is described below with reference to a flowchart shown in FIG. 13.

Figure 13:
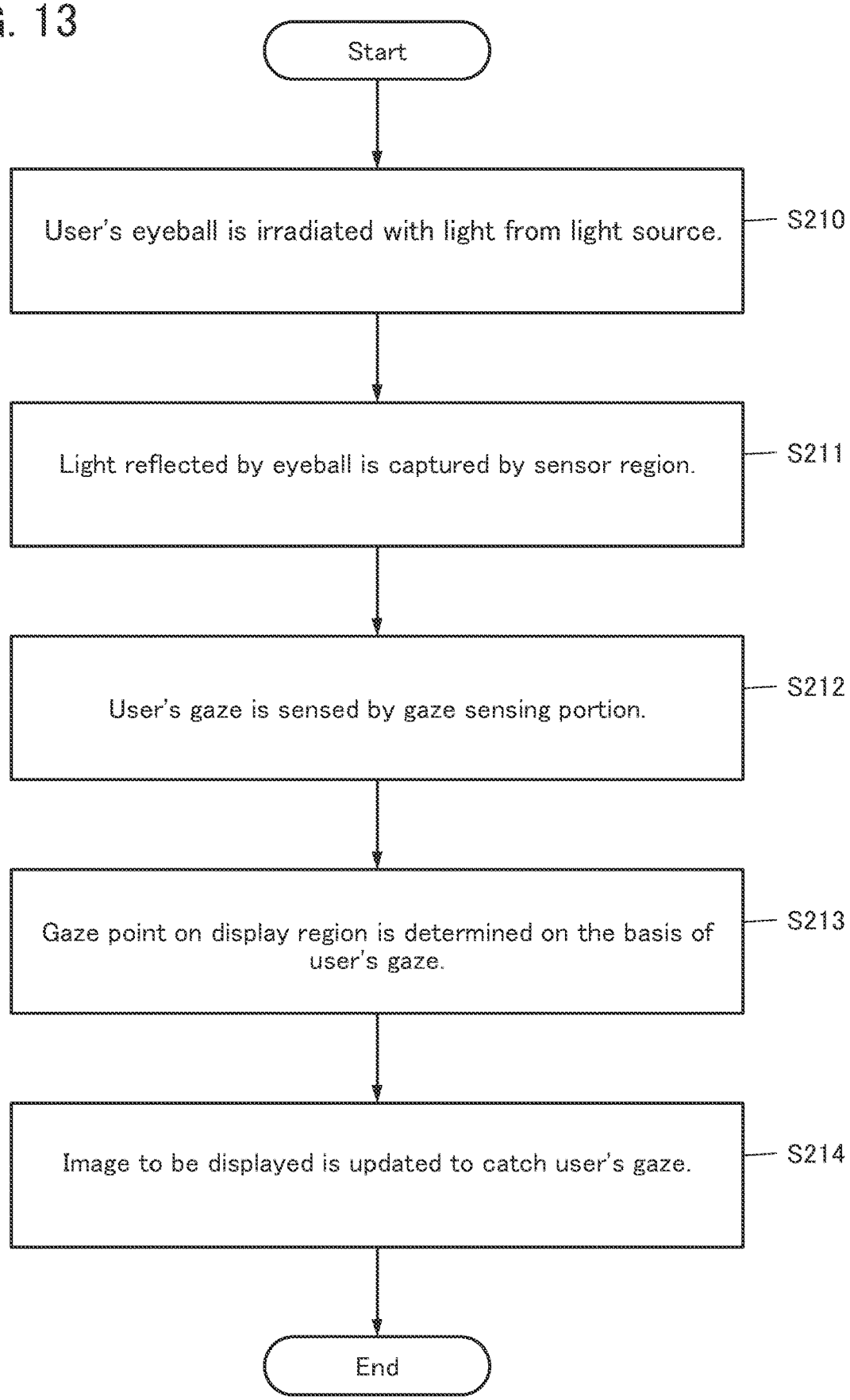
FIG. 13 is a flow chart showing an operation example of an electronic device.

The flow chart shown in FIG. 13 includes Step S210 to Step S213. First, in Step S210, the light 31, which is infrared light, is emitted from the light source 11 and is delivered to the eyeball 20 of a user. Next, in Step S211, an image of the light 33 reflected by the eyeball 20 is captured by the sensor region 52. Furthermore, in Step S212, imaging data obtained by the sensor region 52 is read by the peripheral circuit region 293, and the imaging data is used so that the user's gaze is sensed by the gaze sensing portion 170. Then, in Step S213, the gaze point G on the display region 60 is determined on the basis of the user's gaze. Next, in Step S214, an image to be displayed is updated to catch the user's gaze.

For example, as illustrated in FIG. 12, image processing for increasing a resolution can be performed in the first region S1. Owing to the processing for increasing a resolution only in the region, a load imposed on the GPU or the like included in the arithmetic portion 140 can be reduced.

In addition, the user's gaze can be sensed. Sensing the user's gaze allows determination of the user's attention, for example, in which case the user's action can be analyzed. Furthermore, an avatar can reproduce the motion of the eyes of the user. In addition, an operation or menu selection using gaze can be performed.

At least part of the structure examples, the drawings corresponding thereto, and the like described in this embodiment as an example can be combined with the other structure examples, the other drawings, and the other embodiments described in this specification and the like as appropriate.

Embodiment 2

In this embodiment, structure examples of the display apparatus of one embodiment of the present invention is described.

<Structure Example of Display Apparatus>

Figure 14A:
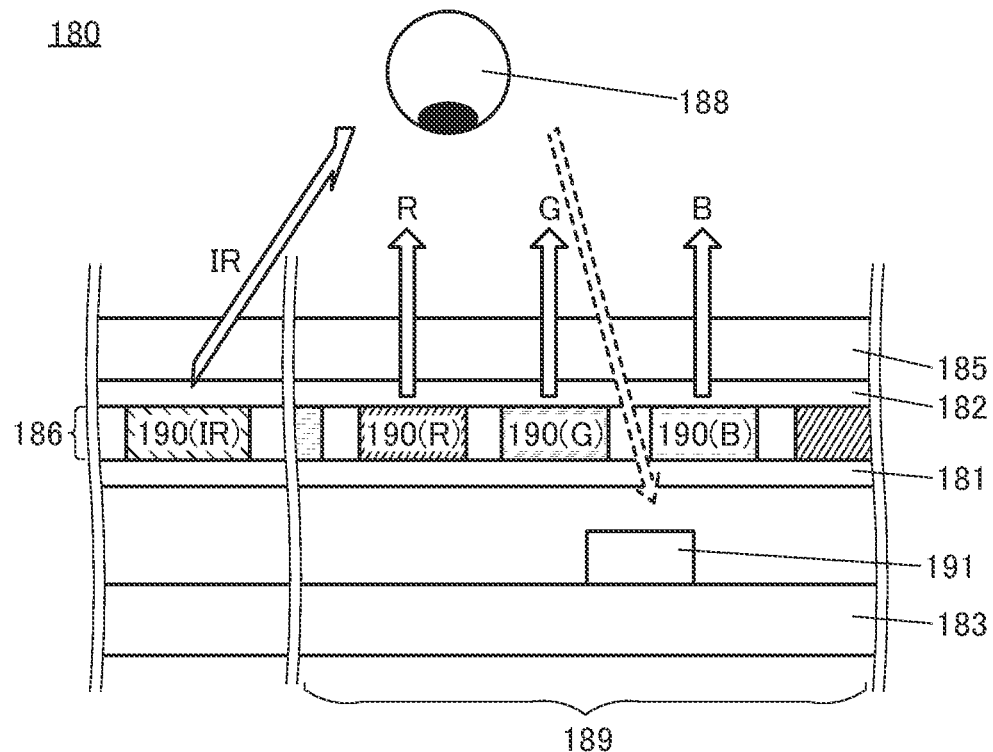
FIG. 14A and FIG. 14B are diagrams each illustrating a structure example of a display apparatus.
Figure 14B:
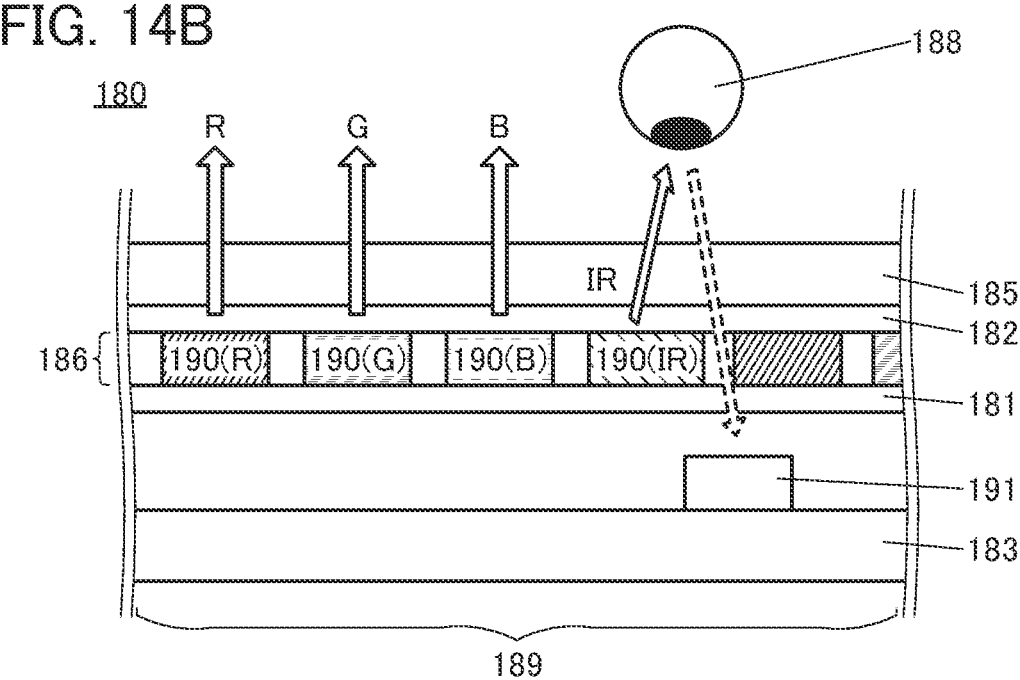

A structure example of a display apparatus included in the electronic device of one embodiment of the present invention is described using a display apparatus 180 illustrated in FIG. 14A and FIG. 14B as an example.

The display apparatus 180 illustrated in FIG. 14A includes a substrate 181, a substrate 182, alight-emitting element 190, and alight-receiving element 191. The light-emitting element 190 includes light-emitting elements (190 (R), 190 (G), and 190 (B)) as display elements and a light-emitting element (190 (IR)) as an infrared light source, and is positioned in a layer 186. The light-receiving element 191 is provided over a support plate 183, the substrate 181 is provided over the light-receiving element 191, the light-emitting element 190 is provided over the substrate 181, the substrate 182 is provided over the light-emitting element 190, and a protective member 185 is provided over the substrate 182.

For example, a structure may be employed where the light-emitting element 190 (R) emitting red light, the light-emitting element 190 (G) emitting green light, the light-emitting element 190 (B) emitting blue light, and the light-emitting element 190 (IR) emitting infrared light are each used as the light-emitting element 190. In this case, the light-emitting elements 190 (R), 190 (G), and 190 (B) function as display elements, and the light-emitting element 190 (IR) functions as an infrared light source. There is no particular limitation on the number of the light-emitting elements 190 (IR), and one or more light-emitting elements 190 (IR) may be included. The light-emitting element 190 is placed in a region interposed between the substrate 181 and the substrate 182. Furthermore, the substrate 181 is placed between the support plate 183 and the light-emitting element 190, and the substrate 182 is placed between the light-emitting element 190 and the protective member 185.

Light emitted from the light-emitting element 190 (IR) preferably includes infrared light, further preferably includes near-infrared light. For example, infrared light having a wavelength greater than or equal to 700 nm, preferably near-infrared light having one or more peaks in the range of a wavelength greater than or equal to 800 nm and less than or equal to 2500 nm can be used.

The light-receiving element 191 has a function of detecting infrared light. The light-receiving element preferably has light sensitivity with respect to infrared light, preferably near-infrared light emitted from the light-emitting element 190 (IR).

As illustrated in FIG. 14A, an image is displayed using light emitted from the light-emitting element 190 (R), the light-emitting element 190 (G), and the light-emitting element 190 (B). In addition, infrared light emitted from the light-emitting element 190 (IR) is reflected by an eyeball 188 of a user and the reflected light is detected by the light-receiving element of the light-receiving element 191, so that gaze sensing is performed. Thus, the substrate 182 and the protective member 185 need to transmit both the visible light from the light-emitting element 190 (R), the light-emitting element 190 (G), and the light-emitting element 190 (B), and the infrared light reflected by the light-emitting element 190 (IR) and the eyeball 188. It is thus preferable that the substrate 182 and the protective member 185 each have a light-transmitting property with respect to visible light and infrared light. Moreover, the infrared light reflected by the eyeball 188 needs to pass through the substrate 181. It is thus preferable that the substrate 181 have a light-transmitting property with respect to at least infrared light.

For each of the substrate 181 and the substrate 182, an insulator such as glass, quartz, ceramics, sapphire, or stabilized zirconia (e.g., yttria-stabilized zirconia), a resin such as an insulating resin or a conductive resin, a semiconductor such as silicon, germanium, silicon carbide, silicon germanium, gallium arsenide, indium phosphide, or zinc oxide, a metal, an alloy, or the like can be used. Note that the substrate on the side where light from the light-emitting element 190 is extracted is formed using a material that transmits the light. When the substrate 181 and the substrate 182 are formed using a flexible material, the display apparatus 180 can have increased flexibility and moreover, the display apparatus 180 can be reduced in weight and thickness. Furthermore, a polarizing plate may be used as the substrate 181 or the substrate 182.

For each of the substrate 181 and the substrate 182, any of the following may be used, for example: polyester resins such as polyethylene terephthalate (PET) and polyethylene naphthalate (PEN), a polyacrylonitrile resin, an acrylic resin, a polyimide resin, a polymethyl methacrylate resin, a polycarbonate (PC) resin, a polyethersulfone (PES) resin, polyamide resins (e.g., nylon and aramid), a polysiloxane resin, a cycloolefin resin, a polystyrene resin, a polyamide-imide resin, a polyurethane resin, a polyvinyl chloride resin, a polyvinylidene chloride resin, a polypropylene resin, a polytetrafluoroethylene (PTFE) resin, an ABS resin, and cellulose nanofiber. Glass that is thin enough to have flexibility may be used for one or both of the substrate 181 and the substrate 182.

Alternatively, one embodiment of the present invention may have a structure illustrated in FIG. 14B. The display apparatus illustrated in FIG. 14B is different from the display apparatus illustrated in FIG. 14A in that the light-emitting element 190 (IR) serving as an infrared light source is provided in a display region 189. Note that the other components are similar to those of the display apparatus illustrated in FIG. 14A and thus, for their details, the above description relating to FIG. 14A or the like can be referred to.

As described above, in the display apparatus 180 illustrated in FIG. 14A and FIG. 14B, the layer 186 where the light-emitting element 190 including the light-emitting element 190 (IR) is positioned is over and overlaps with the light-receiving element 191. In the layer 186 where the light-emitting element 190 is positioned, the light-emitting element 190 is electrically connected to a common electrode in some cases. Thus, without a complicated optical system, the eyeball 188 can be irradiated with light and the light reflected by the eyeball 188 can be received. Furthermore, a distance between the light-emitting element 190 (IR) and the light-receiving element 191 is relatively small. This can increase the detection sensitivity with respect to the reflected light from the eyeball 188. Since the optical system structure can be simplified, the size of the display apparatus can be reduced. Note that part of the light-emitting element 190 (IR) may include a portion overlapping with the light-receiving element 191 or may include no portion overlapping with the light-receiving element 191.

Figure 15A:
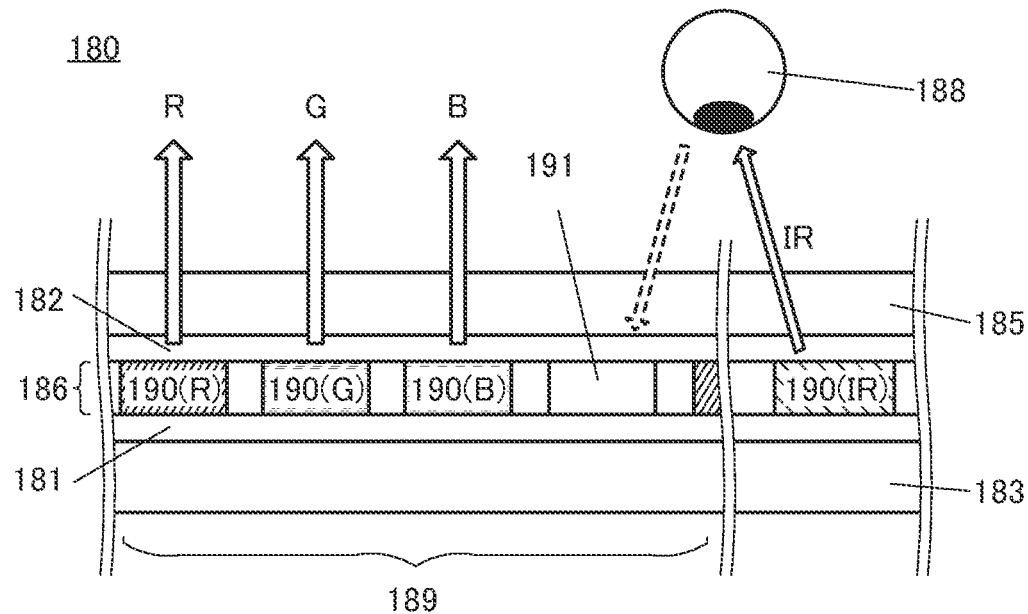
FIG. 15A and FIG. 15B are diagrams each illustrating a structure example of a display apparatus.
Figure 15B:
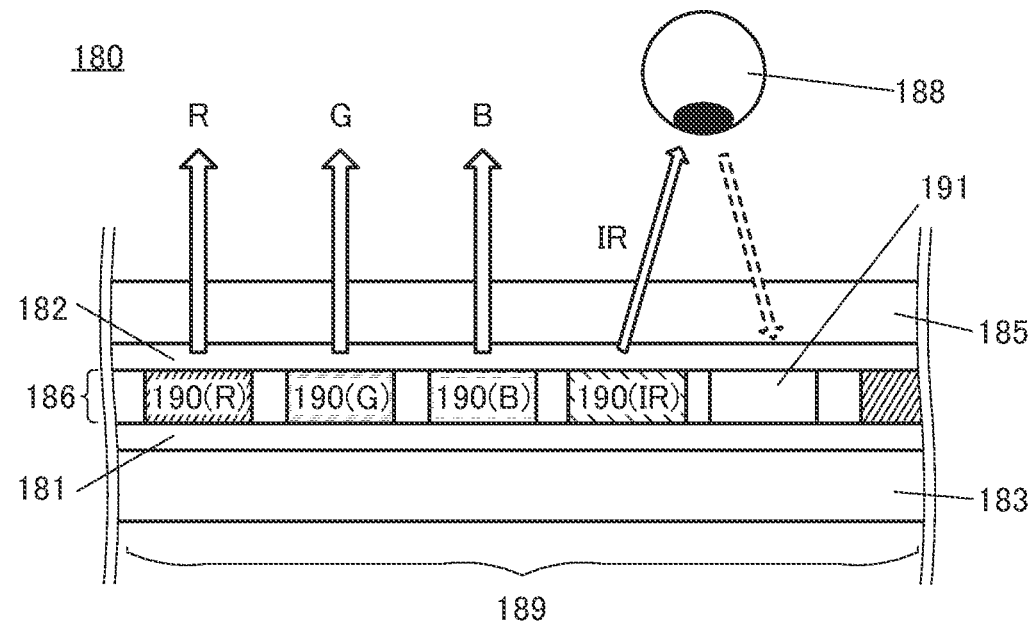

Note that one embodiment of the present invention is not limited thereto, and the light-receiving element 191 may be provided between the substrate 181 and the substrate 182 together with the light-emitting element 190 as illustrated in FIG. 15A and FIG. 15B. Specifically, the display apparatus 180 illustrated in FIG. 15A is different from the display apparatus 180 illustrated in FIG. 14A in that the light-receiving element 191 and the light-emitting element 190 are provided between the substrate 181 and the substrate 182. Furthermore, the display apparatus 180 illustrated in FIG. 15B is different from the display apparatus 180 illustrated in FIG. 14B in that the light-receiving element 191 and the light-emitting element 190 are provided between the substrate 181 and the substrate 182. In each of the display apparatus 180 illustrated in FIG. 15A and FIG. 15B, since the light-receiving element 191 is provided over the substrate 181, the substrate 181 may have a low light-transmitting property with respect to infrared light or does not need to have a light-transmitting property with respect to infrared light in some cases.

Figure 16A:
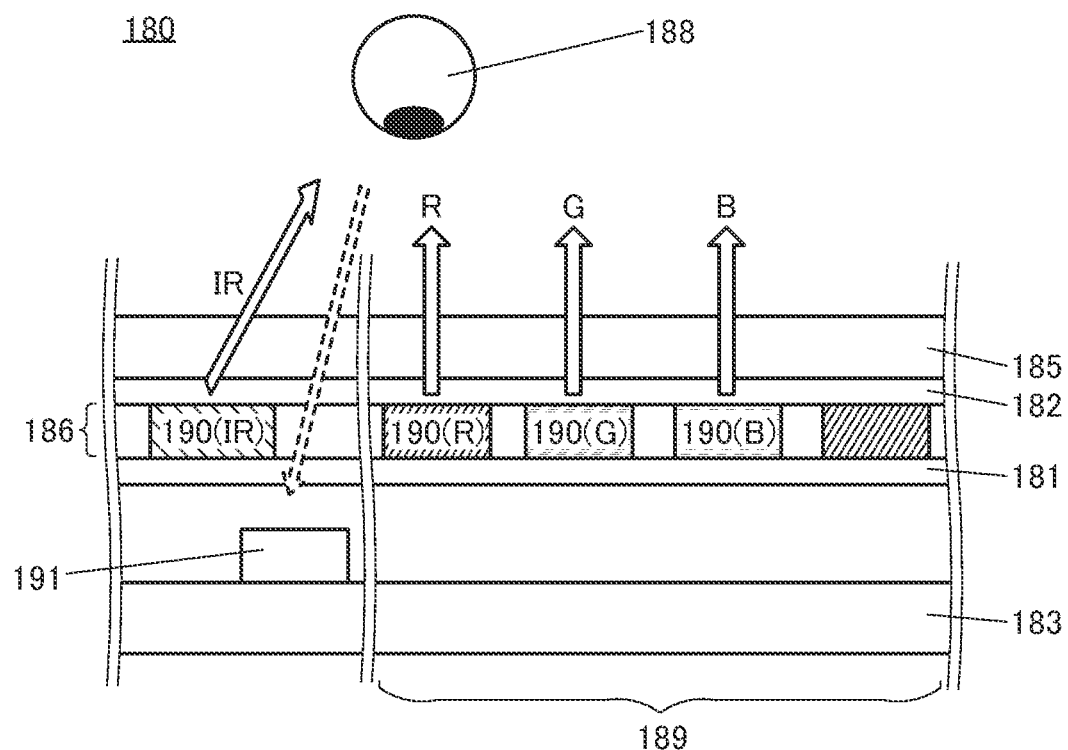
FIG. 16A and FIG. 16B are diagrams each illustrating a structure example of a display apparatus.
Figure 16B:
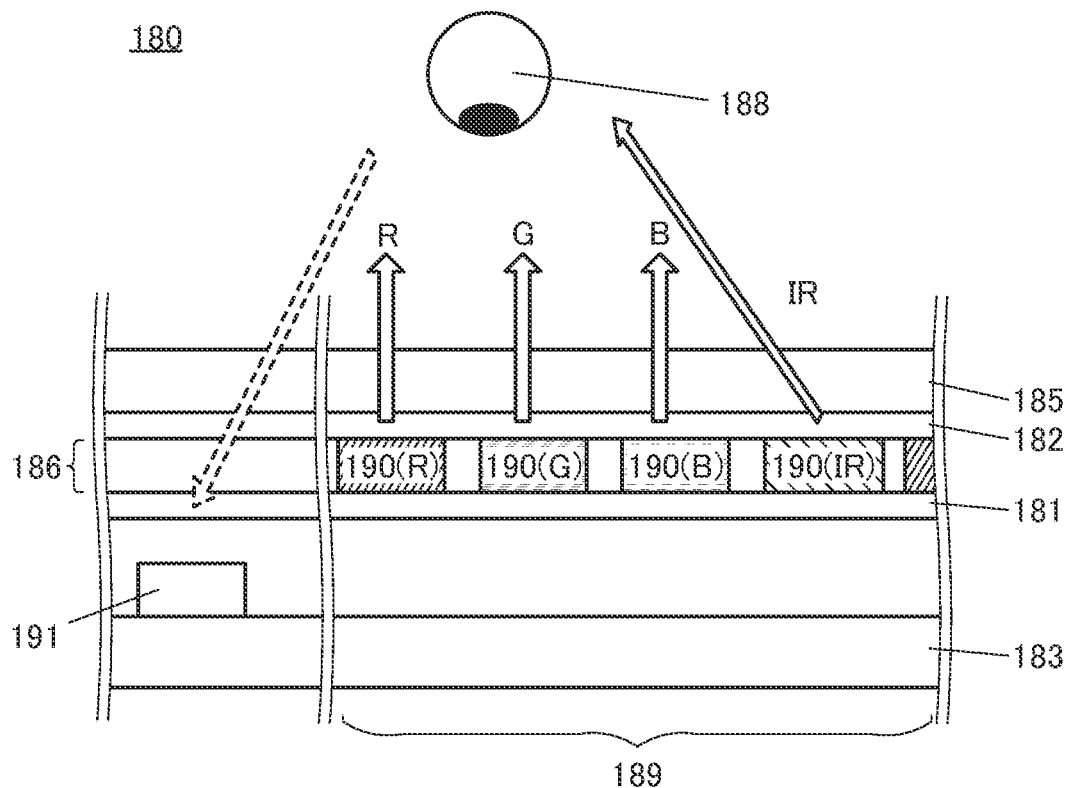
Figure 17A:
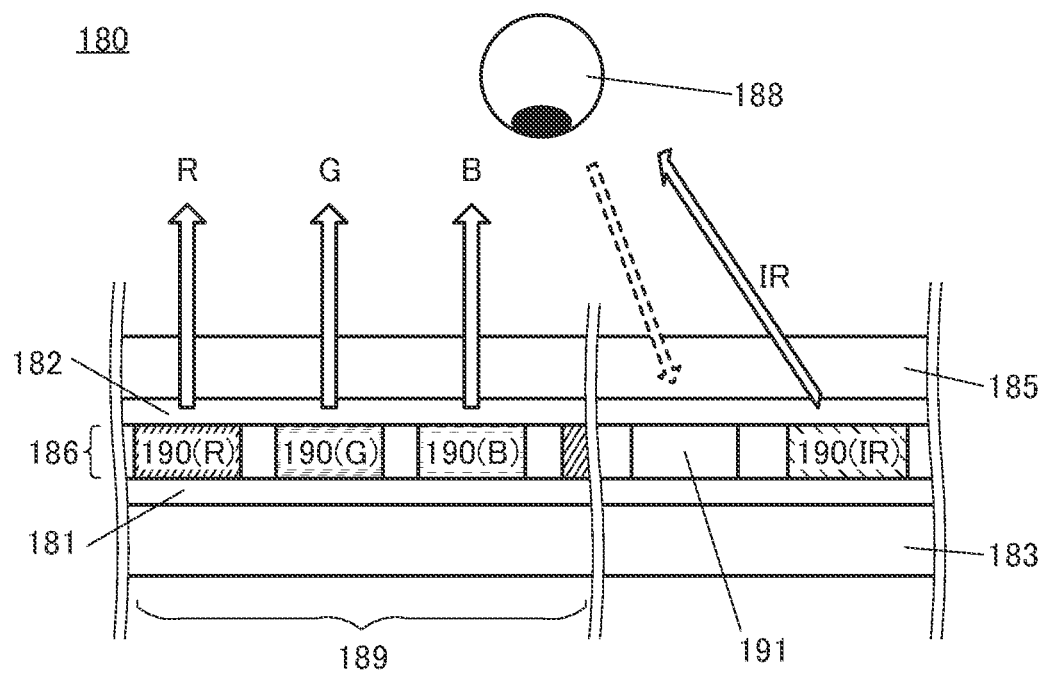
FIG. 17A and FIG. 17B are diagrams each illustrating a structure example of a display apparatus.
Figure 17B:
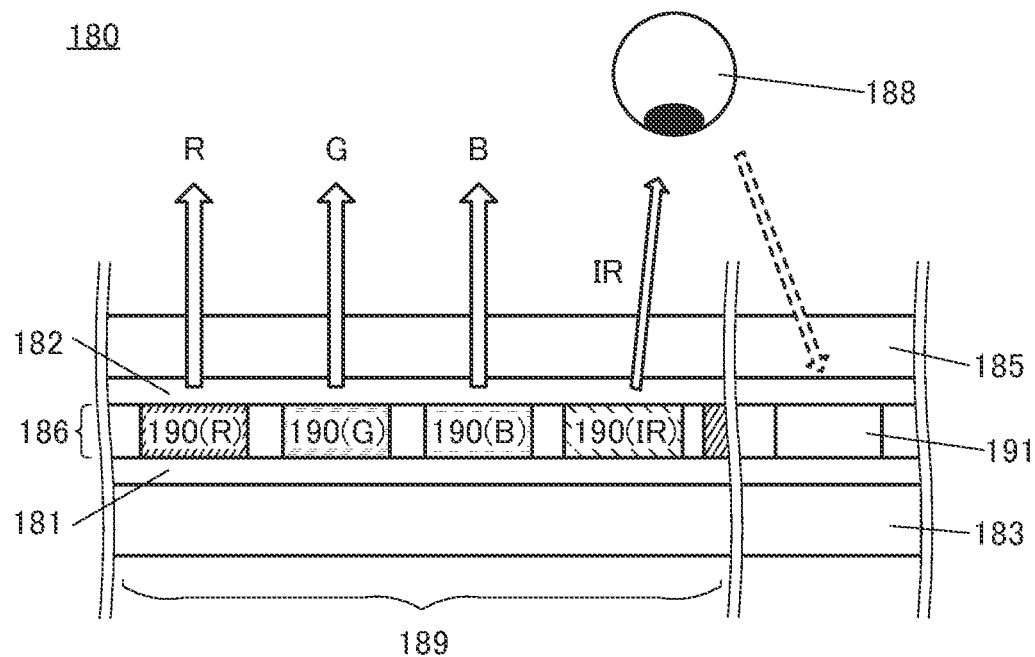

In one embodiment of the present invention, the light-receiving element 191 may be provided outside the pixel portion 189. Specifically, in the display apparatus 180 illustrated in FIG. 16A, the light-receiving element 191 is also provided outside the pixel portion 189 together with the light-emitting element 190 (IR). In the display apparatus 180 illustrated in FIG. 16B, only the light-receiving element 191 is provided outside the pixel portion 189. In the display apparatus 180 illustrated in FIG. 17A, the light-receiving element 191 is also provided outside the pixel portion 189 together with the light-emitting element 190 (IR). In the display apparatus 180 illustrated in FIG. 17B, only the light-receiving element 191 is provided outside the pixel portion 189.

Although a pixel is formed using four kinds of light-emitting elements of the light-emitting element 190 (R) emitting red light, the light-emitting element 190 (G) emitting green light, the light-emitting element 190 (B) emitting blue light, and the light-emitting element 190 (IR) emitting infrared light in the structure described above, one embodiment of the present invention is not limited to this structure. For example, the light-emitting element 190 (R) may emit light having a peak in both the red wavelength range and the infrared wavelength range and a pixel may be formed using three kinds of light-emitting elements of the light-emitting element 190 (R), the light-emitting element 190 (G), and the light-emitting element 190 (B).

Note that in the display apparatus 180 illustrated in each of FIG. 15A, FIG. 15B, FIG. 17A, and FIG. 17B, the support plate 183 is not necessarily provided in some cases.

In the display apparatus 180 illustrated in each of FIG. 14A, FIG. 14B, FIG. 16A, and FIG. 16B, the support plate 183 may be replaced with a substrate and the substrate 181 may be replaced with an insulating layer. In this case, the light-receiving element 191 may be provided over the substrate or formed using the substrate. Furthermore, an insulating layer may be provided over the light-receiving element 191, and the light-emitting element 190 may be provided over the insulating layer. The insulating layer preferably has a light-transmitting property with respect to at least infrared light.

In the display apparatus 180 described above, the protection member 185 does not need to be provided in some cases.

At least part of this embodiment can be implemented in combination with the other embodiments described in this specification and the like as appropriate.

Embodiment 3

In this embodiment, a schematic top view and a cross-sectional schematic view of a light-emitting element included in a display apparatus and its surroundings, a structure example of a light-emitting element, a structure example of a light-emitting element and a light-receiving element, and a structure example of a display apparatus are described.

<Schematic Top View and Cross-Sectional Schematic View of Light-Emitting Element and its Surroundings>

Figure 18A:
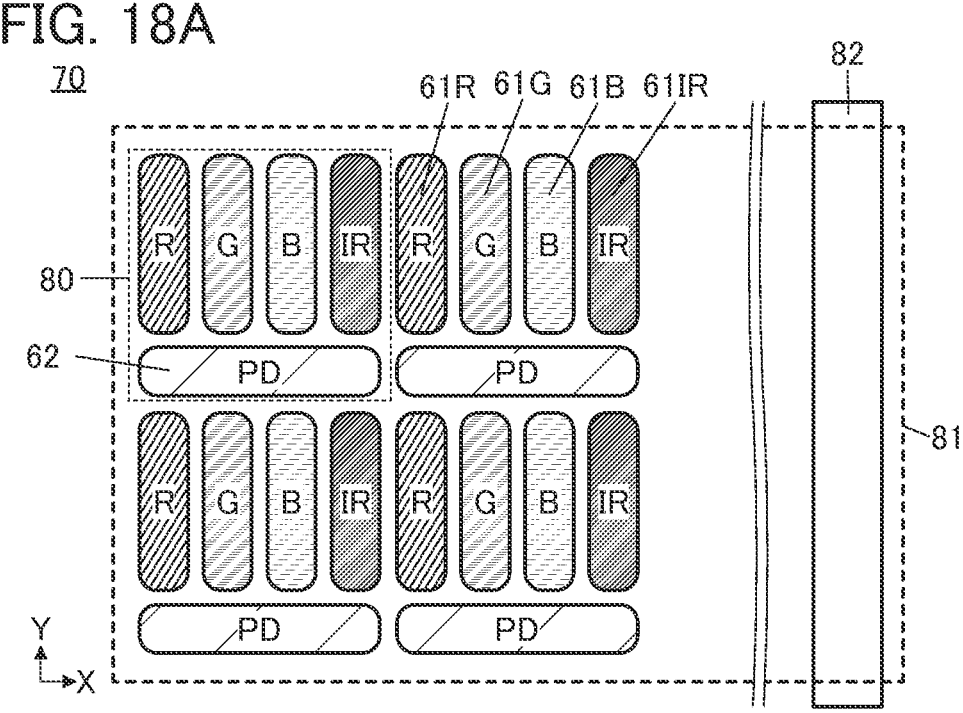
FIG. 18A and FIG. 18B are diagrams each illustrating a structure example of a display apparatus.

FIG. 18A is a schematic top view illustrating a structure example of the case where light-emitting elements and a light-receiving element are arranged in one pixel in a display apparatus 70 of one embodiment of the present invention. The display apparatus 70 includes light-emitting elements 61R that emit red light, light-emitting elements 61G that emit green light, light-emitting elements 61B that emit blue light, light-emitting elements 61IR that emit infrared light, and the light-receiving elements 62.

In the following description common to the light-emitting element 61R, the light-emitting element 61G, the light-emitting element 61B, and the light-emitting element 61IR described later, the alphabets are omitted from the reference numerals and the term "light-emitting element 61" is used in some cases. Alternatively, the light-emitting element 61 refers to one or more of the light-emitting element 61R, the light-emitting element 61G, the light-emitting element 61B, and the light-emitting element 61IR in some cases.

In FIG. 18A, light-emitting regions of the light-emitting elements 61 are denoted by R, G, B, and IR to easily differentiate the light-emitting elements 61. In addition, light-receiving regions of the light-emitting elements 62 are denoted by PD.

The light-emitting elements 61R, the light-emitting elements 61G, the light-emitting elements 61B, the light-emitting elements 61IR, and the light-receiving elements 62 are arranged in a matrix. FIG. 18A illustrates an example where the light-emitting elements 61R, the light-emitting elements 61G, the light-emitting elements 61B, and the light-emitting elements 61IR are arranged in the X direction, and the light-receiving elements 62 are arranged thereunder. FIG. 18A illustrates a structure example where the light-emitting elements 61 that emit light of the same color are arranged in the Y direction intersecting with the X direction. In the display apparatus 70 illustrated in FIG. 18A, a pixel 80 can be composed of a subpixel including the light-emitting element 61R, a subpixel including the light-emitting element 61G, a subpixel including the light-emitting element 61B, and a subpixel including the light-emitting element 61IR, which are arranged in the X direction, and a subpixel including the light-receiving element 62 provided thereunder, for example. The light-receiving element 62 has a function of detecting infrared light.

FIG. 18A illustrates what is called a stripe arrangement, in which the light-emitting elements that exhibit light of the same color are arranged in one direction. Note that the arrangement method of the light-emitting elements is not limited thereto; another arrangement method such as delta arrangement or zigzag arrangement may be used, or PenTile arrangement can be used.

As each of the light-emitting elements 61R, the light-emitting elements 61G, the light-emitting elements 61B, and the light-emitting elements 61IR, an EL element such as an organic light-emitting diode (OLED) or a quantum-dot light-emitting diode (QLED) is preferably used. Examples of a light-emitting substance included in the light-emitting elements include a substance exhibiting fluorescence (a fluorescent material), a substance exhibiting phosphorescence (a phosphorescent material), an inorganic compound (e.g., a quantum dot material), and a substance exhibiting thermally activated delayed fluorescence (a thermally activated delayed fluorescent (TADF) material).

As the light-receiving element 62, a pn photodiode or a pin photodiode can be used, for example. The light-receiving element 62 functions as a photoelectric conversion element that detects light incident on the light-receiving element 62 and generates electric charge. The amount of generated electric in the light-receiving element 62 charge depends on the amount of incident light.

It is particularly preferable to use an organic photodiode including a layer containing an organic compound as the light-receiving element 62. An organic photodiode, which is easily made thin, lightweight, and large in area and has a high degree of freedom for shape and design, can be used in a variety of display apparatuses.

In one embodiment of the present invention, organic EL elements are used as the light-emitting elements 61, and organic photodiodes are used as the light-receiving elements 62. The organic EL elements and the organic photodiodes can be formed over one substrate. Thus, the organic photodiodes can be incorporated in a display apparatus including the organic EL elements.

It is known that in the case where light-emitting layers are separately formed for light-emitting elements that exhibit two different colors, the light-emitting layers are formed by an evaporation method using a shadow mask such as a metal mask or an FMM (a fine metal mask or a high-resolution metal mask). Note that in this specification and the like, the element formed in this manner is referred to as an element with an MM (metal mask) structure in some cases. However, the MM structure of the element causes a deviation from the designed shape and position of an island-shaped organic film due to various influences such as the accuracy of the metal mask, the positional deviation between the metal mask and a substrate, a warp of the metal mask, and the vapor-scattering-induced expansion of the outline of the deposited film, which makes it difficult to achieve high resolution and a high aperture ratio. Thus, a measure has been taken for pseudo improvement in resolution (also referred to as a pixel density) by employing a unique pixel arrangement method such as PenTile arrangement, for example.

For example, a light-emitting layer is processed into a fine pattern without using a shadow mask such as a metal mask or an FMM. Specifically, the light-emitting layer is processed into a fine pattern by a photolithography method. Note that in this specification and the like, an element formed in the above manner is referred to as an element with an MML (metal maskless) structure. The use of the MML structure of the element offers a display apparatus with high resolution and a high aperture ratio, which has been difficult to achieve. Moreover, light-emitting layers can be formed separately, enabling the display apparatus to perform extremely clear display with high contrast and high display quality.

Here, description is made on the case where light-emitting layers in light-emitting elements that exhibit two different colors are separately formed, for simplicity. First, a stack of a first light-emitting film and a first sacrificial film is formed to cover two pixel electrodes. Next, a resist mask is formed in a position overlapping with one pixel electrode (a first pixel electrode) over the first sacrificial film. Then, the resist mask, part of the first sacrificial film, and part of the first light-emitting film are etched. In this case, the etching is stopped when the other pixel electrode (a second pixel electrode) is exposed. Thus, part of the first light-emitting film processed into a belt-like or island shape (also referred to as a first light-emitting layer) can be formed over the first pixel electrode, and part of the sacrificial film (also referred to as a first sacrificial layer) can be formed thereover.

Next, a stack of a second light-emitting film and a second sacrificial film is formed. Then, resist masks are formed in a position overlapping with the first pixel electrode and in a position overlapping with the second pixel electrode. Then, the resist mask, part of the second sacrificial film, and part of the second light-emitting film are etched in a manner similar to the above. As a result, a state in which the first light-emitting layer and the first sacrificial layer are provided over the first pixel electrode, and a second light-emitting layer and a second sacrificial layer are provided over the second pixel electrode is obtained. In this manner, the first light-emitting layer and the second light-emitting layer can be formed separately. Finally, the first sacrificial layer and the second sacrificial layer are removed to expose the first light-emitting layer and the second light-emitting layer and then a common electrode is formed, whereby light-emitting elements that exhibit two different colors can be separately formed.

Furthermore, by repeating the above-described steps, light-emitting layers in light-emitting elements of three or more colors can be separately formed, so that a display apparatus including light-emitting elements of three or four or more colors can be achieved.

Here, an electrode (also referred to as a first electrode, a connection electrode, or the like), which is to supply a potential to the common electrode, can be formed on the same plane as the pixel electrode to be electrically connected to the common electrode. The connection electrode is placed outside a display region in which pixels are provided. Here, in order to prevent the top surface of the connection electrode from being exposed in the etching of the above first light-emitting film, it is preferable that the first sacrificial layer be also provided over the connection electrode. Similarly, the second sacrificial layer is preferably provided over the connection electrode in the etching of the second light-emitting film. The first sacrificial layer and the second sacrificial layer provided over the connection electrode can be removed by etching concurrently with the first sacrificial layer over the first light-emitting layer and the second sacrificial layer over the second light-emitting layer.

A distance between light-emitting layers that exhibit two different colors, which is hard to set to less than 10 µm in the MM structure, for example, can be decreased to less than or equal to 6 µm, less than or equal to 4 µm, less than or equal to 3 µm, less than or equal to 2 µm, or less than or equal to 1 µm in the MML structure. Furthermore, with use of an exposure apparatus for LSI, for example, the distance can be decreased to be less than or equal to 500 nm, less than or equal to 200 nm, less than or equal to 100 nm, or less than or equal to 50 nm. Accordingly, the area of a non-light-emitting region that may exist between two light-emitting elements can be significantly reduced, and the aperture ratio can be close to 100%. For example, the aperture ratio higher than or equal to 50%, higher than or equal to 60%, higher than or equal to 70%, higher than or equal to 80%, or higher than or equal to 90% and lower than 100% can be achieved.

Furthermore, a pattern of the light-emitting layer itself can be made extremely smaller than that in the case of using a metal mask. For example, in the case of using a metal mask for forming light-emitting layers separately, a variation in the thickness of the pattern occurs between the center and the edge of the pattern, causing a reduction in effective area that can be used for a light-emitting region with respect to the entire pattern area. By contrast, in the above fabrication method, a pattern is formed by processing a film formed to have a uniform thickness, which enables a uniform thickness in the pattern; thus, even with a fine pattern, almost the entire area can be used for a light-emitting region. Thus, the above fabrication method makes it possible to achieve both a high resolution and a high aperture ratio.

As described above, with the above fabrication method, a display apparatus in which minute light-emitting elements are integrated can be obtained, and it is not necessary to conduct a pseudo improvement in resolution by employing a unique pixel arrangement such as a PenTile arrangement; thus, the display apparatus can achieve a resolution higher than or equal to 500 ppi, higher than or equal to 1000 ppi, higher than or equal to 2000 ppi, higher than or equal to 3000 ppi, or higher than or equal to 5000 ppi while having what is called a stripe pattern where R, G, and B are arranged in one direction.

FIG. 18A illustrates a common electrode 81 and a connection electrode 82. Here, the connection electrode 82 is electrically connected to the common electrode 81. The connection electrode 82 is provided outside a display region where the light-emitting elements 61 and the light-receiving elements 62 are arranged. In FIG. 18A, the common electrode 81 having a region overlapping with the light-emitting elements 61, the light-receiving elements 62, and the connection electrode 82 is shown by dashed lines.

The connection electrode 82 can be provided along the outer periphery of the display region. For example, the connection electrode 82 may be provided along one side of the outer periphery of the display region or two or more sides of the outer periphery of the display region. That is, the top surface shape of the connection electrode 82 can be a belt-like shape, an L-like shape, a U-like shape (a square bracket shape), a quadrangular shape, or the like in the case where the top surface shape of the display region is a rectangular shape.

Figure 18B:
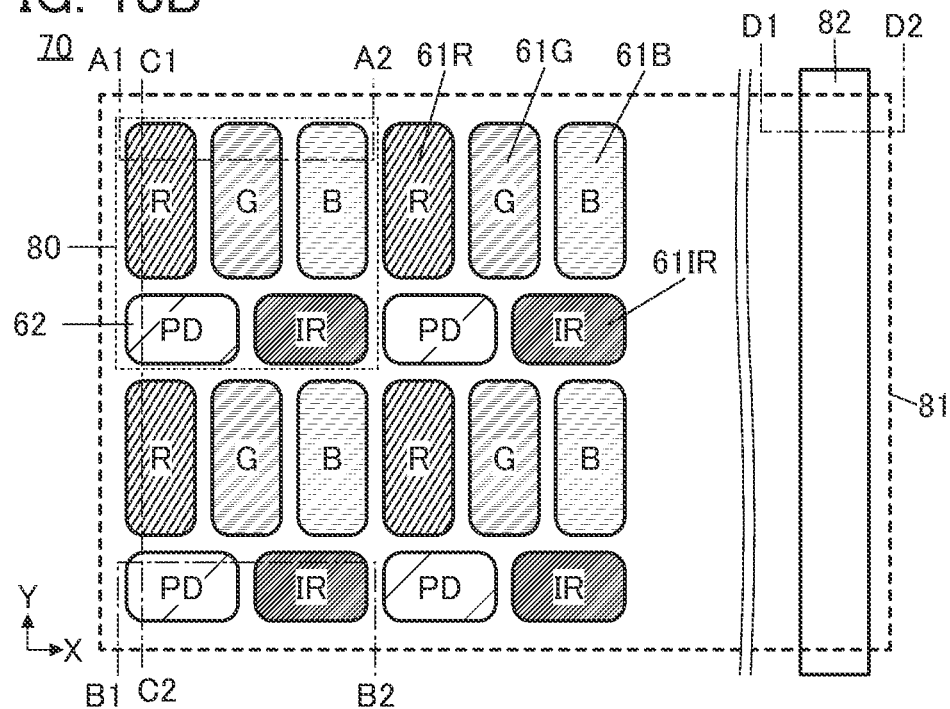

FIG. 18B is a schematic top view illustrating a structure example of the display apparatus 70 and is a modification example of the display apparatus 70 illustrated in FIG. 18A. The display apparatus 70 illustrated in FIG. 18B differs from the display apparatus 70 illustrated in FIG. 18A in that the light-receiving elements 62 and the light-emitting elements 61IR are alternately arranged in the X direction.

In the display apparatus 70 illustrated in FIG. 18B, the light-emitting element 61R, the light-emitting element 61G, and the light-emitting element 61B are arranged in a row different from the row of the light-emitting element 61IR. Thus, the light-emitting element 61R, the light-emitting element 61G, and the light-emitting element 61B can have larger widths (larger lengths in the X direction), so that the luminance of light emitted from the pixel 80 can be increased.

Figure 19A:
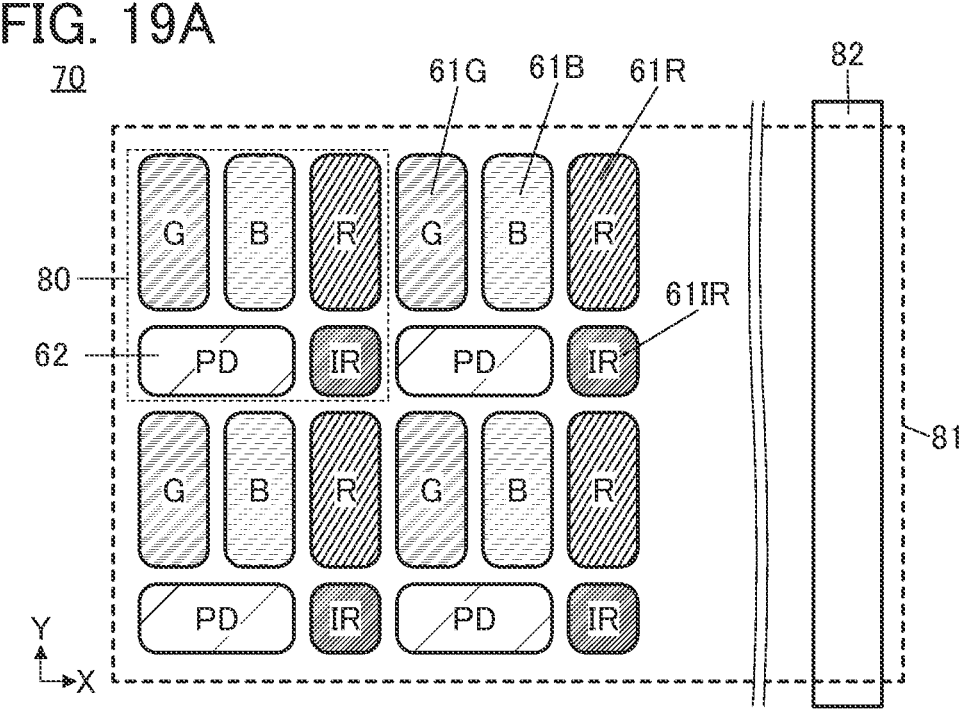
FIG. 19A and FIG. 19B are diagrams each illustrating a structure example of a display apparatus.

FIG. 19A is a schematic top view illustrating a structure example of the display apparatus 70 and is a modification example of the display apparatus 70 illustrated in FIG. 18B. The display apparatus 70 illustrated in FIG. 19A differs from the display apparatus 70 illustrated in FIG. 18B in that the light-emitting elements 61 are arranged in the X direction in the order of G, B, and R instead of the order of R, G, and B. The display apparatus 70 illustrated in FIG. 19A differs from the display apparatus 70 illustrated in FIG. 18B also in that the light-receiving element 62 is provided below the light-emitting element 61G and the light-emitting element 61B and the light-emitting element 61IR is provided below the light-emitting element 61R.

The area occupied by the light-receiving element 62 in the display apparatus 70 illustrated in FIG. 19A is larger than the area occupied by the light-receiving element 62 in the display apparatus 70 illustrated in FIG. 18B. Accordingly, the light detection sensitivity of the light-receiving element 62 can be increased. Thus, in the case where the display apparatus 70 has a gaze sensing function, for example, highly accurate gaze sensing can be performed.

Figure 19B:
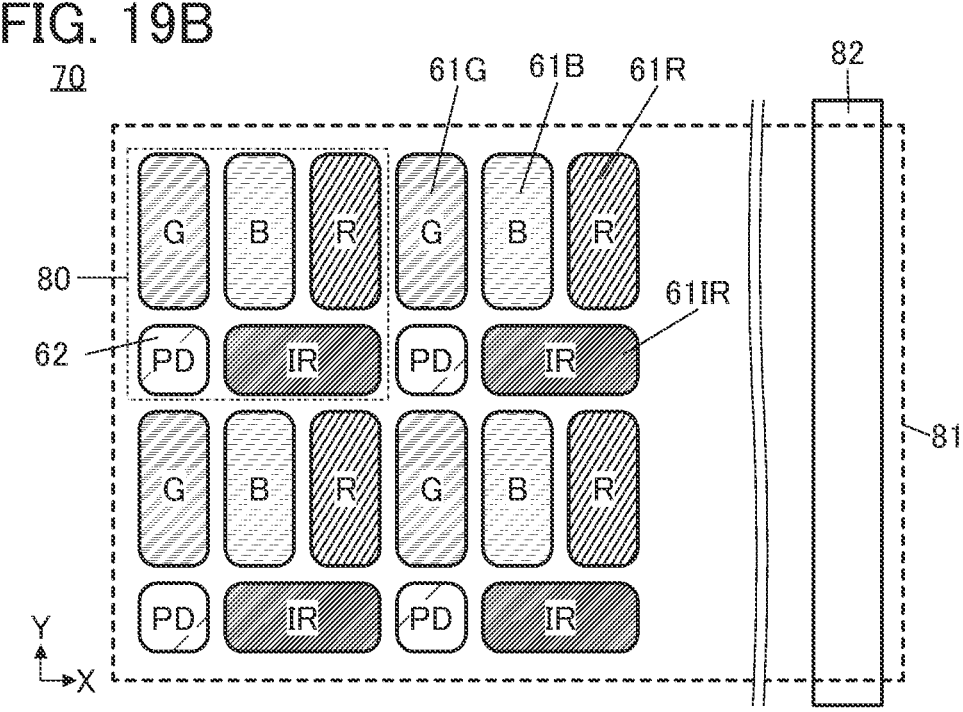

FIG. 19B is a schematic top view illustrating a structure example of the display apparatus 70 and is a modification example of the display apparatus 70 illustrated in FIG. 19A. The display apparatus 70 illustrated in FIG. 19B differs from the display apparatus 70 illustrated in FIG. 19A in that the light-receiving element 62 is provided below the light-emitting element 61G and the light-emitting element 61IR is provided below the light-emitting element 61B and the light-emitting element 61R.

The area occupied by the light-receiving element 62 in the display apparatus 70 illustrated in FIG. 19B is smaller than the area occupied by the light-receiving element 62 in the display apparatus 70 illustrated in FIG. 19A. When the area occupied by the light-receiving element 62 is made small, the light-receiving range of each light-receiving element 62 can be narrowed. It is thus possible to reduce overlap between the light-receiving ranges of different light-receiving elements 62, e.g., adjacent light-receiving elements 62. This can inhibit blurring in an image captured using the light-receiving element 62 and failure in clear image capturing. Accordingly, for example, in the case where the display apparatus 70 has a gaze sensing function, the area occupied by the light-receiving element 62 is preferably reduced because a clear eyeball image can be captured, for example, which leads to higher authentication accuracy.

FIG. 20A is a schematic cross-sectional view taken along the dashed-dotted line A1-A2 in FIG. 18B, and FIG. 20B is a schematic cross-sectional view taken along the dashed-dotted line B1-B2 in FIG. 18B. FIG. 20C is a cross-sectional view taken along dashed-dotted line C1-C2 in FIG. 18B, and FIG. 20D is a cross-sectional view taken along dashed-dotted line D1-D2 in FIG. 18B. The light-emitting elements 61R, the light-emitting elements 61G, the light-emitting elements 61B, the light-emitting elements 61IR, and the light-receiving elements 62 are provided over a substrate 83.

As the substrate 83, a substrate having at least heat resistance high enough to withstand the following heat treatment can be used. In the case where an insulating substrate is used as the substrate 83, a glass substrate, a quartz substrate, a sapphire substrate, a ceramic substrate, an organic resin substrate, or the like can be used. Alternatively, a single crystal semiconductor substrate using silicon or silicon carbide as a material, a polycrystalline semiconductor substrate, a compound semiconductor substrate of silicon germanium or the like, a semiconductor substrate such as an SOI substrate, or the like can be used. Note that a light-transmitting material such as a glass substrate is preferably used for the substrate 83.

As the substrate 83, it is particularly preferable to use the semiconductor substrate or the insulating substrate where a semiconductor circuit including a semiconductor element such as a transistor is formed. The semiconductor circuit preferably forms a pixel circuit, agate line driver circuit (a gate driver), a source line driver circuit (a source driver), or the like. In addition to the above, an arithmetic circuit, a memory circuit, or the like may be formed.

FIG. 20A illustrates a cross-sectional structure example of the light-emitting element 61R, the light-emitting element 61G, and the light-emitting element 61B. The light-emitting element 61R includes a pixel electrode 84R, a hole-injection layer 85R, a hole-transport layer 86R, a light-emitting layer 87R, an electron-transport layer 88R, a common layer 89, and the common electrode 81. The light-emitting element 61G includes a pixel electrode 84G, a hole-injection layer 85G, a hole-transport layer 86G, a light-emitting layer 87G, an electron-transport layer 88G, the common layer 89, and the common electrode 81. The light-emitting element 61B includes a pixel electrode 84B, a hole-injection layer 85B, a hole-transport layer 86B, a light-emitting layer 87B, an electron-transport layer 88B, the common layer 89, and the common electrode 81.

FIG. 20B illustrates a cross-sectional structure example of the light-emitting element 61IR and the light-receiving element 62. The light-emitting element 61IR includes a pixel electrode 84IR, a hole-injection layer 85IR, a hole-transport layer 86IR, alight-emitting layer 87IR, an electron-transport layer 88IR, the common layer 89, and the common electrode 81. The light-receiving element 62 includes a pixel electrode 84PD, a hole-transport layer 86PD, a light-receiving layer 90, an electron-transport layer 88PD, the common layer 89, and the common electrode 81.

In the following description common to the pixel electrode 84R, the pixel electrode 84G, the pixel electrode 84B, the pixel electrode 84IR, and the pixel electrode 84PD, the alphabets are omitted from the reference numerals and the term "pixel electrode 84" is used in some cases. Likewise, in the description common to the hole-injection layer 85R, the hole-injection layer 85G, the hole-injection layer 85B, and the hole-injection layer 85IR, the alphabets are omitted from the reference numerals and the term "hole-injection layer 85" is used in some cases. Likewise, in the description common to the hole-transport layer 86R, the hole-transport layer 86G, the hole-transport layer 86B, the hole-transport layer 86IR, and the hole-transport layer 86PD, the alphabets are omitted from the reference numerals and the term "hole-transport layer 86" is used in some cases. Likewise, in the description common to the light-emitting layer 87R, the light-emitting layer 87G, the light-emitting layer 87B, and the light-emitting layer 87IR, the alphabets are omitted from the reference numerals and the term "light-emitting layer 87" is used in some cases. Likewise, in the description common to the electron-transport layer 88R, the electron-transport layer 88G, the electron-transport layer 88B, the electron-transport layer 88IR, and the electron-transport layer 88PD, the alphabets are omitted from the reference numerals and the term "electron-transport layer 88" is used in some cases.

The common layer 89 has a function of an electron-injection layer in the light-emitting element 61. Meanwhile, the common layer 89 has a function of an electron-transport layer in the light-receiving element 62. Thus, the light-receiving element 62 does not necessarily have to include the electron-transport layer 88PD in some cases.

The hole-injection layer 85, the hole-transport layer 86, the electron-transport layer 88, and the common layer 89 can also be referred to as functional layers. Furthermore, the light-emitting element includes a light-emitting layer between a pair of electrodes. Thus, in the light-emitting element 61 illustrated in FIG. 20A and the like, the hole-injection layer 85, the hole-transport layer 86, the light-emitting layer 87, the electron-transport layer 88, and the common layer 89 can be collectively referred to as a light-emitting layer.

The pixel electrode 84, the hole-injection layer 85, the hole-transport layer 86, the light-emitting layer 87, and the electron-transport layer 88 can each be separately provided for each element. The light-emitting elements 61R, the light-emitting elements 61G, the light-emitting elements 61B, the light-emitting elements 61IR, and the light-receiving elements 62 include the common layer 89 and the common electrode 81 in common.

The light-emitting elements 61 and the light-receiving elements 62 may each include a hole-blocking layer and an electron-blocking layer other than the layers illustrated in FIG. 20A and the like. The light-emitting elements 61 and the light-receiving elements 62 may each include a layer containing a bipolar substance (a substance with a high electron-transport property and a high hole-transport property).

A gap is provided between the common layer 89 and an insulating layer 92. This can inhibit contact between the common layer 89 and each of a side surface of the light-emitting layer 87, a side surface of the light-receiving layer 90, a side surface of the hole-transport layer 86, and a side surface of the hole-injection layer 85. Thus, a short circuit (an electrical short circuit) in the light-emitting elements 61 and a short circuit in the light-receiving elements 62 can be inhibited.

The shorter the distance between the light-emitting layers 87 is, the more easily the gap is formed, for example. For example, when the distance is less than or equal to 1 µm, preferably less than or equal to 500 nm, further preferably less than or equal to 200 nm, less than or equal to 100 nm, less than or equal to 90 nm, less than or equal to 70 nm, less than or equal to 50 nm, less than or equal to 30 nm, less than or equal to 20 nm, less than or equal to 15 nm, or less than or equal to 10 nm, the gap can be favorably formed.

In FIG. 20A and the like, the light-emitting element 61 includes the pixel electrode 84, the hole-injection layer 85, the hole-transport layer 86, the light-emitting layer 87, the electron-transport layer 88, the common layer 89 (electron-injection layer), and the common electrode 81 in this order from the bottom, and the light-receiving element 62 includes the pixel electrode 84PD, the hole-transport layer 86PD, the light-receiving layer 90, the electron-transport layer 88PD, the common layer 89, and the common electrode 81 in this order from the bottom; however, one embodiment of the present invention is not limited thereto. For example, the light-emitting element 61 may include a pixel electrode, an electron-injection layer, an electron-transport layer, a light-emitting layer, a hole-transport layer, a hole-injection layer, and a common electrode in this order from the bottom, and the light-receiving element 62 may include a pixel electrode, an electron-transport layer, a light-receiving layer, a hole-transport layer, and a common electrode in this order from the bottom. In that case, the hole-injection layer included in the light-emitting element 61 can be a common layer, and the common layer can be provided between the hole-transport layer included in the light-receiving element 62 and the common electrode. In addition, the electron-injection layers can be separated between the light-emitting elements 61.

Note that when the MML structure is used for the light-emitting element 61 and the light-receiving element 62, the light-emitting element 61 and the light-receiving element 62 can have different structures. For example, the light-emitting element 61 may include the pixel electrode 84, the hole-injection layer 85, the hole-transport layer 86, the light-emitting layer 87, the electron-transport layer 88, the common layer 89 (electron-injection layer), and the common electrode 81 in this order from the bottom, and the light-receiving element 62 may include the pixel electrode 84PD, the electron-transport layer 88PD, the light-receiving layer 90, the hole-transport layer 86PD, the common layer 89, and the common electrode 81 in this order from the bottom. When this structure is employed, drive voltage for the light-emitting element 61 and drive voltage for the light-receiving element 62 can be in the same direction. Note that in the light-receiving element 62 having the above structure, a hole-injection layer may be provided between the hole-transport layer 86PD and the common layer 89.

Although the electron-transport layer is considered as being provided over the hole-transport layer in the description below, the following description can also be applied to the case where the electron-transport layer is provided under the hole-transport layer, when "electron" is replaced with "hole" and "hole" is replaced with "electron", for example.

The hole-injection layer injects holes from an anode to the hole-transport layer and contains a material with a high hole-injection property. As the material with a high hole-injection property, an aromatic amine compound and a composite material containing a hole-transport material and an acceptor material (electron-accepting material) can be used, for example.

The hole-transport layer is a layer transporting holes, which are injected from the anode by the hole-injection layer, to the light-emitting layer. The hole-transport layer contains a hole-transport material. As the hole-transport material, a substance having a hole mobility greater than or equal to $1\times10^{-6}$ cm$^2$/Vs is preferable. Note that other substances can also be used as long as the substances have a hole-transport property higher than an electron-transport property. As the hole-transport material, materials having a high hole-transport property, such as a π-electron rich heteroaromatic compound (e.g., a carbazole derivative, a thiophene derivative, and a furan derivative) and an aromatic amine (a compound having an aromatic amine skeleton), are preferred.

The electron-transport layer is a layer transporting electrons, which are injected from a cathode by the electron-injection layer, to the light-emitting layer. The electron-transport layer contains an electron-transport material. As the electron-transport material, a substance having an electron mobility greater than or equal to $1\times10^{-6}$ cm$^2$/Vs is preferable. Note that other substances can also be used as long as the substances have an electron-transport property higher than a hole-transport property. As the electron-transport material, any of the following materials having a high electron-transport property can be used, for example: a metal complex having a quinoline skeleton, a metal complex having a benzoquinoline skeleton, a metal complex having an oxazole skeleton, a metal complex having a thiazole skeleton, an oxadiazole derivative, a triazole derivative, an imidazole derivative, an oxazole derivative, a thiazole derivative, a phenanthroline derivative, a quinoline derivative having a quinoline ligand, a benzoquinoline derivative, a quinoxaline derivative, a dibenzoquinoxaline derivative, a pyridine derivative, a bipyridine derivative, a pyrimidine derivative, and a π-electron deficient heteroaromatic compound such as a nitrogen-containing heteroaromatic compound.

The electron-injection layer injects electrons from the cathode to the electron-transport layer and contains a material with a high electron-injection property. As the material with a high electron-injection property, an alkali metal, an alkaline earth metal, or a compound thereof can be used. As the material with a high electron-injection property, a composite material containing an electron-transport material and a donor material (electron-donating material) can also be used.

The electron-injection layer can be formed using an alkali metal, an alkaline earth metal, or a compound thereof, such as lithium, cesium, lithium fluoride (LiF), cesium fluoride (CsF), calcium fluoride (CaF$_2$), 8-(quinolinolato)lithium (abbreviation: Liq), 2-(2-pyridyl)phenolatolithium (abbreviation: LiPP), 2-(2-pyridyl)-3-pyridinolato lithium (abbreviation: LiPPy), 4-phenyl-2-(2-pyridyl)phenolato lithium (abbreviation: LiPPP), lithium oxide (LiOx), or cesium carbonate.

Alternatively, an electron-transport material may be used for the electron-injection layer. For example, a compound having an unshared electron pair and an electron deficient heteroaromatic ring can be used as the electron-transport material. Specifically, a compound with at least one of a pyridine ring, a diazine ring (a pyrimidine ring, a pyrazine ring, and a pyridazine ring), and a triazine ring can be used.

Note that the lowest unoccupied molecular orbital (LUMO) level of the organic compound having an unshared electron pair is preferably greater than or equal to −3.6 eV and less than or equal to −2.3 eV. In general, the highest occupied molecular orbital (HOMO) level and the LUMO level of the organic compound can be estimated by cyclic voltammetry (CV), photoelectron spectroscopy, optical absorption spectroscopy, inverse photoelectron spectroscopy, or the like.

For example, 4,7-diphenyl-1,10-phenanthroline (abbreviation: BPhen), 2,9-di(naphthalen-2-yl)-4,7-diphenyl-1,10-phenanthroline (abbreviation: NBPhen), diquinoxalino[2,3-a:2',3'-c]phenazine (abbreviation: HATNA), 2,4,6-tris[3'-(pyridin-3-yl)biphenyl-3-yl]-1,3,5-triazine (abbreviation: TmPPPyTz), or the like can be used for the organic compound having an unshared electron pair. Note that NBPhen has a higher glass transition point (Tg) than BPhen and thus has high heat resistance.

The light-emitting layer contains a light-emitting substance. The light-emitting layer can contain one or more kinds of light-emitting substances. As the light-emitting substance, a substance whose emission color is blue, violet, bluish violet, green, yellowish green, yellow, orange, red, or the like is appropriately used. Alternatively, as the light-emitting substance, a substance that emits near-infrared light can be used.

Examples of the light-emitting substance include a fluorescent material, a phosphorescent material, a TADF material, and a quantum dot material.

Examples of the fluorescent material include a pyrene derivative, an anthracene derivative, a triphenylene derivative, a fluorene derivative, a carbazole derivative, a dibenzothiophene derivative, a dibenzofuran derivative, a dibenzoquinoxaline derivative, a quinoxaline derivative, a pyridine derivative, a pyrimidine derivative, a phenanthrene derivative, and a naphthalene derivative.

Examples of the phosphorescent material include an organometallic complex (particularly an iridium complex) having a 4H-triazole skeleton, a 1H-triazole skeleton, an imidazole skeleton, a pyrimidine skeleton, a pyrazine skeleton, or a pyridine skeleton, an organometallic complex (particularly an iridium complex) having a phenylpyridine derivative including an electron-withdrawing group as a ligand, a platinum complex, and a rare earth metal complex.

The light-emitting layer may contain one or more kinds of organic compounds (e.g., a host material or an assist material) in addition to the light-emitting substance (guest material). As one or more kinds of organic compounds, one or both of the hole-transport material and the electron-transport material can be used. Alternatively, as one or more kinds of organic compounds, a bipolar material or a TADF material may be used.

The light-emitting layer preferably includes a combination of a hole-transport material and an electron-transport material that easily forms an exciplex and a phosphorescent material, for example. With such a structure, light emission can be efficiently obtained by exciplex-triplet energy transfer (ExTET), which is energy transfer from an exciplex to a light-emitting substance (phosphorescent material). When a combination of materials is selected so as to form an exciplex that exhibits light emission whose wavelength overlaps with the wavelength of a lowest-energy-side absorption band of the light-emitting substance, energy can be transferred smoothly and light emission can be obtained efficiently. With the above structure, high efficiency, low-voltage driving, and a long lifetime of a light-emitting element can be achieved at the same time.

In a combination of materials for forming an exciplex, the highest occupied molecular orbital level (HOMO level) of the hole-transport material is preferably higher than or equal to that of the electron-transport material. The lowest unoccupied molecular orbital level (LUMO level) of the hole-transport material is preferably higher than or equal to that of the electron-transport material. The LUMO levels and the HOMO levels of the materials can be derived from the electrochemical characteristics (the reduction potentials and the oxidation potentials) of the materials that are measured by cyclic voltammetry (CV).

The formation of an exciplex can be confirmed, for example, by a phenomenon in which the emission spectrum of a mixed film in which the hole-transport material and the electron-transport material are mixed is shifted to the longer wavelength side than the emission spectra of each of the hole-transport material and the electron-transport material (or has another peak on the longer wavelength side) observed by comparison of the emission spectra of the hole-transport material, the electron-transport material, and the mixed film of these materials. Alternatively, the formation of an exciplex can be confirmed by a difference in transient response, such as a phenomenon in which the transient photoluminescence (PL) lifetime of the mixed film has longer lifetime components or has a larger proportion of delayed components than that of each of the hole-transport material and the electron-transport material, observed by comparison of transient PL of the hole-transport material, the electron-transport material, and the mixed film of these materials. The transient PL can be rephrased as transient electroluminescence (EL). That is, the formation of an exciplex can also be confirmed by a difference in transient response observed by comparison of the transient EL of the hole-transport material, the electron-transport material, and the mixed film of the materials.

The light-emitting layer 87R of the light-emitting element 61R includes at least a light-emitting organic compound that emits light with an intensity in a red wavelength range. The light-emitting layer 87G of the light-emitting element 61G includes at least a light-emitting organic compound that emits light with an intensity in a green wavelength range. The light-emitting layer 87B of the light-emitting element 61B includes at least a light-emitting organic compound that emits light with an intensity in a blue wavelength range. The light-emitting layer 87IR of the light-emitting element 61IR includes at least a light-emitting organic compound that emits light with an intensity in a wavelength range of infrared light. The light-receiving layer 90 of the light-receiving element 62 includes an organic compound having detection sensitivity in a wavelength range of infrared light, for example.

A conductive film that transmits visible light is used for either the pixel electrode 84 or the common electrode 81, and a reflective conductive film is used for the other. When the pixel electrode 84 has a light-transmitting property and the common electrode 81 has a light-reflecting property, the display apparatus 70 can have a bottom emission structure. When the pixel electrode 84 has a light-reflecting property and the common electrode 81 has a light-transmitting property, the display apparatus 70 can have a top emission structure. When both the pixel electrode 84 and the common electrode 81 transmit light, the display apparatus 70 can have a dual-emission structure.

The light-emitting element 61 preferably has a micro-optical resonator (microcavity) structure. In that case, light emitted from the light-emitting layer 87 can be resonated between the pixel electrode 84 and the common electrode 81, so that light emitted from the light-emitting element 61 can be intensified.

In the case where the light-emitting element 61 has a microcavity structure, one of the common electrode 81 and the pixel electrode 84 is preferably an electrode having both a light-transmitting property and a light-reflecting property (transflective electrode), and the other of the common electrode 81 and the pixel electrode 84 is preferably a reflective electrode.

The light-emitting layer 87IR of the light-emitting element 61IR emitting light whose wavelength is the longest is made to have the largest thickness, the light-emitting layer 87R of the light-emitting element 61R emitting light whose wavelength is the second longest is made to have the second largest thickness, the light-emitting layer 87G of the light-emitting element 61G emitting light whose wavelength is the third longest is made to have the third largest thickness, and the light-emitting layer 87B of the light-emitting element 61B emitting light whose wavelength is the shortest is made to have the smallest thickness; whereby, the light-emitting element 61 can have a microcavity structure. Without limitation to this, the thickness of each light-emitting layer can be adjusted in consideration of the wavelength of light emitted from the light-emitting element, the optical characteristics of the layer included in the light-emitting element, the electrical characteristics of the light-emitting element, and the like.

The transparent electrode has a light transmittance higher than or equal to 40%. For example, an electrode having a visible light (light with a wavelength greater than or equal to 400 nm and less than 750 nm) transmittance higher than or equal to 40% is preferably used in the light-emitting elements 61. The visible light reflectivity of the transflective electrode is higher than or equal to 10% and lower than or equal to 95%, preferably higher than or equal to 30% and lower than or equal to 80%. The visible light reflectivity of the reflective electrode is higher than or equal to 40% and lower than or equal to 100%, preferably higher than or equal to 70% and lower than or equal to 100%. These electrodes preferably have a resistivity of $1\times10^{-2}$ $\Omega$cm or lower. Note that in the case where a light-emitting element that emits near-infrared light is used in the display apparatus, the near-infrared light (light with a wavelength greater than or equal to 750 nm and less than or equal to 1300 nm) transmittance and reflectivity of these electrodes are preferably in the above numerical ranges.

The insulating layer 92 is provided so as to cover end portions of the pixel electrode 84R, end portions of the pixel electrode 84G, end portions of the pixel electrode 84B, end portions of the pixel electrode 84IR, and end portions of the pixel electrode 84PD. End portions of the insulating layer 92 are preferably tapered. The insulating layer 92 is not necessarily provided.

For example, the hole-injection layer 85R, the hole-injection layer 85G, the hole-injection layer 85B, the hole-injection layer 85IR, and the hole-transport layer 86PD each include a region in contact with the top surface of the pixel electrode 84 and a region in contact with a surface of the insulating layer 92. In addition, end portions of the hole-injection layer 85R, end portions of the hole-injection layer 85G, end portions of the hole-injection layer 85B, end portions of the hole-injection layer 85IR, and end portions of the hole-transport layer 86PD are positioned over the insulating layer 92.

As illustrated in FIG. 20A, a gap is provided between the light-emitting elements 61 that emit light of different colors, for example, between two light-emitting layers 87. In this manner, it is preferable that the light-emitting layer 87R, the light-emitting layer 87G, and the light-emitting layer 87B be provided such that they are not in contact with each other, for example. This favorably prevents unintentional light emission from being caused by a current flowing through adjacent two light-emitting layers 87. Thus, the contrast of the display apparatus 70 can be increased, so that the display quality of the display apparatus 70 can be improved.

A protective layer 91 is provided over the common electrode 81. The protective layer 91 has a function of preventing diffusion of impurities such as water into each light-emitting element from the above.

The protective layer 91 can have, for example, a single-layer structure or a stacked-layer structure at least including an inorganic insulating film. Examples of the inorganic insulating film include an oxide film or a nitride film such as a silicon oxide film, a silicon oxynitride film, a silicon nitride oxide film, a silicon nitride film, an aluminum oxide film, an aluminum oxynitride film, or a hafnium oxide film. Alternatively, a semiconductor material such as an indium gallium oxide, an indium gallium zinc oxide, or the like may be used for the protective layer 91.

Note that in this specification and the like, a silicon oxynitride film refers to a film that contains more oxygen than nitrogen in its composition. A silicon oxynitride film refers to a film that contains more nitrogen than oxygen in its composition.

A stack of an inorganic insulating film and an organic insulating film can be used as the protective layer 91. For example, a structure where an organic insulating film is provided between a pair of inorganic insulating films is preferably employed. Furthermore, an organic insulating film preferably functions as a planarization film. This planarizes the top surface of the organic insulating film, resulting in improved coverage with an inorganic insulating film thereover and an enhanced barrier property. The top surface of the protective layer 91 is flat, which is preferable because the influence of an uneven shape due to a structure below the protective layer 91 can be reduced in the case where a structure (e.g., a color filter, an electrode of a touch sensor, or a lens array) is provided above the protective layer 91.

FIG. 20C illustrates a cross-sectional structure example of the display apparatus 70 in the Y direction, specifically, a cross-sectional structure example of the light-emitting element 61R and the light-receiving element 62. The light-emitting element 61G, the light-emitting element 61B, and the light-emitting element 61IR can be arranged in the Y direction like the light-emitting element 61R.

FIG. 20D illustrates a connection portion 93 where the connection electrode 82 and the common electrode 81 are electrically connected to each other. In the connection portion 93, the common electrode 81 is provided on and in contact with the connection electrode 82, and the protective layer 91 is provided so as to cover the common electrode 81. The insulating layer 92 is provided so as to cover end portions of the connection electrode 82.

FIG. 20A to FIG. 20C illustrate a structure in which the insulating layer 92 is provided to cover the end portions of the pixel electrode 84R, the end portions of the pixel electrode 84G, the end portions of the pixel electrode 84B, and the end portions of the pixel electrode 84PD; however, one embodiment of the present invention is not limited to this structure. A structure without the insulating layer 92 as illustrated in FIG. 20E may be employed.

An insulating layer may be provided in the region between adjacent light-emitting elements 61 and the region between the light-emitting element 61 and the light-receiving element 62 which are adjacent to each other. FIG. 20E is a schematic cross-sectional view taken along the dashed-dotted line A1-A2 in FIG. 18B. In FIG. 20E, an insulating layer 94 and an insulating layer 96 are provided in such regions.

The insulating layers 94 and the insulating layers 96 cover the side surfaces of the pixel electrode 84R, the pixel electrode 84G, the pixel electrode 84B, the hole-injection layer 85R, the hole-injection layer 85G, the hole-injection layer 85B, the hole-transport layer 86R, the hole-transport layer 86G, the hole-transport layer 86B, the light-emitting layer 87R, the light-emitting layer 87G, the light-emitting layer 87B, the electron-transport layer 88R, the electron-transport layer 88G, and the electron-transport layer 88B. The common layer 89 is provided over the electron-transport layer 88R, the electron-transport layer 88G, the electron-transport layer 88B, the insulating layers 94, and the insulating layers 96. The common electrode 81 is provided over the common layer 89.

The above structure can inhibit contact of the common layer 89 (or the common electrode 81) with the side surface of any of the pixel electrode 84R, the pixel electrode 84G, the pixel electrode 84B, the light-emitting layer 87R, the light-emitting layer 87G, and the light-emitting layer 87B and can inhibit a short circuit (an electrical short circuit) between the light-emitting elements.

The insulating layers 94 preferably cover at least the side surfaces of the pixel electrode 84R, the pixel electrode 84G, and the pixel electrode 84B. Moreover, the insulating layers 94 preferably cover the side surfaces of the hole-injection layer 85R, the hole-injection layer 85G, the hole-injection layer 85B, the hole-transport layer 86R, the hole-transport layer 86G, the hole-transport layer 86B, the light-emitting layer 87R, the light-emitting layer 87G, the light-emitting layer 87B, the electron-transport layer 88R, the electron-transport layer 88G, and the electron-transport layer 88B. The insulating layers 94 can be in contact with the side surfaces of the pixel electrode 84R, the pixel electrode 84G, the pixel electrode 84B, the hole-injection layer 85R, the hole-injection layer 85G, the hole-injection layer 85B, the hole-transport layer 86R, the hole-transport layer 86G, the hole-transport layer 86B, the light-emitting layer 87R, the light-emitting layer 87G, the light-emitting layer 87B, the electron-transport layer 88R, the electron-transport layer 88G, and the electron-transport layer 88B.

The insulating layers 96 are provided over the insulating layers 94 to fill depressed portions formed in the insulating layers 94. The insulating layers 96 can overlap with the side surfaces of the pixel electrode 84R, the pixel electrode 84G, the pixel electrode 84B, the hole-injection layer 85R, the hole-injection layer 85G, the hole-injection layer 85B, the hole-transport layer 86R, the hole-transport layer 86G, the hole-transport layer 86B, the light-emitting layer 87R, the light-emitting layer 87G, the light-emitting layer 87B, the electron-transport layer 88R, the electron-transport layer 88G, and the electron-transport layer 88B, with the insulating layers 94 provided between the insulating layers 96 and the side surfaces.

Note that one of the insulating layer 94 and the insulating layer 96 is not necessarily provided. In the case where the insulating layers 94 are not provided, the insulating layers 96 can be in contact with the side surfaces of the light-emitting layer 87R, the light-emitting layer 87G, and the light-emitting layer 87B. In addition, the display apparatus may include an insulating layer covering an end portion of the pixel electrode. In this case, the insulating layers 94 and/or the insulating layers 96 may be provided over the insulating layer.

The common layer 89 and the common electrode 81 are provided over the electron-transport layer 88R, the electron-transport layer 88G, the electron-transport layer 88B, the insulating layers 94, and the insulating layers 96. Before the insulating layers 94 and the insulating layers 96 are provided, a step is generated due to a difference between a region where the pixel electrode and the light-emitting layer are provided and a region where neither the pixel electrode nor the light-emitting layer is provided (region between the light-emitting elements). In the display apparatus of one embodiment of the present invention, the step can be planarized with the insulating layers 94 and the insulating layers 96, and the coverage with the common layer 89 and the common electrode 81 can be improved. Thus, connection defects caused by step disconnection can be inhibited. Alternatively, it is possible to inhibit an increase in electric resistance due to local thinning of the common electrode 81 by the step.

To improve the planarity of the formation surface of the common layer 89 and the common electrode 81, the top surfaces of the insulating layers 94 and the top surfaces of the insulating layers 96 are preferably level or substantially level with the top surface of at least one of the electron-transport layer 88R, the electron-transport layer 88G, and the electron-transport layer 88B. Although the top surface of the insulating layer 96 preferably has a flat surface, a projection or a depressed portion may be provided.

The insulating layers 94 have regions in contact with the side surfaces of the light-emitting layer 87R, the light-emitting layer 87G, and the light-emitting layer 87B and function as protective insulating layers for the light-emitting layer 87R, the light-emitting layer 87G, and the light-emitting layer 87B. Providing the insulating layers 94 can inhibit entry of impurities (e.g., oxygen and moisture) through the side surfaces of the light-emitting layer 87R, the light-emitting layer 87G, and the light-emitting layer 87B, whereby the display apparatus can have high reliability.

When the insulating layers 94 have large widths (thicknesses) in the regions in contact with the side surfaces of the light-emitting layer 87R, the light-emitting layer 87G, and the light-emitting layer 87B in a cross-sectional view, the gaps between the light-emitting layer 87R, the light-emitting layer 87G, and the light-emitting layer 87B increase to cause a reduction in the aperture ratio in some cases. When the insulating layers 94 have small widths (thicknesses) in the regions in contact with the side surfaces of the light-emitting layer 87R, the light-emitting layer 87G, and the light-emitting layer 87B in a cross-sectional view, entry of impurities through the side surfaces of the light-emitting layer 87R, the light-emitting layer 87G, and the light-emitting layer 87B cannot be effectively inhibited in some cases. The width (thickness) of the insulating layer 94 in the region in contact with the side surfaces of the light-emitting layer 87R, the light-emitting layer 87G, and the light-emitting layer 87B in a cross-sectional view, is preferably greater than or equal to 3 nm and less than or equal to 200 nm, further preferably greater than or equal to 3 nm and less than or equal to 150 nm, further preferably greater than or equal to 5 nm and less than or equal to 150 nm, still further preferably greater than or equal to 5 nm and less than or equal to 100 nm, still further preferably greater than or equal to 10 nm and less than or equal to 100 nm, yet further preferably greater than or equal to 10 nm and less than or equal to 50 nm. When the width (thickness) of the insulating layer 94 is within the above-described range, a highly reliable display apparatus with a high aperture ratio can be obtained.

The insulating layer 94 can be an insulating layer containing an inorganic material. As the insulating layer 94, an inorganic insulating film such as an oxide insulating film, a nitride insulating film, an oxynitride insulating film, or a nitride oxide insulating film can be used, for example. The inorganic insulating layer 94 can have either a single-layer structure or a stacked-layer structure. Examples of the oxide insulating film include a silicon oxide film, an aluminum oxide film, a magnesium oxide film, an indium gallium zinc oxide film, a gallium oxide film, a germanium oxide film, an yttrium oxide film, a zirconium oxide film, a lanthanum oxide film, a neodymium oxide film, a hafnium oxide film, and a tantalum oxide film. Examples of the nitride insulating film include a silicon nitride film and an aluminum nitride film. Examples of the oxynitride insulating film include a silicon oxynitride film and an aluminum oxynitride film. Examples of the nitride oxide insulating film include a silicon nitride oxide film and an aluminum nitride oxide film. In particular, aluminum oxide is preferable because it has high selectivity with respect to the light-emitting layer in etching and has a function of protecting the light-emitting layer in forming the insulating layer 96 which is to be described later. In particular, an inorganic insulating film such as an aluminum oxide film, a hafnium oxide film, a silicon oxide film, or the like formed by an ALD method is used as the insulating layer 94, whereby the insulating layer 94 can have few pinholes and an excellent function of protecting the light-emitting layer.

Note that in this specification and the like, oxynitride refers to a material that contains more oxygen than nitrogen in its composition, and nitride oxide refers to a material that contains more nitrogen than oxygen in its composition. For example, in the case where silicon oxynitride is described, it refers to a material that contains more oxygen than nitrogen in its composition. In the case where silicon nitride oxide is described, it refers to a material that contains more nitrogen than oxygen in its composition.

The insulating layer 94 can be formed by a sputtering method, a CVD method, a PLD method, an ALD method, or the like. The insulating layer 94 is preferably formed by an ALD method achieving good coverage.

The insulating layer 96 provided over the insulating layer 94 has a function of filling the depressed portion of the insulating layer 94, which is formed between the adjacent light-emitting devices. In other words, the insulating layer 96 has an effect of improving the planarity of the formation surface of the common electrode 81. An insulating layer containing an organic material can be suitably used for the insulating layer 96. For the insulating layer 96, an acrylic resin, a polyimide resin, an epoxy resin, an imide resin, a polyamide resin, a polyimide-amide resin, a silicone resin, a siloxane resin, a benzocyclobutene-based resin, a phenol resin, a precursor of any of these resins, or the like can be used, for example. For the insulating layer 96, an organic material such as polyvinyl alcohol (PVA), polyvinylbutyral, polyvinylpyrrolidone, polyethylene glycol, polyglycerin, pullulan, water-soluble cellulose, or an alcohol-soluble polyamide resin can be used. Alternatively, a photosensitive resin (also referred to as an organic resin) can be used as the insulating layer 96. A photoresist may be used for the photosensitive resin. As the photosensitive resin, a positive photosensitive material or a negative photosensitive material can be used.

The difference between the level of the top surface of the insulating layer 96 and the level of the top surface of any of the light-emitting layer 87R, the light-emitting layer 87G, and the light-emitting layer 87B is preferably less than or equal to 0.5 times the thickness of the insulating layer 96, further preferably less than or equal to 0.3 times the thickness of the insulating layer 96, for example. The insulating layer 96 may be provided such that the level of the top surface of any of the light-emitting layer 87R, the light-emitting layer 87G, and the light-emitting layer 87B is higher than the level of the top surface of the insulating layer 96, for example. Alternatively, for example, the insulating layer 96 may be provided such that the level of the top surface of the insulating layer 96 is higher than the level of the top surface of any of the light-emitting layer 87R, the light-emitting layer 87G, and the light-emitting layer 87B.

In the display apparatus 70, the pixel 80 is formed of the subpixel including the light-emitting element 61R, the subpixel including the light-emitting element 61G, the subpixel including the light-emitting element 61B, the subpixel including the light-emitting element 61IR, and the subpixel including the light-receiving element 62; however, one embodiment of the present invention is not limited to this structure. A display apparatus different from the display apparatus 70 illustrated in FIG. 18A and the like is illustrated in FIG. 21A, FIG. 21B, FIG. 22A, FIG. 22B, FIG. 23A, and FIG. 23B.

The display apparatus 70 illustrated in FIG. 21A is different from the display apparatus 70 illustrated in FIG. 18A in that the pixel 80 is formed of the subpixel including the light-emitting element 61R, the subpixel including the light-emitting element 61G, the subpixel including the light-emitting element 61B, and the subpixel including the light-receiving element 62. In this case, the light-emitting element 61IR is preferably provided between a display region 95 and the connection electrode 82. Alternatively, the light-emitting element 61IR may be provided along the outer periphery of the display region 95 and the connection electrode 82 as illustrated in FIG. 21B. With this structure, the area occupied by the light-receiving element 62 in the display apparatus 70 can be made larger, and the light detection sensitivity of the light-receiving element 62 can be increased.

In the display apparatus 70 illustrated in FIG. 21A, the light-emitting element 61IR can be provided along the outer periphery of the display region 95. For example, the light-emitting element 61IR may be provided along one side of the outer periphery of the display region 95 or two or more sides of the outer periphery of the display region 95. That is, in the case where the display region 95 has a rectangular top surface, the arrangement of the light-emitting elements 61IR in a top view can have a belt-like shape, an L-like shape, a U-like shape (a square bracket shape), a quadrangular shape, or the like.

In the display apparatus 70 illustrated in FIG. 21B, the light-emitting element 61IR can be provided along the outer periphery of the connection electrode 82. For example, the light-emitting element 61IR may be provided along one side of the outer periphery of the connection electrode 82 or two or more sides of the outer periphery of the connection electrode 82. That is, in the case where the connection electrode 82 has a rectangular top surface, the light-emitting elements 61IR in a top view can be arranged in a belt-like shape, an L-like shape, a U-like shape (a square bracket shape), a quadrangular shape, or the like.

Although FIG. 21A and FIG. 21B illustrate examples in which the width of the light-emitting element 61IR in the Y direction is substantially the same as the width of the pixel 80 in the Y direction, one embodiment of the present invention is not limited to these examples. The width of the light-emitting element 61IR in the Y direction may be larger or smaller than the width of the pixel 80 in the Y direction. Although FIG. 21A and FIG. 21B illustrate examples in which the number of the light-emitting elements 61IR is the same as that of the pixels 80 in the Y direction, one embodiment of the present invention is not limited to the examples. The number of the light-emitting elements 61IR in the Y direction may be different from that of the pixels 80 in the Y direction and may be one or more. Although FIG. 21A and FIG. 21B illustrate examples in which the number of the light-emitting elements 61IR in the X direction is one, one embodiment of the present invention is not limited to these examples. The number of the light-emitting elements 61IR in the X direction may be two or more.

Figure 22A:
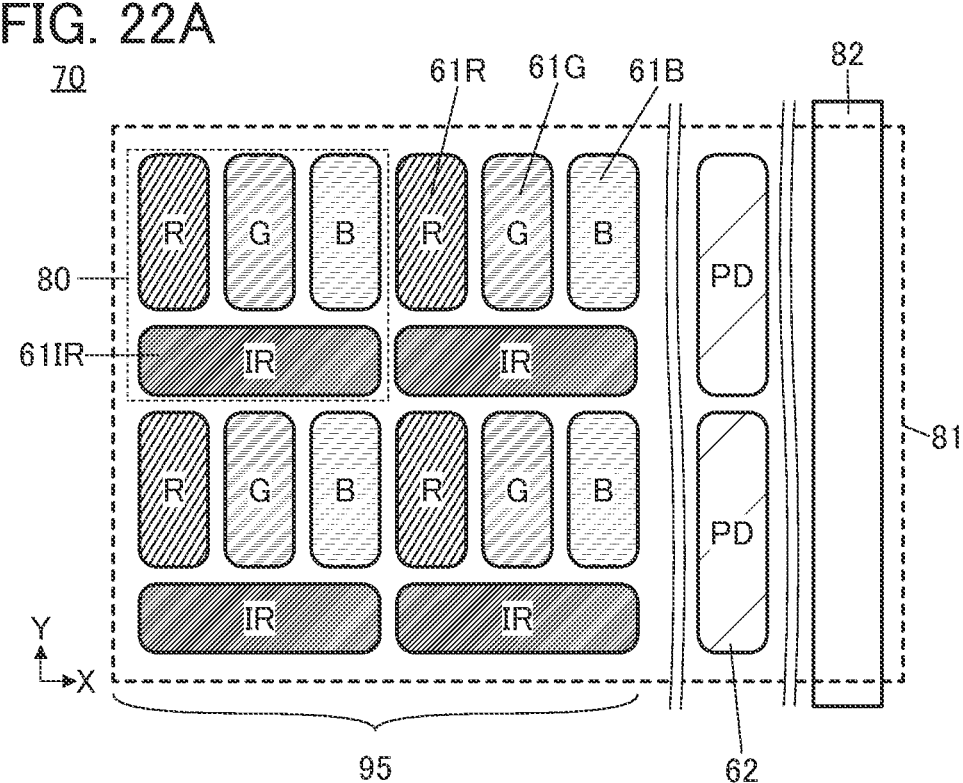
FIG. 22A and FIG. 22B are diagrams each illustrating a structure example of a display apparatus.
Figure 22B:
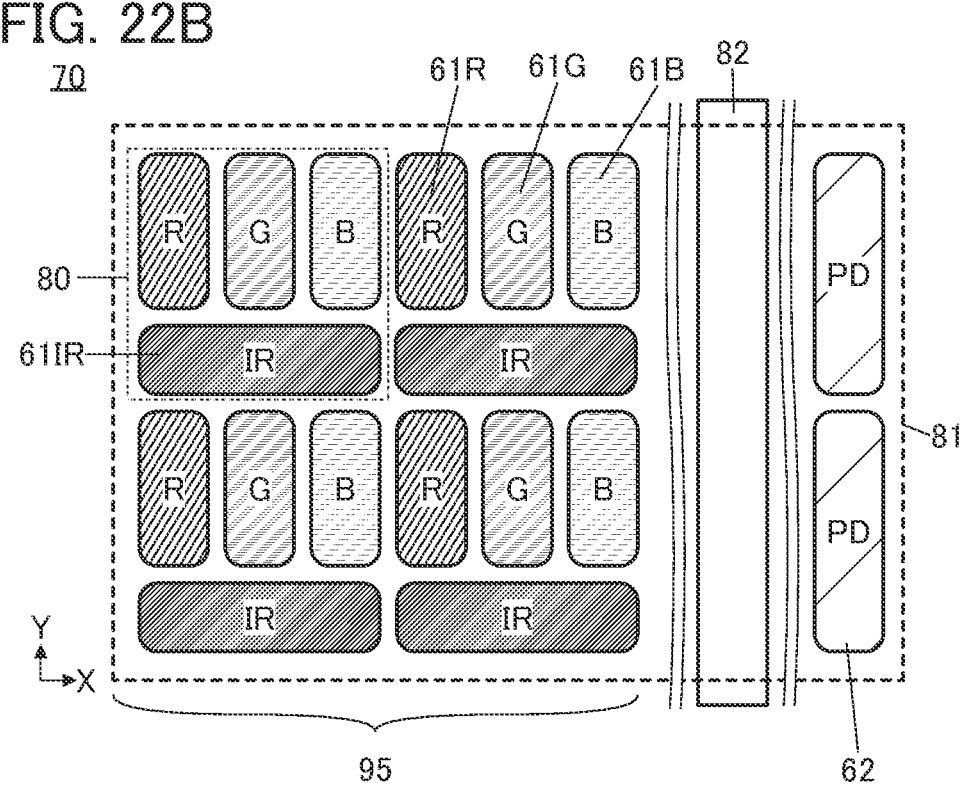

The display apparatus 70 illustrated in FIG. 22A is different from the display apparatus 70 illustrated in FIG. 18A in that the pixel 80 is formed of the subpixel including the light-emitting element 61R, the subpixel including the light-emitting element 61G, the subpixel including the light-emitting element 61B, and the subpixel including the light-receiving element 61IR. In this case, the light-receiving element 62 is preferably provided between the display region 95 and the connection electrode 82. Alternatively, the light-receiving element 62 may be provided along the outer periphery of the display region 95 and the connection electrode 82 as illustrated in FIG. 22B. With this structure, the area occupied by the light-receiving element 62 in the display apparatus 70 can be made larger, and the light detection sensitivity of the light-receiving element 62 can be increased.

In the display apparatus 70 illustrated in FIG. 22A, the light-receiving element 62 can be provided along the outer periphery of the display region 95. For example, the light-receiving element 62 may be provided along one side of the outer periphery of the display region 95 or two or more sides of the outer periphery of the display region 95. That is, in the case where the display region 95 has a rectangular top surface, the arrangement of the light-emitting elements 62 in a top view can have a belt-like shape, an L-like shape, a U-like shape (a square bracket shape), a quadrangular shape, or the like.

In the display apparatus 70 illustrated in FIG. 22B, the light-receiving element 62 can be provided along the outer periphery of the connection electrode 82. For example, the light-receiving element 62 may be provided along one side of the outer periphery of the connection electrode 82 or two or more sides of the outer periphery of the connection electrode 82. That is, in the case where the connection electrode 82 has a rectangular top surface, the light-receiving elements 62 in a top view can be arranged in a belt-like shape, an L-like shape, a U-like shape (a square bracket shape), a quadrangular shape, or the like.

Although FIG. 22A and FIG. 22B illustrate examples in which the width of the light-receiving element 62 in the Y direction is substantially the same as the width of the pixel 80 in the Y direction, one embodiment of the present invention is not limited to these examples. The width of the light-receiving element 62 in the Y direction may be larger or smaller than the width of the pixel 80 in the Y direction. Although FIG. 22A and FIG. 22B illustrate examples in which the number of the light-receiving elements 62 is the same as that of the pixels 80 in the Y direction, one embodiment of the present invention is not limited to the examples. The number of the light-receiving elements 62 in the Y direction may be different from that of the pixels 80 in the Y direction and may be one or more. Although FIG. 22A and FIG. 22B illustrate examples in which the number of the light-receiving elements 62 in the X direction is one, one embodiment of the present invention is not limited to these examples. The number of the light-receiving elements 62 in the X direction may be two or more.

Figure 23A:
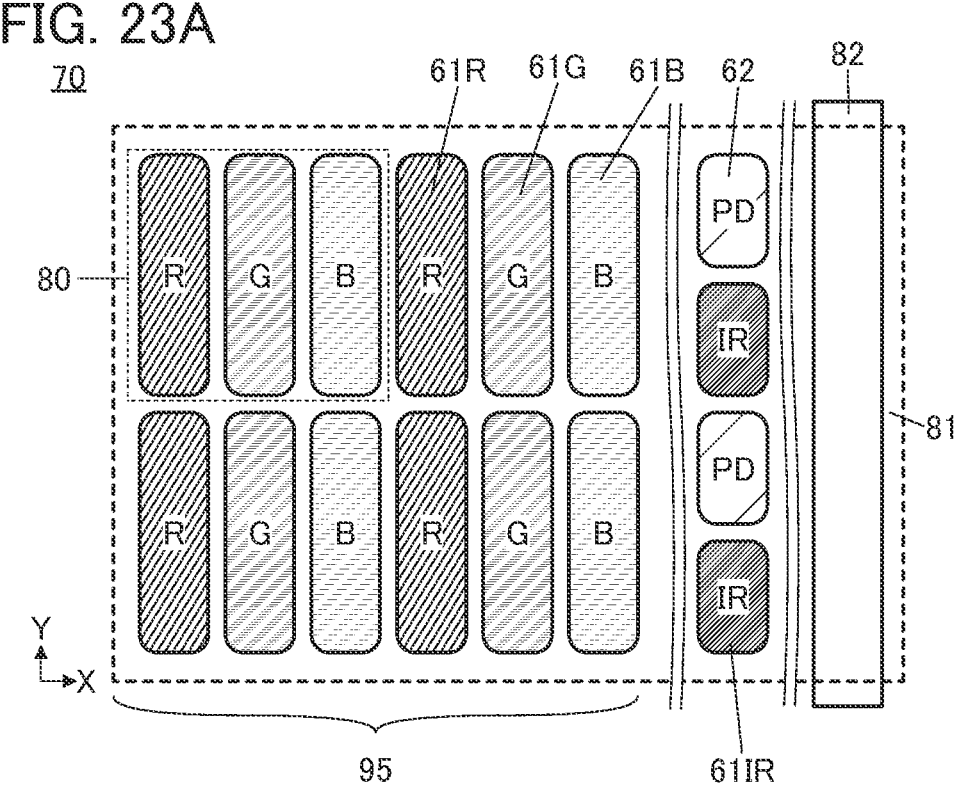
FIG. 23A and FIG. 23B are diagrams each illustrating a structure example of a display apparatus.
Figure 23B:
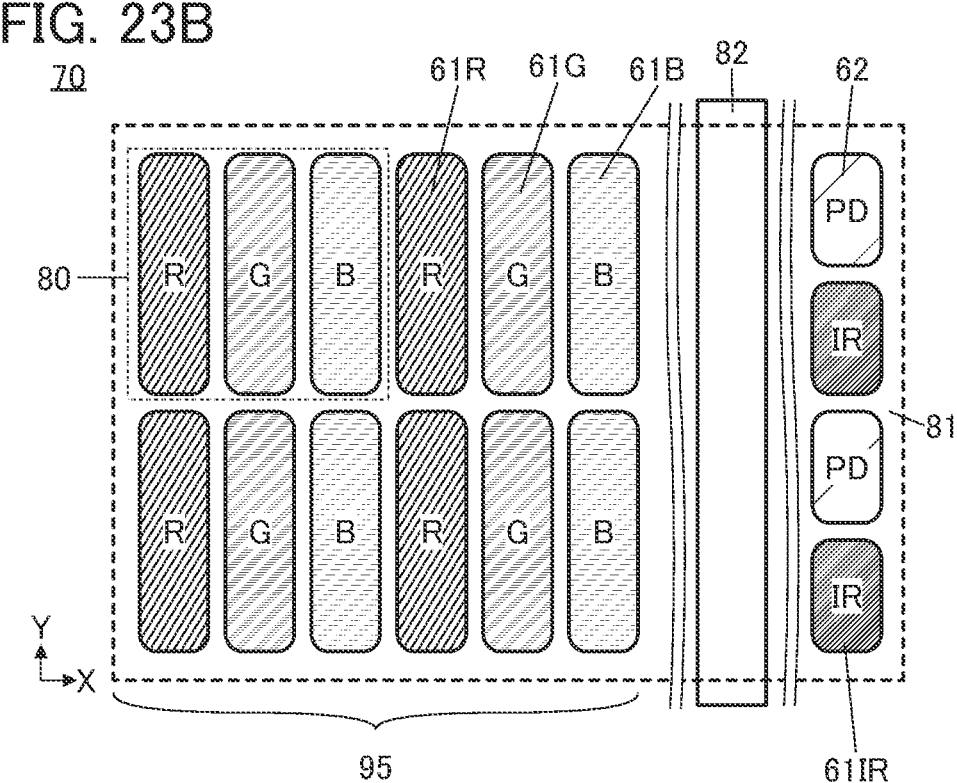

The display apparatus 70 illustrated in FIG. 23A is different from the display apparatus 70 illustrated in FIG. 18A in that the pixel 80 is formed of the subpixel including the light-emitting element 61R, the subpixel including the light-emitting element 61G, and the subpixel including the light-emitting element 61B. In this case, the light-emitting element 61IR and the light-receiving element 62 are preferably provided between the display region 95 and the connection electrode 82. Alternatively, the light-emitting element 61IR and the light-receiving element 62 may be provided along the outer periphery of the display region 95 and the connection electrode 82 as illustrated in FIG. 23B. With this structure, the light-emitting element 61R, the light-emitting element 61G, and the light-emitting element 61B can have larger lengths in the Y direction, so that the luminance of light emitted from the pixel 80 can be increased.

In the display apparatus 70 illustrated in FIG. 23A, the light-emitting element 61IR and the light-receiving element 62 can be provided along the outer periphery of the display region 95. For example, the light-emitting element 61IR and the light-receiving element 62 may be provided along one side of the outer periphery of the display region 95 or two or more sides of the outer periphery of the display region 95. That is, in the case where the display region 95 has a rectangular top surface, the light-emitting elements 61IR in a top view and the light-receiving elements 62 in a top view can each be arranged in a belt-like shape, an L-like shape, a U-like shape (a square bracket shape), a quadrangular shape, or the like. The arrangement of the light-emitting elements 61IR may be different from the arrangement of the light-receiving elements 62. For example, the light-emitting elements 61IR in a top view may be placed along two sides of the display region 95 that face each other and the light-receiving elements 62 in a top view may be placed along the other two sides.

In the display apparatus 70 illustrated in FIG. 23B, the light-emitting element 61IR and the light-receiving element 62 can be provided along the outer periphery of the connection electrode 82. For example, the light-emitting element 61IR and the light-receiving element 62 may be provided along one side of the outer periphery of the connection electrode 82 or two or more sides of the outer periphery of the connection electrode 82. That is, in the case where the connection electrode 82 has a rectangular top surface, the light-emitting elements 61IR in a top view and the light-receiving elements 62 in a top view can each be arranged in a belt-like shape, an L-like shape, a U-like shape (a square bracket shape), a quadrangular shape, or the like. The arrangement of the light-emitting elements 61IR may be different from the arrangement of the light-receiving elements 62. For example, the light-emitting elements 61IR in atop view may be placed along two sides of the connection electrode 82 that face each other and the light-receiving elements 62 in a top view may be placed along the other two sides.

Although FIG. 23A and FIG. 23B illustrate examples in which the sum of the width of the light-emitting element 61IR in the Y direction and the width of the light-receiving element 62 in the Y direction is substantially the same as the width of the pixel 80 in the Y direction, one embodiment of the present invention is not limited to these examples. The width of each of the light-emitting element 61IR and the light-receiving element 62 in the Y direction may be larger or smaller than the width of the pixel 80 in the Y direction. Although FIG. 23A and FIG. 23B illustrate examples in which the number of the light-emitting elements 61IR, that of the light-receiving elements 62, and that of the pixels 80 are the same in the Y direction, one embodiment of the present invention is not limited to the examples. The number of the light-emitting elements 61IR and that of the light-receiving elements 62 in the Y direction may be different from that of the pixels 80 in the Y direction and may be one or more. In addition, the number of the light-emitting elements 61IR and that of the light-receiving elements 62 in the Y direction may be different from each other. Although FIG. 23A and FIG. 23B illustrate examples in which the number of the light-emitting elements 61IR in the X direction is one and the number of the light-receiving elements 62 in the X direction is one, one embodiment of the present invention is not limited to these examples. The number of the light-emitting elements 61IR and the number of the light-receiving elements 62 in the X direction may each be two or more.

<Structure Example of Light-Emitting Element>

Figure 24A:
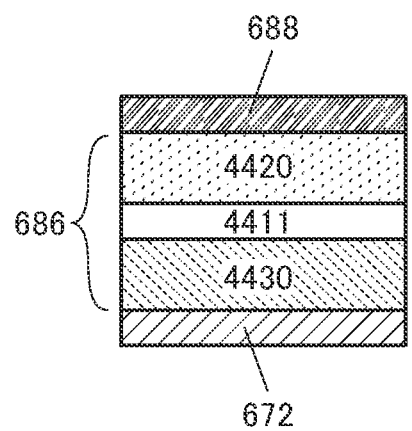
FIG. 24A to FIG. 24D are diagrams each illustrating a structure example of a light-emitting element.

As illustrated in FIG. 24A, a light-emitting element includes an EL layer 686 between a pair of electrodes (an electrode 672 and an electrode 688). The EL layer 686 can be formed of a plurality of layers such as a layer 4420, a light-emitting layer 4411, a layer 4430, and the like. The layer 4420 can include, for example, a layer containing a substance with a high electron-injection property (electron-injection layer) and a layer containing a substance with a high electron-transport property (electron-transport layer). The light-emitting layer 4411 contains a light-emitting compound, for example. The layer 4430 can include, for example, a layer containing a substance with a high hole-injection property (hole-injection layer) and a layer containing a substance with a high hole-transport property (hole-transport layer).

The structure including the layer 4420, the light-emitting layer 4411, and the layer 4430, which is provided between a pair of electrodes, can function as a single light-emitting unit, and the structure in FIG. 24A is referred to as a single structure in this specification and the like.

Figure 24B:
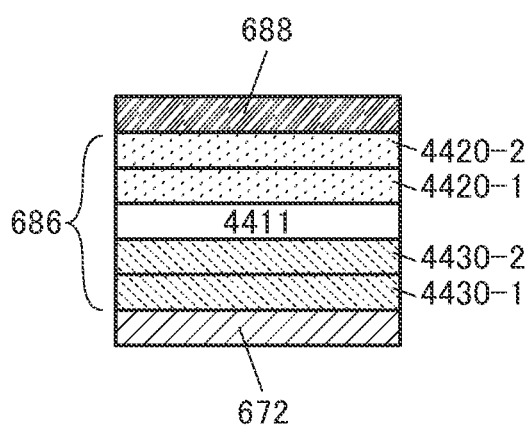

FIG. 24B is a modification example of the EL layer 686 included in the light-emitting element illustrated in FIG. 24A. Specifically, a light-emitting element illustrated in FIG. 24B includes a layer 4430-1 over the electrode 672, a layer 4430-2 over the layer 4430-1, the light-emitting layer 4411 over the layer 4430-2, a layer 4420-1 over the light-emitting layer 4411, a layer 4420-2 over the layer 4420-1, and the electrode 688 over the layer 4420-2. For example, in the case where the electrode 672 is an anode and the electrode 688 is a cathode, the layer 4430-1 functions as a hole-injection layer, the layer 4430-2 functions as a hole-transport layer, the layer 4420-1 functions as an electron-transport layer, and the layer 4420-2 functions as an electron-injection layer. Alternatively, in the case where the electrode 672 is as a cathode and the electrode 688 is an anode, the layer 4430-1 functions as an electron-injection layer, the layer 4430-2 functions as an electron-transport layer, the layer 4420-1 functions as a hole-transport layer, and the layer 4420-2 functions as a hole-injection layer. With such a layer structure, carriers can be efficiently injected to the light-emitting layer 4411, and the efficiency of the recombination of carriers in the light-emitting layer 4411 can be enhanced.

Figure 24C:
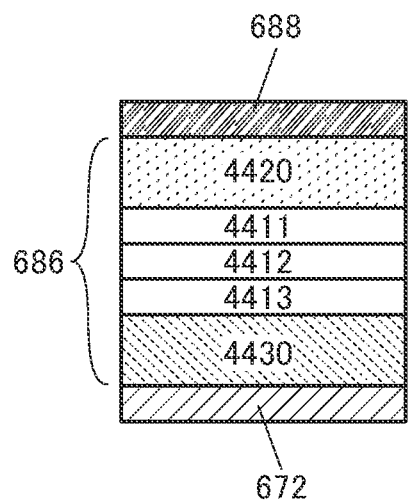

Note that the structure in which a plurality of light-emitting layers (the light-emitting layer 4411, a light-emitting layer 4412, and a light-emitting layer 4413) are provided between the layer 4420 and the layer 4430 as illustrated in FIG. 24C is a variation of the single structure.

Figure 24D:
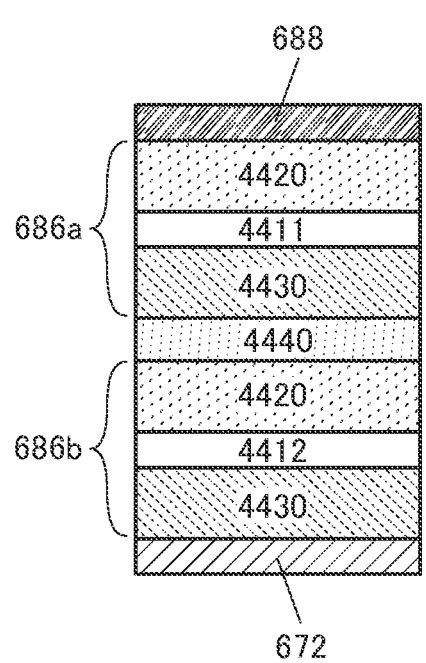

The structure in which a plurality of light-emitting units (an EL layer 686a and an EL layer 686b) are connected in series with an intermediate layer (charge-generation layer) 4440 therebetween as illustrated in FIG. 24D is referred to as a tandem structure in this specification. The structure illustrated in FIG. 24D is referred to as a tandem structure in this specification and the like; however, the name of the structure is not limited thereto. A tandem structure may be referred to as a stack structure, for example. The tandem structure enables a light-emitting element capable of high luminance light emission.

In FIG. 24C and FIG. 24D, the layer 4420 and the layer 4430 may each have a stacked-layer structure of two or more layers as illustrated in FIG. 24B.

A structure in which light-emitting elements that emit light of different colors (here, blue (B), green (G), and red (R)) are separately formed is referred to as an SBS (Side By Side) structure in some cases.

In the case where the single structure and the tandem structure described above and the SBS structure are compared with each other, the SBS structure, the tandem structure, and the single structure have lower consumption in this order. To reduce power consumption, the SBS structure is preferably used. Meanwhile, the single structure and the tandem structure are suitable in terms of lower manufacturing cost or higher manufacturing yield because the manufacturing processes of the single structure and the tandem structure are simpler than that of the SBS structure.

The emission colors of the light-emitting elements can be changed to red, green, blue, cyan, magenta, yellow, white, or the like depending on a material of the EL layer 686. When the light-emitting elements have a microcavity structure, the color purity can be further increased.

The light-emitting element that emits white light preferably contains two or more kinds of light-emitting substances in the light-emitting layer. In the case of obtaining white light emission with the use of two kinds of light-emitting substances, two or more kinds of light-emitting substances may be selected such that their emission colors are complementary colors. For example, when the emission color of a first light-emitting substance and the emission color of a second light-emitting substance have a relationship of complementary colors, it is possible to obtain a light-emitting element which emits white light as a whole. To obtain white light emission by using three or more light-emitting substances, the light-emitting element may be configured to emit white light as a whole by combining emission colors of the three or more light-emitting substances.

A light-emitting layer preferably contains two or more of light-emitting substances that emit light of R (red), G (green), B (blue), Y (yellow), O (orange), and the like. Alternatively, a light-emitting layer preferably contains two or more light-emitting substances each of which emits light containing two or more of spectral components of R, G, and B.

<Structure Example of Light-Emitting Element and Light-Receiving Element>

The display apparatus of one embodiment of the present invention is a top-emission display apparatus where light is emitted in the direction opposite to a substrate over which light-emitting elements are formed. In this embodiment, a top-emission display apparatus provided with light-emitting elements and a light-receiving element will be described as an example.

In this specification and the like, unless otherwise specified, in describing a structure including a plurality of elements (e.g., light-emitting elements and light-emitting layers), alphabets are not added when a common part of the elements is described. For example, when a common part of a light-emitting layer 383R, a light-emitting layer 383G, and the like is described, the term "light-emitting layer 383" is used in some cases.

Figure 25:
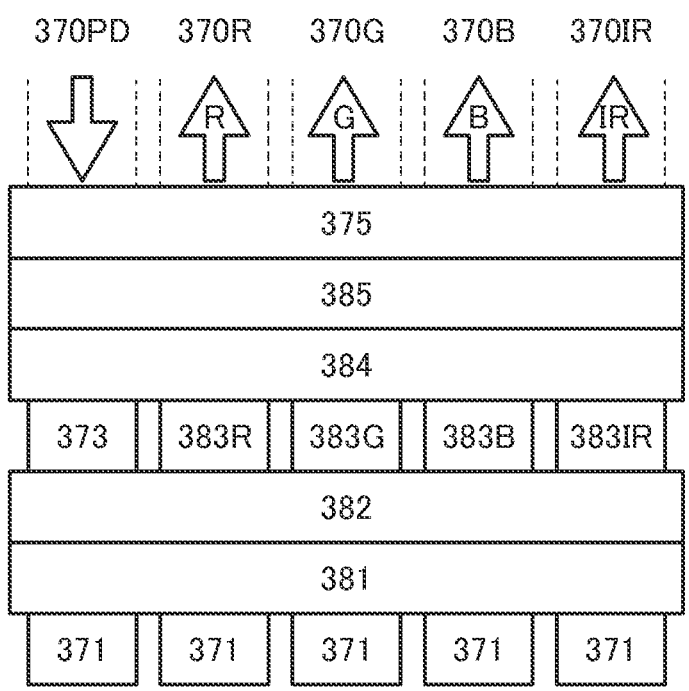
FIG. 25 is a diagram illustrating a structure example of a display apparatus.

A display apparatus 380A illustrated in FIG. 25 includes a light-receiving element 370PD, a light-emitting element 370R which emits red (R) light, a light-emitting element 370G which emits green (G) light, a light-emitting element 370B which emits blue (B) light, and a light-emitting element 370IR which emits infrared light (IR).

Each of the light-emitting elements includes a pixel electrode 371, a hole-injection layer 381, a hole-transport layer 382, a light-emitting layer, an electron-transport layer 384, an electron-injection layer 385, and a common electrode 375 which are stacked in this order. The light-emitting element 370R includes the light-emitting layer 383R, the light-emitting element 370G includes the light-emitting layer 383G, the light-emitting element 370B includes a light-emitting layer 383B, and the light-emitting element 370IR includes a light-emitting layer 383IR. The light-emitting layer 383R includes a light-emitting substance which emits red light, the light-emitting layer 383G includes a light-emitting substance which emits green light, the light-emitting layer 383B includes a light-emitting substance which emits blue light, and the light-emitting layer 383IR includes a light-emitting substance which emits infrared light.

The light-emitting elements are electroluminescent elements which emit light to the common electrode 375 side on voltage application between the pixel electrode 371 and the common electrode 375.

The light-receiving element 370PD includes the pixel electrode 371, the hole-injection layer 381, the hole-transport layer 382, an active layer 373, the electron-transport layer 384, the electron-injection layer 385, and the common electrode 375 which are stacked in this order.

The light-receiving element 370PD is a photoelectric conversion element that receives light incident from the outside of the display apparatus 380A and converts the light into an electric signal.

This embodiment is described assuming that the pixel electrode 371 functions as an anode and the common electrode 375 functions as a cathode in the light-emitting elements and the light-receiving element. In other words, the light-receiving element is driven by application of reverse bias between the pixel electrode 371 and the common electrode 375, whereby light incident on the light-receiving element can be detected and electric charge can be generated and extracted as a current.

In the display apparatus of this embodiment, an organic compound is used for the active layer 373 of the light-receiving element 370PD. The light-receiving element 370PD can share the layers other than the active layer 373 with the light-emitting elements. Thus, the light-receiving element 370PD can be formed concurrently with the formation of the light-emitting elements only by adding a step of forming the active layer 373 in the manufacturing process of the light-emitting elements. The light-emitting elements and the light-receiving element 370PD can be formed over one substrate. Accordingly, the light-receiving element 370PD can be incorporated into the display apparatus without a significant increase in the number of manufacturing steps.

In the display apparatus 380A, for example, the light-receiving element 370PD and the light-emitting elements have a common structure except that the active layer 373 of the light-receiving element 370PD and the light-emitting layers 383 of the light-emitting elements are separately formed. The structures of the light-receiving element 370PD and the light-emitting elements are not limited thereto. The light-receiving element 370PD and the light-emitting elements may have separately formed layers in addition to the active layer 373 and the light-emitting layer 383. The light-receiving element 370PD and the light-emitting elements preferably include at least one layer used in common (common layer). Thus, the light-receiving element 370PD can be incorporated into the display apparatus without a significant increase in the number of manufacturing steps.

A conductive film that transmits visible light is used as the electrode through which light is extracted, which is either the pixel electrode 371 or the common electrode 375. A conductive film that reflects visible light is preferably used as the electrode through which light is not extracted.

The light-emitting elements included in the display apparatus of this embodiment preferably employ a micro-optical resonator (microcavity) structure. Therefore, one of the pair of electrodes of the light-emitting elements preferably includes an electrode having properties of transmitting and reflecting visible light (transflective electrode), and the other preferably includes an electrode having a property of reflecting visible light (reflective electrode). When the light-emitting elements have a microcavity structure, light obtained from the light-emitting layers can be resonated between the electrodes, whereby light emitted from the light-emitting elements can be intensified.

The transparent electrode has a light transmittance higher than or equal to 40%. For example, an electrode having a visible light (light with a wavelength greater than or equal to 400 nm and less than 750 nm) transmittance higher than or equal to 40% is preferably used in the light-emitting elements. The visible light reflectivity of the transflective electrode is higher than or equal to 10% and less than or equal to 95%, preferably higher than or equal to 30% and lower than or equal to 80%. The visible light reflectivity of the reflective electrode is higher than or equal to 40% and lower than or equal to 100%, preferably higher than or equal to 70% and lower than or equal to 100%. These electrodes preferably have a resistivity of $1 \times 10^{-2}$ Ωcm or lower. Note that in the case where any of the light-emitting elements emits near-infrared light (light with a wavelength greater than or equal to 750 nm and less than or equal to 1300 nm), the near-infrared light transmittance and reflectivity of these electrodes preferably satisfy the above-described numerical ranges of the visible light transmittance and reflectivity.

The light-emitting element includes at least the light-emitting layer 383. In addition to the light-emitting layer 383, the light-emitting element may further include a layer containing any of a substance with a high hole-injection property, a substance with a high hole-transport property, a hole-blocking material, a substance with a high electron-transport property, a substance with a high electron-injection property, an electron-blocking material, a substance with a bipolar property (a substance with a high electron- and hole-transport property), and the like.

For example, the light-emitting elements and the light-receiving element can share at least one of the hole-injection layer, the hole-transport layer, the electron-transport layer, and the electron-injection layer. At least one of the hole-injection layer, the hole-transport layer, the electron-transport layer, and the electron-injection layer can each be separately formed for the light-emitting elements and the light-receiving element.

In the light-receiving element, the hole-transport layer transports holes generated in the active layer on the basis of incident light, to the anode. In the light-receiving element, the electron-transport layer transports electrons generated in the active layer on the basis of incident light, to the cathode.

Note that for the hole-injection layer, the hole-transport layer, the electron-transport layer, the electron-injection layer, and the light-emitting layer, the content described in <Schematic top view and cross-sectional schematic view of light-emitting element and its surroundings> can be referred to.

The active layer 373 includes a semiconductor. Examples of the semiconductor include an inorganic semiconductor such as silicon and an organic semiconductor including an organic compound. This embodiment shows an example in which an organic semiconductor is used as the semiconductor included in the active layer 373. The use of an organic semiconductor is preferable because the light-emitting layer 383 and the active layer 373 can be formed by the same method (e.g., a vacuum evaporation method) and thus the same manufacturing apparatus can be used.

Examples of an n-type semiconductor material included in the active layer 373 are electron-accepting organic semiconductor materials such as fullerene (e.g., $C_{60}$ and $C_{70}$) and fullerene derivatives. Fullerene has a soccer ball-like shape, which is energetically stable. Both the HOMO level and the LUMO level of fullerene are deep (low). Having a deep LUMO level, fullerene has an extremely high electron-accepting property (acceptor property). When π-electron conjugation (resonance) spreads in a plane as in benzene, the electron-donating property (donor property) usually increases. Although π-electron conjugation widely spread in fullerene having a spherical shape, its electron-accepting property is high. The high electron-accepting property efficiently causes rapid charge separation and is useful for the light-receiving element. Both $C_{60}$ and $C_{70}$ have a wide absorption band in the visible light region, and $C_{70}$ is especially preferable because of having a larger π-electron conjugation system and a wider absorption band in the long wavelength region than $C_{60}$. Other examples of fullerene derivatives include[6,6]-phenyl-C71-butyric acid methyl ester (abbreviation: PC70BM), [6,6]-phenyl-C61-butyric acid methyl ester (abbreviation: PC60BM), 1',1'',4',4''-Tetrahydro-di[1,4]methanonaphthaleno[1,2:2',3',56,60:2'', 3''][5,6]fullerene-C60 (abbreviation: ICBA), and the like.

Other examples of an n-type semiconductor material include a metal complex having a quinoline skeleton, a metal complex having a benzoquinoline skeleton, a metal complex having an oxazole skeleton, a metal complex having a thiazole skeleton, an oxadiazole derivative, a triazole derivative, an imidazole derivative, an oxazole derivative, a thiazole derivative, a phenanthroline derivative, a quinoline derivative, a benzoquinoline derivative, a quinoxaline derivative, a dibenzoquinoxaline derivative, a pyridine derivative, a bipyridine derivative, a pyrimidine derivative, a naphthalene derivative, an anthracene derivative, a coumarin derivative, a rhodamine derivative, a triazine derivative, a quinone derivative, and the like.

Examples of a p-type semiconductor material contained in the active layer 373 include electron-donating organic semiconductor materials such as copper(II) phthalocyanine (CuPc), tetraphenyldibenzoperiflanthene (DBP), zinc phthalocyanine (ZnPc), tin phthalocyanine (SnPc), quinacridone, and the like.

Examples of a p-type semiconductor material include a carbazole derivative, a thiophene derivative, a furan derivative, a compound having an aromatic amine skeleton, and the like. Other examples of the p-type semiconductor material include a naphthalene derivative, an anthracene derivative, a pyrene derivative, a triphenylene derivative, a fluorene derivative, a pyrrole derivative, a benzofuran derivative, a benzothiophene derivative, an indole derivative, a dibenzofuran derivative, a dibenzothiophene derivative, an indolocarbazole derivative, a porphyrin derivative, a phthalocyanine derivative, a naphthalocyanine derivative, a quinacridone derivative, a polyphenylene vinylene derivative, a polyparaphenylene derivative, a polyfluorene derivative, a polyvinylcarbazole derivative, a polythiophene derivative, and the like.

The HOMO level of the electron-donating organic semiconductor material is preferably shallower (higher) than the HOMO level of the electron-accepting organic semiconductor material. The LUMO level of the electron-donating organic semiconductor material is preferably shallower (higher) than the LUMO level of the electron-accepting organic semiconductor material.

Fullerene having a spherical shape is preferably used as the electron-accepting organic semiconductor material, and an organic semiconductor material having a substantially planar shape is preferably used as the electron-donating organic semiconductor material. Molecules of similar shapes tend to aggregate, and aggregated molecules of similar kinds, which have molecular orbital energy levels close to each other, can increase the carrier-transport property.

For example, the active layer 373 is preferably formed by co-evaporation of an n-type semiconductor and a p-type semiconductor. Alternatively, the active layer 373 may be formed by stacking an n-type semiconductor and a p-type semiconductor.

Either a low molecular compound or a high molecular compound can be used for the light-emitting elements and the light-receiving element, and an inorganic compound may also be included. Each of the layers included in the light-emitting elements and the light-receiving element can be formed by any of the following methods: an evaporation method (including a vacuum evaporation method), a transfer method, a printing method, an inkjet method, a coating method, and the like.

As the hole-transport material, a high molecular compound such as poly(3,4-ethylenedioxythiophene)/poly(styrenesulfonic acid) (abbreviation: PEDOT/PSS), or an inorganic compound such as a molybdenum oxide or copper iodide (CuI) can be used, for example. As the electron-transport material, an inorganic compound such as a zinc oxide (ZnO) can be used.

For the active layer 373, a high molecular compound such as poly[[4,8-bis[5-(2-ethylhexyl)-2-thienyl]benzo[1,2-b:4,5-b']dithiophene-2,6-diyl]-2,5-thiophenediyl[5,7-bis(2-ethylhexyl)-4,8-dioxo-4H,8H-benzo[1,2-c:4,5-c']dithiophene-1,3-diyl]] polymer (abbreviation: PBDB-T), a PBDB-T derivative, or the like which functions as a donor, can be used. For example, a method in which an acceptor material is dispersed to PBDB-T or a PBDB-T derivative can be used.

The active layer 373 may contain a mixture of three or more kinds of materials. For example, a third material may be mixed with an n-type semiconductor material and a p-type semiconductor material in order to extend the wavelength range. The third material may be a low molecular compound or a high molecular compound.

<Structure Example of Display Apparatus>

Figure 26:
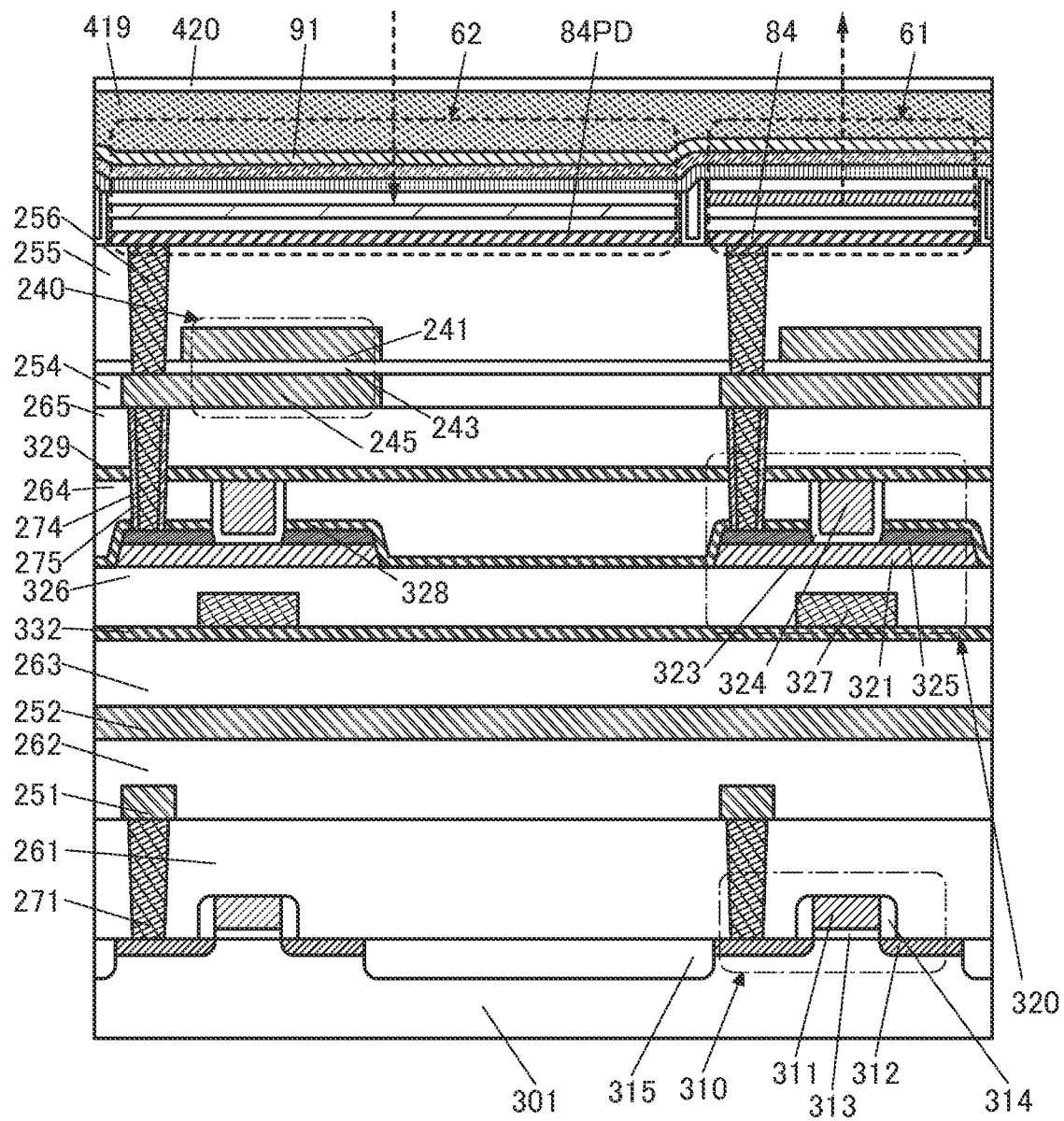
FIG. 26 is a diagram illustrating a structure example of a display apparatus.

FIG. 26 is a cross-sectional view illustrating a structure example of the display apparatus 70. The display apparatus 70 has a structure in which a transistor 310 whose channel is formed in a substrate 301 and a transistor 320 including a metal oxide in a semiconductor layer where a channel is formed are stacked.

An insulating layer 261 is provided so as to cover the transistor 310, and a conductive layer 251 is provided over the insulating layer 261. The conductive layer 251 is electrically connected to one of a source and a drain of the transistor 310 through a plug 271 embedded in the insulating layer 261. An insulating layer 262 is provided so as to cover the conductive layer 251, and a conductive layer 252 is provided over the insulating layer 262. The conductive layer 251 and the conductive layer 252 each function as a wiring. An insulating layer 263 and an insulating layer 332 are provided so as to cover the conductive layer 252, and the transistor 320 is provided over the insulating layer 332. An insulating layer 265 is provided so as to cover the transistor 320, and a capacitor 240 is provided over the insulating layer 265. The capacitor 240 and the transistor 320 are electrically connected to each other through a plug 274.

The transistor 320 can be used as a transistor included in a pixel circuit or a transistor included in a memory cell. The transistor 310 can be used as a transistor included in a memory cell, a transistor included in a driver circuit for driving the pixel circuit, or a transistor included in an arithmetic circuit. The transistor 310 and the transistor 320 can also be used as transistors included in a variety of circuits such as an arithmetic circuit and a memory circuit.

The transistor 310 includes a channel formation region in the substrate 301. As the substrate 301, a semiconductor substrate such as a single crystal silicon substrate can be used, for example. The transistor 310 includes part of the substrate 301, a conductive layer 311, a low-resistance region 312, an insulating layer 313, and an insulating layer 314. The conductive layer 311 functions as a gate electrode. The insulating layer 313 is positioned between the substrate 301 and the conductive layer 311 and functions as a gate insulating layer. The low-resistance region 312 is a region where the substrate 301 is doped with an impurity, and functions as a source or a drain. The insulating layer 314 is provided so as to cover a side surface of the conductive layer 311 and functions as an insulating layer.

An element isolation layer 315 is provided between two adjacent transistors 310 so as to be embedded in the substrate 301.

The transistor 320 contains a metal oxide (also referred to as an oxide semiconductor) in a semiconductor layer where a channel is formed.

The transistor 320 includes a semiconductor layer 321, an insulating layer 323, a conductive layer 324, a pair of conductive layers 325, an insulating layer 326, and a conductive layer 327.

The insulating layer 332 functions as a barrier layer that prevents diffusion of impurities such as water and hydrogen from the substrate 301 side into the transistor 320 and release of oxygen from the semiconductor layer 321 to the insulating layer 332 side. As the insulating layer 332, for example, a film in which hydrogen or oxygen is less likely to diffuse than in a silicon oxide film such as an aluminum oxide film, a hafnium oxide film, a silicon nitride film, or the like can be used.

The conductive layer 327 is provided over the insulating layer 332, and the insulating layer 326 is provided so as to cover the conductive layer 327. The conductive layer 327 functions as a second gate electrode of the transistor 320, and part of the insulating layer 326 functions as a second gate insulating layer. An oxide insulating film such as a silicon oxide film is preferably used as at least part of the insulating layer 326 that is in contact with the semiconductor layer 321. The top surface of the insulating layer 326 is preferably planarized.

It is preferable that the conductive layer 327 be a single conductive layer or two or more conductive layers stacked. In the case where the conductive layer 327 has a structure in which two conductive layers are stacked, of the two conductive layers, the conductive layer in contact with the bottom surface and the side wall of an opening provided in the insulating layer 326 is preferably formed using a conductive material having a function of inhibiting diffusion of oxygen or an impurity such as water or hydrogen. Examples of such a conductive material include titanium, titanium nitride, tantalum, tantalum nitride, ruthenium, and ruthenium oxide. The above structure can inhibit diffusion of an impurity such as water or hydrogen into the semiconductor layer 321.

It is preferable that the insulating layer 326 be a single inorganic insulating film or two or more inorganic insulating films stacked. In the case where the insulating layer 326 is two or more inorganic insulating films stacked, one of the inorganic insulating films included in the insulating layer 326 preferably functions as a barrier layer preventing diffusion of an impurity such as water or hydrogen from the substrate 301 side into the transistor 320. As the inorganic insulating film, an insulating film similar to the insulating layer 328 can be used.

The semiconductor layer 321 is provided over the insulating layer 326. The semiconductor layer 321 preferably includes a metal oxide (also referred to as an oxide semiconductor) film having semiconductor characteristics. For the semiconductor layer 321, a metal oxide containing at least one of indium, zinc, and the element M(the element M is aluminum, gallium, yttrium, or tin) is preferably used. An OS transistor including such a metal oxide in a channel formation region has a characteristic of an extremely low off-state current. Thus, it is preferable that such an OS transistor be used as a transistor provided in a pixel circuit, in which case analog data written to the pixel circuit can be retained for a long time. Similarly, it is preferable that such an OS transistor be used as a transistor provided in a memory cell, in which case analog data written to the memory cell can be retained for a long time.

The pair of conductive layers 325 is provided on and in contact with the semiconductor layer 321, and functions as a source electrode and a drain electrode.

An insulating layer 328 is provided so as to cover top and side surfaces of the pair of conductive layers 325, a side surface of the semiconductor layer 321, and the like, and an insulating layer 264 is provided over the insulating layer 328. The insulating layer 328 functions as a barrier layer that prevents diffusion of impurities such as water and hydrogen from the insulating layer 264 and the like into the semiconductor layer 321 and release of oxygen from the semiconductor layer 321. As the insulating layer 328, an insulating film similar to the insulating layer 332 can be used.

An opening reaching the semiconductor layer 321 is provided in the insulating layer 328 and the insulating layer 264. The insulating layer 323 that is in contact with side surfaces of the insulating layer 264, the insulating layer 328, and the conductive layer 325, and the top surface of the semiconductor layer 321 and the conductive layer 324 are embedded in the opening. The conductive layer 324 functions as a first gate electrode, and the insulating layer 323 functions as a first gate insulating layer.

As the insulating layer 323, for example, an inorganic insulating film such as a silicon oxide film or a silicon oxynitride film can be used. Note that the insulating layer 323 is not necessarily a single inorganic insulating film but may be two or more inorganic insulating films stacked. For example, an aluminum oxide film, a hafnium oxide film, a silicon nitride film, or the like may be provided in the form of a single layer or stacked layers on the side in contact with the conductive layer 324. Thus, oxidation of the conductive layer 324 can be inhibited. Furthermore, for example, an aluminum oxide film or a hafnium oxide film may be provided on the side in contact with the insulating layer 264, the insulating layer 328, and the conductive layer 325. In this case, it is possible to inhibit release of oxygen from the semiconductor layer 321, excessive supply of oxygen to the semiconductor layer 321, oxidation of the conductive layer 325, and the like.

The top surface of the conductive layer 324, the top surface of the insulating layer 323, and the top surface of the insulating layer 264 are planarized so that they are substantially level with each other, and an insulating layer 329 and the insulating layer 265 are provided so as to cover these layers.

Note that the conductive layer 327 and the conductive layer 324 preferably overlap with each other with an insulator therebetween on the outer side of the side surface of the semiconductor layer 321 in the channel width direction. With this structure, the channel formation region of the semiconductor layer 321 can be electrically surrounded by the electric field of the conductive layer 327 functioning as the second gate electrode and the electric field of the conductive layer 324 functioning as the first gate electrode. In this specification or the like, a transistor structure in which the channel formation region is electrically surrounded by the electric field of the first gate electrode and the electric field of the second gate electrode is referred to as a surrounded channel (S-channel) structure.

In this specification and the like, a transistor having the S-channel structure refers to a transistor having a structure in which a channel formation region is electrically surrounded by the electric fields of a pair of gate electrodes. The S-channel structure disclosed in this specification and the like is different from a Fin-type structure and a planar structure. With the S-channel structure, resistance to a short-channel effect can be enhanced, that is, a transistor in which a short-channel effect is less likely to occur can be provided.

When the transistor 320 becomes normally-off and has the above-described S-channel structure, the channel formation region can be electrically surrounded. Accordingly, the transistor 320 can be regarded as having a GAA (Gate All Around) structure or an LGAA (Lateral Gate All Around) structure. When the transistor 320 has the S-Channel structure, the GAA structure, or the LGAA structure, the channel formation region that is formed at the interface between the semiconductor layer 321 and the gate insulating film or in the vicinity of the interface can be formed in the entire bulk of the semiconductor layer 321. Therefore, the density of current flowing in the transistor can be improved, and thus the on-state current of the transistor can be expected to be improved or the field-effect mobility of the transistor can be expected to be increased.

The insulating layer 264 and the insulating layer 265 each function as an interlayer insulating layer. The insulating layer 329 functions as a barrier layer that prevents diffusion of impurities such as water and hydrogen from the insulating layer 265 and the like to the transistor 320. For the insulating layer 329, an insulating film similar to those used for the insulating layer 328 and the insulating layer 332 can be used.

The plug 274 electrically connected to one of the pair of conductive layers 325 is provided so as to be embedded in the insulating layer 265, the insulating layer 329, the insulating layer 264, and the insulating layer 328. The plug 274 is formed using a single conductive layer or a stacked structure of two or more conductive layers. In the case where the plug 274 has a structure in which two conductive layers are stacked, of the two conductive layers, the conductive layer that covers the side surface of the opening in the insulating layer 265, the insulating layer 329, the insulating layer 264, and the insulating layer 328 and part of the top surface of the conductive layer 325 is preferably formed using a conductive material into which hydrogen and oxygen do not easily diffuse. This structure inhibits an impurity such as water or hydrogen from entering the semiconductor layer 321 from the insulating layer 264 and the like through the plug 274. Furthermore, the structure inhibits oxygen contained in the insulating layer 264 from being absorbed by the plug 274.

An insulating layer 275 is provided in contact with the side surface of the plug 274. That is, a structure may be employed in which the insulating layer 275 is provided in contact with the inner wall of the opening in the insulating layer 265, the insulating layer 329, and the insulating layer 264 and the plug 274 is provided in contact with the side surface of the insulating layer 275 and part of the top surface of the conductive layer 325. Note that the insulating layer 275 is not necessarily provided.

The capacitor 240 includes a conductive layer 241, a conductive layer 245, and an insulating layer 243 between the conductive layer 241 and the conductive layer 245. The conductive layer 245 functions as one electrode of the capacitor 240, the conductive layer 241 functions as the other electrode of the capacitor 240, and the insulating layer 243 functions as a dielectric of the capacitor 240.

The conductive layer 245 is provided over the insulating layer 265 and is embedded in the insulating layer 254. The conductive layer 245 is electrically connected to one of a source and a drain of the transistor 320 through the plug 274 embedded in the insulating layer 265, the insulating layer 329, the insulating layer 264, and the insulating layer 328. The insulating layer 243 is provided so as to cover the conductive layer 245. The conductive layer 241 is provided in a region overlapping with the conductive layer 245 with the insulating layer 243 therebetween.

An insulating layer 255 is provided so as to cover the capacitor 240, and the light-emitting element 61, the light-receiving element 62, and the like are provided over the insulating layer 255. The protective layer 91 is provided over the light-emitting element 61 and the light-receiving element 62, and a substrate 420 is bonded to the top surface of the protective layer 91 with a resin layer 419. A light-transmitting substrate can be used as the substrate 420.

The pixel electrode 84 of the light-emitting element 61 and the pixel electrode 84PD of the light-receiving element 62 are electrically connected to one of the source and the drain of the transistor 320 through a plug 256 embedded in the insulating layer 255 and the insulating layer 243, the conductive layer 245 embedded in the insulating layer 254, and the plug 274 embedded in the insulating layer 265, the insulating layer 329, the insulating layer 264, and the insulating layer 328.

With such a structure, OS transistors included in a pixel circuit and a memory cell as well as the driver circuit, an arithmetic circuit, and the like can be provided directly under the light-receiving element and the light-emitting element; thus, the size of a display apparatus with higher performance can be reduced.

FIG. 26 illustrates the display apparatus 70 having a structure in which the transistor 310 and the transistor 320 are stacked. The structure of the display apparatus 70 is not limited to the above, and the display apparatus 70 may have a structure including the transistor 310 but not including the transistor 320; a structure not including the transistor 310 but including the transistor 320; a structure in which a plurality of transistors 320 are stacked; or a structure in which the transistor 310 and the plurality of transistors 320 over the transistor 310 are stacked.

In the case where a silicon substrate is used as the substrate 301, a photodiode with a photoelectric conversion layer that is formed on the silicon substrate may be provided, and the photodiode can be used as the light-receiving element included in the display apparatus of one embodiment of the present invention. In other words, the light-receiving element included in the display apparatus of one embodiment of the present invention may be formed over a silicon substrate. In this case, the transistor 310 is not necessarily formed.

At least part of any of the structure examples, the drawings corresponding thereto, and the like described in this embodiment can be combined with the other structure examples, the other drawings, and the like as appropriate.

At least part of this embodiment can be implemented in combination with the other embodiments described in this specification and the like as appropriate.

Embodiment 4

In this embodiment, transistors that can be used in the display apparatus of one embodiment of the present invention will be described.

<Structure Example of Transistor>

Figure 27A:
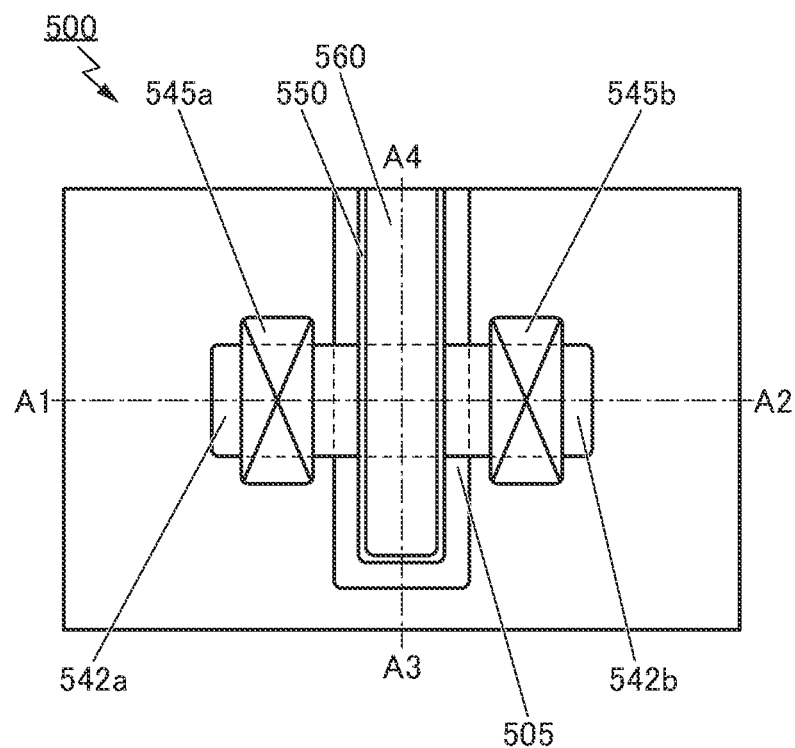
FIG. 27A is a top view illustrating a structure example of a transistor.
Figure 27C:
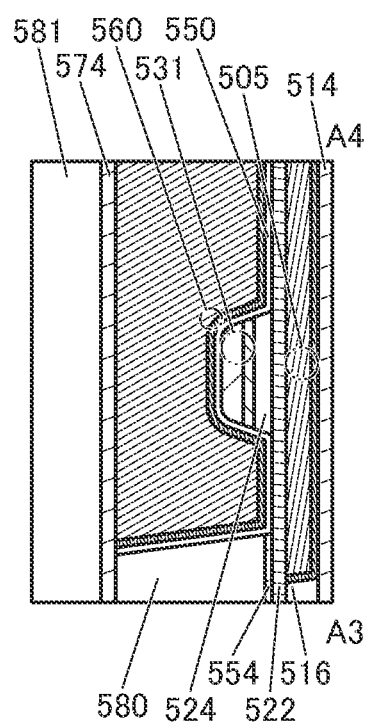
FIG. 27B and FIG. 27C are cross-sectional views illustrating the structure example of the transistor.
Figure 27B:
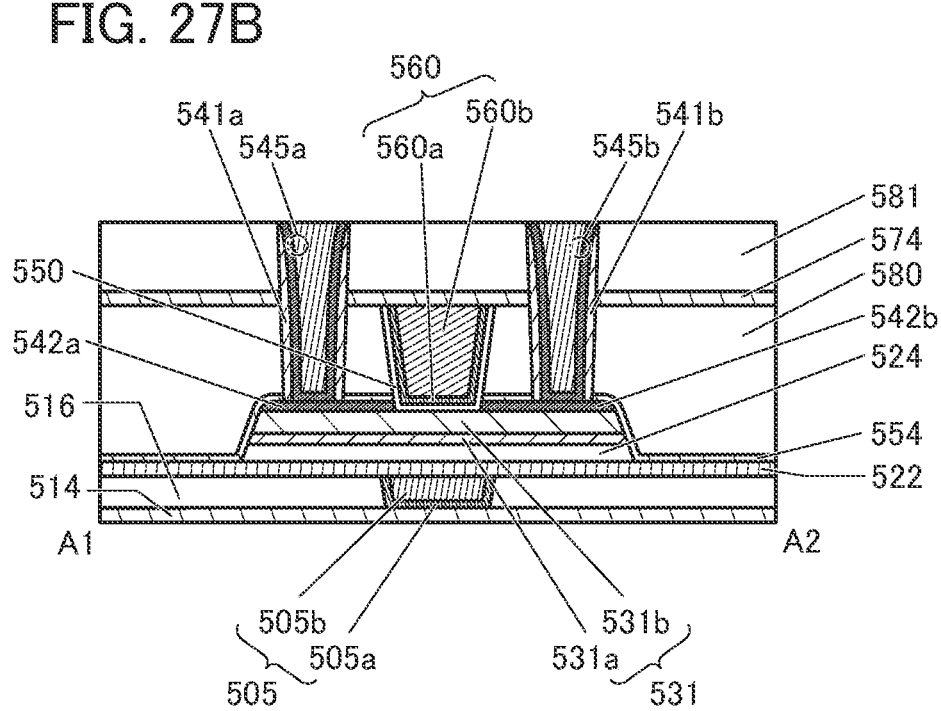

FIG. 27A, FIG. 27B, and FIG. 27C are a top view and cross-sectional views of a transistor 500 that can be used in the display apparatus of one embodiment of the present invention. The transistor 500 can be used in the display apparatus of one embodiment of the present invention.

FIG. 27A is the top view of the transistor 500. FIG. 27B and FIG. 27C are the cross-sectional views of the transistor 500. FIG. 27B is a cross-sectional view of a portion indicated by the dashed-dotted line A1-A2 in FIG. 27A and is a cross-sectional view of the transistor 500 in the channel length direction. FIG. 27C is a cross-sectional view of a portion indicated by the dashed-dotted line A3-A4 in FIG. 27A and is a cross-sectional view of the transistor 500 in the channel width direction. Note that some components are omitted in the top view of FIG. 27A for clarity of the drawing.

As illustrated in FIG. 27, the transistor 500 includes a metal oxide 531a placed over a substrate (not illustrated); a metal oxide 531b placed over the metal oxide 531a; a conductor 542a and a conductor 542b that are placed apart from each other over the metal oxide 531b; an insulator 580 that is placed over the conductor 542a and the conductor 542b and has an opening between the conductor 542a and the conductor 542b; a conductor 560 placed in the opening; an insulator 550 placed between the conductor 560 and the metal oxide 531b, the conductor 542a, the conductor 542b, and the insulator 580. Here, as illustrated in FIG. 27B and FIG. 27C, preferably, the top surface of the conductor 560 is substantially level with the top surfaces of the insulator 550 and the insulator 580. Hereinafter, the metal oxide 531a and the metal oxide 531b may be collectively referred to as a metal oxide 531. The conductor 542a and the conductor 542b may be collectively referred to as a conductor 542.

In the transistor 500 illustrated in FIG. 27, the side surfaces of the conductor 542a and the conductor 542b on the conductor 560 side are substantially perpendicular. Note that the transistor 500 illustrated in FIG. 27 is not limited thereto, and the angle formed between the side surfaces and bottom surfaces of the conductor 542a and the conductor 542b may be greater than or equal to 100 and less than or equal to 80°, preferably greater than or equal to 30° and less than or equal to 60°. The side surfaces of the conductor 542a and the conductor 542b that face each other may have a plurality of surfaces.

In the transistor 500, two layers of the metal oxide 531a and the metal oxide 531b are stacked in and around a region where a channel is formed (hereinafter, also referred to a channel formation region); however, one embodiment of the present invention is not limited thereto. For example, a single-layer structure of the metal oxide 531b or a stacked-layer structure of three or more layers may be employed. Furthermore, each of the metal oxide 531a and the metal oxide 531b may have a stacked-layer structure of two or more layers.

Here, the conductor 560 functions as a gate electrode of the transistor, and the conductor 542a and the conductor 542b function as a source electrode and a drain electrode. As described above, the conductor 560 is formed to be embedded in the opening of the insulator 580 and the region between the conductor 542a and the conductor 542b. Here, the positions of the conductor 560, the conductor 542a, and the conductor 542b are selected in a self-aligned manner with respect to the opening of the insulator 580. In other words, in the transistor 500, the gate electrode can be placed between the source electrode and the drain electrode in a self-aligned manner. Therefore, the conductor 560 can be formed without an alignment margin, resulting in a reduction in the area occupied by the transistor 500. Accordingly, the display apparatus can have high definition. In addition, the display apparatus can have a narrow bezel.

As illustrated in FIG. 27, the conductor 560 preferably includes a conductor 560a provided inside the insulator 550 and a conductor 560b provided to be embedded inside the conductor 560a. Note that in FIG. 27, although the conductor 560 have a stacked-layer structure of two layers, one embodiment of the present invention is not limited thereto. For example, the conductor 560 may have a single-layer structure or a stacked-layer structure of three or more layers.

The transistor 500 preferably includes an insulator 514 placed over the substrate (not illustrated); an insulator 516 placed over the insulator 514; a conductor 505 placed to be embedded in the insulator 516; an insulator 522 placed over the insulator 516 and the conductor 505; and the insulator 524 placed over the insulator 522. The metal oxide 531a is preferably placed over the insulator 524.

As illustrated in FIG. 27, the insulator 554 is preferably placed between the insulator 580 and the insulator 522, the insulator 524, the metal oxide 531a, the metal oxide 531b, the conductor 542a, the conductor 542b, and the insulator 550. Here, as illustrated in FIG. 27B and FIG. 27C, the insulator 554 is preferably in contact with a side surface of the insulator 550, the top surface and the side surface of the conductor 542a, the top surface and the side surface of the conductor 542b, side surfaces of the metal oxide 531a, the metal oxide 531b, and the insulator 524 and the top surface of the insulator 522.

An insulator 574 and an insulator 581 functioning as interlayer films are preferably placed over the transistor 500. Here, the insulator 574 is preferably placed in contact with the top surfaces of the conductor 560, the insulator 550, and the insulator 580.

The insulator 522, the insulator 554, and the insulator 574 preferably have a function of inhibiting diffusion of hydrogen (e.g., at least one of a hydrogen atom, a hydrogen molecule, and the like). For example, the insulator 522, the insulator 554, and the insulator 574 preferably have a lower hydrogen permeability than the insulator 524, the insulator 550, and the insulator 580. Moreover, the insulator 522 and the insulator 554 preferably have a function of inhibiting diffusion of oxygen (e.g., at least one of an oxygen atom, an oxygen molecule, and the like). For example, the insulator 522 and the insulator 554 preferably have a lower oxygen permeability than the insulator 524, the insulator 550, and the insulator 580.

A conductor 545 (a conductor 545a and a conductor 545b) that is electrically connected to the transistor 500 and functions as a plug is preferably provided. Note that an insulator 541 (an insulator 541a and an insulator 541b) is provided in contact with a side surface of the conductor 545 functioning as a plug. In other words, the insulator 541 is provided in contact with the inner wall of an opening in the insulator 554, the insulator 580, the insulator 574, and the insulator 581. In addition, a structure may be employed in which a first conductor of the conductor 545 is provided in contact with a side surface of the insulator 541 and a second conductor of the conductor 545 is provided on the inner side of the first conductor. Here, the top surface of the conductor 545 and the top surface of the insulator 581 can be substantially level with each other. Although the transistor 500 has a structure in which the first conductor of the conductor 545 and the second conductor of the conductor 545 are stacked, one embodiment of the present invention is not limited thereto. For example, the conductor 545 may have a single-layer structure or a stacked-layer structure of three or more layers. In the case where a component has a stacked-layer structure, layers may be distinguished by ordinal numbers given corresponding to the formation order.

In the transistor 500, a metal oxide functioning as an oxide semiconductor (hereinafter, also referred to as an oxide semiconductor) is preferably used as the metal oxide 531 including the channel formation region (the metal oxide 531a and the metal oxide 531b). For example, it is preferable to use a metal oxide having a band gap of higher than or equal to 2 eV, preferably higher than or equal to 2.5 eV as the metal oxide to be the channel formation region of the metal oxide 531.

The metal oxide preferably contains at least indium (In) or zinc (Zn). In particular, indium (In) and zinc (Zn) are preferably contained. In addition to them, an element M is preferably contained. As the element M, one or more of aluminum (Al), gallium (Ga), yttrium (Y), tin (Sn), boron (B), titanium (Ti), iron (Fe), nickel (Ni), germanium (Ge), zirconium (Zr), molybdenum (Mo), lanthanum (La), cerium (Ce), neodymium (Nd), hafnium (H), tantalum (Ta), tungsten (W), magnesium (Mg), and cobalt (Co) can be used. In particular, the element M is preferably one or more of aluminum (Al), gallium (Ga), yttrium (Y), and tin (Sn). The element M further preferably contains one or both of Ga and Sn.

The metal oxide 531b in a region that does not overlap with the conductor 542 sometimes has a smaller thickness than the metal oxide 531b in a region that overlaps with the conductor 542. The thin region is formed when part of the top surface of the metal oxide 531b is removed at the time of forming the conductor 542a and the conductor 542b. When a conductive film to be the conductor 542 is deposited, a low-resistance region is sometimes formed on the top surface of the metal oxide 531b in the vicinity of the interface with the conductive film. Removing the low-resistance region positioned between the conductor 542a and the conductor 542b on the top surface of the metal oxide 531b in the above manner can prevent formation of the channel in the region.

According to one embodiment of the present invention, a high-definition display apparatus can be provided with a small-size transistor. Alternatively, a high-luminance display apparatus can be provided with a transistor with high on-state current. Alternatively, a display apparatus that operates at high speed can be provided with a transistor operating at high speed. Alternatively, a highly reliable display apparatus can be provided with a transistor having stable electrical characteristics. Alternatively, a display apparatus with low power consumption can be provided with a transistor with a low off-state current.

The structure of the transistor 500 that can be used in the display apparatus of one embodiment of the present invention is described in detail.

The conductor 505 is placed to include a region overlapping with the metal oxide 531 and the conductor 560. Furthermore, the conductor 505 is preferably provided to be embedded in the insulator 516.

The conductor 505 includes a conductor 505a and a conductor 505b. The conductor 505a is provided in contact with the bottom surface and the sidewall of the opening provided in the insulator 516. The conductor 505b is provided to be embedded in a depressed portion formed by the conductor 505a. Here, the top surface of the conductor 505b is substantially level with the top surface of the conductor 505a and the top surface of the insulator 516.

For example, the conductor 505a is preferably formed using a conductive material having a function of inhibiting diffusion of impurities such as a hydrogen atom, a hydrogen molecule, a water molecule, a nitrogen atom, a nitrogen molecule, a nitrogen oxide molecule (e.g., $N_2O$, NO, and $NO_2$), and a copper atom. Alternatively, it is preferable to use a conductive material having a function of inhibiting diffusion of oxygen (e.g., at least one of an oxygen atom, an oxygen molecule, and the like).

When the conductor 505a is formed using a conductive material having a function of inhibiting diffusion of hydrogen, e.g., impurities such as hydrogen contained in the conductor 505b can be inhibited from diffusing into the metal oxide 531 through the insulator 524 and the like. When the conductor 505a is formed using a conductive material having a function of inhibiting diffusion of oxygen, the conductivity of the conductor 505b can be inhibited from being lowered because of oxidation. As the conductive material having a function of inhibiting diffusion of oxygen, for example, titanium, titanium nitride, tantalum, tantalum nitride, ruthenium, ruthenium oxide, or the like is preferably used. Thus, the conductor 505a is a single layer or stacked layers of the above conductive materials. For example, titanium nitride is used for the conductor 505a.

The conductor 505b is preferably formed using a conductive material containing tungsten, copper, or aluminum as its main component. For example, tungsten is used for the conductor 505b.

The conductor 560 sometimes functions as a first gate (also referred to as top gate) electrode. The conductor 505 sometimes functions as a second gate (also referred to as bottom gate) electrode. In that case, Vth of the transistor 500 can be controlled by changing a potential applied to the conductor 505 independently of a potential applied to the conductor 560. In particular, by applying a negative potential to the conductor 505, Vth of the transistor 500 can be increased and the off-state current can be made low. Thus, drain current at the time when a potential applied to the conductor 560 is 0 V can be lower in the case where a negative potential is applied to the conductor 505 than in the case where a negative potential is not applied to the conductor 505.

The conductor 505 is preferably provided to be larger than the channel formation region in the metal oxide 531. In particular, it is preferable that the conductor 505 extend beyond an end portion of the metal oxide 531 that intersects with the channel width direction, as illustrated in FIG. 27C. In other words, the conductor 505 and the conductor 560 preferably overlap with each other with the insulator positioned therebetween, in a region outside the side surface of the metal oxide 531 in the channel width direction.

With the above structure, the channel formation region of the metal oxide 531 can be electrically surrounded by electric fields of the conductor 560 having a function of the first gate electrode and electric fields of the conductor 505 having a function of the second gate electrode.

As illustrated in FIG. 27C, the conductor 505 extends to function as a wiring as well. However, without limitation to this structure, a structure in which a conductor functioning as a wiring is provided below the conductor 505 may be employed.

The insulator 514 preferably functions as a barrier insulating film that inhibits entry of e.g., impurities such as water or hydrogen into the transistor 500 from the substrate side. Accordingly, it is preferable to use, for the insulator 514, an insulating material having a function of inhibiting diffusion of e.g., impurities such as a hydrogen atom, a hydrogen molecule, a water molecule, a nitrogen atom, a nitrogen molecule, a nitrogen oxide molecule (e.g., $N_2O$, NO, and $NO_2$), and a copper atom (an insulating material through which the impurities are unlikely to pass), for example. Alternatively, it is preferable to use an insulating material having a function of inhibiting diffusion of oxygen (e.g., at least one of an oxygen atom, an oxygen molecule, and the like) (an insulating material through which the oxygen is unlikely to pass).

For example, aluminum oxide, silicon nitride, or the like is preferably used for the insulator 514. Accordingly, it is possible to inhibit diffusion of e.g., impurities such as water or hydrogen to the transistor 500 side from the substrate side through the insulator 514. Alternatively, for example, it is possible to inhibit diffusion of oxygen contained in the insulator 524 and the like to the substrate side through the insulator 514.

The permittivity of each of the insulator 516, the insulator 580, and the insulator 581 functioning as an interlayer film is preferably lower than that of the insulator 514. When a material with a low permittivity is used for an interlayer film, the parasitic capacitance generated between wirings can be reduced. For the insulator 516, the insulator 580, and the insulator 581, for example, silicon oxide, silicon oxynitride, silicon nitride oxide, silicon nitride, silicon oxide to which fluorine is added, silicon oxide to which carbon is added, silicon oxide to which carbon and nitrogen are added, porous silicon oxide, or the like can be used as appropriate.

The insulator 522 and the insulator 524 each function as a gate insulator.

Here, the insulator 524 in contact with the metal oxide 531 preferably releases oxygen by heating. In this specification and the like, oxygen that is released by heating is referred to as excess oxygen in some cases. For example, silicon oxide, silicon oxynitride, or the like can be used as appropriate for the insulator 524. When an insulator containing oxygen is provided in contact with the metal oxide 531, oxygen vacancies in the metal oxide 531 can be reduced, leading to improved reliability of the transistor 500.

Specifically, an oxide material that releases part of oxygen by heating is preferably used for the insulator 524. An oxide that releases oxygen by heating is an oxide film in which the amount of released oxygen converted into oxygen atoms is greater than or equal to $1.0 \times 10^{18}$ atoms/cm$^3$, preferably greater than or equal to $1.0 \times 10^{19}$ atoms/cm$^3$, further preferably greater than or equal to $2.0 \times 10^{19}$ atoms/cm$^3$ or greater than or equal to $3.0 \times 10^{20}$ atoms/cm$^3$ in TDS (Thermal Desorption Spectroscopy) analysis. Note that the temperature of the film surface in the TDS analysis is preferably within the range of 100° C. to 700° C. or 100° C. to 400° C.

For example, like the insulator 514 and the like, the insulator 522 preferably functions as a barrier insulating film that inhibits entry of e.g., impurities such as water or hydrogen into the transistor 500 from the substrate side. For example, the insulator 522 preferably has a lower hydrogen permeability than the insulator 524. For example, when the insulator 524, the metal oxide 531, the insulator 550, and the like are surrounded by the insulator 522, the insulator 554, and the insulator 574, entry of e.g., impurities such as water or hydrogen into the transistor 500 from the outside can be inhibited.

Furthermore, it is preferable that the insulator 522 have a function of inhibiting diffusion of oxygen (e.g., at least one of an oxygen atom, an oxygen molecule, and the like) (it is preferable that the oxygen be less likely to pass through the insulator 522). For example, the insulator 522 preferably has a lower oxygen permeability than the insulator 524. The insulator 522 preferably has a function of inhibiting diffusion of oxygen and impurities, in which case oxygen contained in the metal oxide 531 is less likely to diffuse to the substrate side. Moreover, the conductor 505 can be inhibited from reacting with oxygen contained in the insulator 524 and the metal oxide 531.

As the insulator 522, an insulator containing an oxide of one or both of aluminum and hafnium, which is an insulating material, is preferably used. As the insulator containing an oxide of one or both of aluminum and hafnium, for example, aluminum oxide, hafnium oxide, an oxide containing aluminum and hafnium (hafnium aluminate), or the like is preferably used. In the case where the insulator 522 is formed using such a material, the insulator 522 functions as a layer inhibiting release of oxygen from the metal oxide 531 and entry of e.g., impurities such as hydrogen into the metal oxide 531 from the periphery of the transistor 500.

Alternatively, aluminum oxide, bismuth oxide, germanium oxide, niobium oxide, silicon oxide, titanium oxide, tungsten oxide, yttrium oxide, or zirconium oxide may be added to these insulators, for example. Alternatively, these insulators may be subjected to nitriding treatment. Silicon oxide, silicon oxynitride, or silicon nitride may be stacked over any of the above insulators.

The insulator 522 may be a single layer or a stacked layer using an insulator containing what is called a high-k material such as aluminum oxide, hafnium oxide, tantalum oxide, zirconium oxide, lead zirconate titanate (PZT), strontium titanate (SrTiO3), or (Ba,Sr)TiO3 (BST), for example. With further miniaturization and higher integration of a transistor, a problem such as generation of leakage current may arise because of a thinned gate insulator, for example. When a high-k material is used for the insulator functioning as a gate insulator, a gate potential at the time of the operation of the transistor can be reduced while the physical thickness is maintained.

Note that the insulator 522 and the insulator 524 may each have a stacked-layer structure of two or more layers. In that case, without limitation to a stacked-layer structure formed of the same material, a stacked-layer structure formed of different materials may be employed for the insulator 522 and the insulator 524. For example, an insulator similar to the insulator 524 may be provided below the insulator 522.

The metal oxide 531 includes the metal oxide 531a and the metal oxide 531b over the metal oxide 531a. When the metal oxide 531 includes the metal oxide 531a under the metal oxide 531b, it is possible to inhibit diffusion of impurities into the metal oxide 531b from the components formed below the metal oxide 531a.

Note that the metal oxide 531 preferably has a stacked-layer structure of a plurality of oxide layers that differ in the atomic ratio of metal atoms. For example, in the case where the metal oxide 531 contains at least indium (In) and the element M, the proportion of the number of atoms of the element M contained in the metal oxide 531a to the number of atoms of all elements that constitute the metal oxide 531a is preferably higher than the proportion of the number of atoms of the element M contained in the metal oxide 531b to the number of atoms of all elements that constitute the metal oxide 531b. In addition, the atomic ratio of the element M to In in the metal oxide 531a is preferably greater than the atomic ratio of the element M to In in the metal oxide 531b.

The energy of the conduction band minimum of the metal oxide 531a is preferably higher than the energy of the conduction band minimum of the metal oxide 531b. In other words, the electron affinity of the metal oxide 531a is preferably smaller than the electron affinity of the metal oxide 531b.

Here, the energy level of the conduction band minimum gently changes at a junction portion between the metal oxide 531a and the metal oxide 531b. In other words, at junction portions between the metal oxide 531a and the metal oxide 531b, the energy level of the conduction band minimum continuously changes or the energy levels are continuously connected. This can be achieved by decreasing the density of defect states in a mixed layer formed at the interface between the metal oxide 531a and the metal oxide 531b.

Specifically, when the metal oxide 531a and the metal oxide 531b contain the same element (as a main component) in addition to oxygen, a mixed layer with a low density of defect states can be formed. For example, an In—Ga—Zn oxide, a Ga—Zn oxide, gallium oxide, or the like may be used as the metal oxide 531a, in the case where the metal oxide 531b is an In—Ga—Zn oxide.

Specifically, as the metal oxide 531a a metal oxide with In:Ga:Zn=1:3:4 [atomic ratio] or 1:1:0.5 [atomic ratio] can be used. As the metal oxide 531b, a metal oxide with In:Ga:Zn=1:1:1 [atomic ratio], 4:2:3 [atomic ratio] or 3:1:2 [atomic ratio] can be used.

In this case, the metal oxide 531b serves as a main carrier path. When the metal oxide 531a has the above structure, the density of defect states at the interface between the metal oxide 531a and the metal oxide 531b can be made low. Thus, the influence of interface scattering on carrier conduction is small, and the transistor 500 can have high on-state current and high frequency characteristics.

The conductor 542 (the conductor 542a and the conductor 542b) functioning as the source electrode and the drain electrode is provided over the metal oxide 531b. For the conductor 542, for example, it is preferable to use a metal element selected from aluminum, chromium, copper, silver, gold, platinum, tantalum, nickel, titanium, molybdenum, tungsten, hafnium, vanadium, niobium, manganese, magnesium, zirconium, beryllium, indium, ruthenium, iridium, strontium, and lanthanum; an alloy containing any of the above metal elements; an alloy containing a combination of the above metal elements; or the like. For example, it is preferable to use tantalum nitride, titanium nitride, tungsten, a nitride containing titanium and aluminum, a nitride containing tantalum and aluminum, ruthenium oxide, ruthenium nitride, an oxide containing strontium and ruthenium, an oxide containing lanthanum and nickel, or the like. Tantalum nitride, titanium nitride, a nitride containing titanium and aluminum, a nitride containing tantalum and aluminum, ruthenium oxide, ruthenium nitride, an oxide containing strontium and ruthenium, or an oxide containing lanthanum and nickel is preferable because they are oxidation-resistant conductive materials or materials that maintain their conductivity even after absorbing oxygen.

When the conductor 542 is provided in contact with the metal oxide 531, the oxygen concentration of the metal oxide 531 in the vicinity of the conductor 542 sometimes decreases. In addition, a metal compound layer that contains the metal contained in the conductor 542 and the component of the metal oxide 531 is sometimes formed in the metal oxide 531 in the vicinity of the conductor 542. In such cases, the carrier concentration of the region in the metal oxide 531 in the vicinity of the conductor 542 increases, and the region becomes a low-resistance region.

Here, the region between the conductor 542a and the conductor 542b is formed to overlap with the opening of the insulator 580. Accordingly, the conductor 560 can be placed in a self-aligned manner between the conductor 542a and the conductor 542b.

The insulator 550 functions as a gate insulator. The insulator 550 is preferably positioned in contact with the top surface of the metal oxide 531b. For the insulator 550, silicon oxide, silicon oxynitride, silicon nitride oxide, silicon nitride, silicon oxide to which fluorine is added, silicon oxide to which carbon is added, silicon oxide to which carbon and nitrogen are added, or porous silicon oxide can be used. In particular, silicon oxide or silicon oxynitride, which are thermally stable, are preferable.

As in the insulator 524, for example, the concentration of impurities such as water or hydrogen in the insulator 550 is preferably reduced. The thickness of the insulator 550 is preferably greater than or equal to 1 nm and less than or equal to 20 nm.

An insulator may be provided between the insulator 550 and the insulator 580, the insulator 554, the conductor 542, and the metal oxide 531b. For the insulator, aluminum oxide or hafnium oxide is preferably used, for example. Providing the insulator can inhibit release of oxygen from the metal oxide 531b, excessive supply of oxygen to the metal oxide 531b, oxidation of the conductor 542, and the like, for example.

A metal oxide may be provided between the insulator 550 and the conductor 560. The metal oxide preferably inhibits diffusion of oxygen from the insulator 550 to the conductor 560. Accordingly, oxidation of the conductor 560 due to oxygen in the insulator 550 can be inhibited.

The metal oxide functions as part of the gate insulator in some cases. Therefore, when silicon oxide, silicon oxynitride, or the like is used for the insulator 550, for example, a metal oxide that is a high-k material with a high relative permittivity is preferably used as the metal oxide. When the gate insulator has a stacked-layer structure of the insulator 550 and the metal oxide, the stacked-layer structure can be thermally stable and have a high relative permittivity. Accordingly, a gate potential applied during the operation of the transistor can be reduced while the physical thickness of the gate insulator is maintained. In addition, the equivalent oxide thickness (EOT) of the insulator functioning as the gate insulator can be reduced.

Specifically, for the insulator 550, for example, a metal oxide containing one kind or two or more kinds selected from hafnium, aluminum, gallium, yttrium, zirconium, tungsten, titanium, tantalum, nickel, germanium, magnesium, and the like can be used, for example. It is particularly preferable to use an insulator containing an oxide of one or both of aluminum and hafnium, e.g., aluminum oxide, hafnium oxide, an oxide containing aluminum and hafnium (hafnium aluminate), or the like.

Although the conductor 560 has a two-layer structure in FIG. 27, the conductor 560 may have a single-layer structure or a stacked-layer structure of three or more layers.

The conductor 560a is preferably formed using the aforementioned conductor having a function of inhibiting diffusion of impurities such as a hydrogen atom, a hydrogen molecule, a water molecule, a nitrogen atom, a nitrogen molecule, a nitrogen oxide molecule (e.g., $N_2O$, NO, and $NO_2$), and a copper atom. Alternatively, it is preferable to use a conductive material having a function of inhibiting diffusion of oxygen (e.g., at least one of an oxygen atom, an oxygen molecule, and the like).

When the conductor 560a has a function of inhibiting diffusion of oxygen, it is possible to inhibit a reduction in conductivity of the conductor 560b due to oxidation caused by oxygen contained in the insulator 550. As a conductive material having a function of inhibiting oxygen diffusion, for example, tantalum, tantalum nitride, ruthenium, ruthenium oxide, or the like is preferably used.

The conductor 560b is preferably formed using a conductive material containing tungsten, copper, or aluminum as its main component. The conductor 560 also functions as a wiring and thus is preferably formed using a conductor having high conductivity. For example, a conductive material containing tungsten, copper, or aluminum as its main component can be used. Moreover, the conductor 560b may have a stacked-layer structure, for example, a stacked-layer structure of the above conductive material and titanium or titanium nitride.

As illustrated in FIG. 27A and FIG. 27C, the side surface of the metal oxide 531 is covered with the conductor 560 in a region where the metal oxide 531b does not overlap with the conductor 542, that is, the channel formation region of the metal oxide 531. Accordingly, the electric field of the conductor 560 functioning as the first gate electrode is likely to act on the side surface of the metal oxide 531. Thus, the on-state current of the transistor 500 can be increased and the frequency characteristics can be improved.

The insulator 554, like the insulator 514 and the like, for example, preferably functions as a barrier insulating film that inhibits entry of e.g., impurities such as water or hydrogen into the transistor 500 from the insulator 580 side. The insulator 554 preferably has a lower hydrogen permeability than the insulator 524, for example. Furthermore, as illustrated in FIG. 27B and FIG. 27C, the insulator 554 is preferably in contact with the side surface of the insulator 550, the top and side surfaces of the conductor 542a, the top and side surfaces of the conductor 542b, the side surfaces of the metal oxide 531a, the metal oxide 531b, and the insulator 524. Such a structure can inhibit entry of hydrogen contained in the insulator 580 into the metal oxide 531 through the top surfaces or side surfaces of the conductor 542a, the conductor 542b, the metal oxide 531a, the metal oxide 531b, and the insulator 524.

Furthermore, it is preferable that the insulator 554 have a function of inhibiting diffusion of oxygen (e.g., at least one of an oxygen atom, an oxygen molecule, and the like) (it is preferable that the oxygen be unlikely to pass through the insulator 554). For example, the insulator 554 preferably has a lower oxygen permeability than the insulator 580 or the insulator 524.

The insulator 554 is preferably deposited by a sputtering method. When the insulator 554 is deposited by a sputtering method in an oxygen-containing atmosphere, oxygen can be added to the vicinity of a region of the insulator 524 that is in contact with the insulator 554. Thus, oxygen can be supplied from the region to the metal oxide 531 through the insulator 524. Here, with the insulator 554 having a function of inhibiting upward diffusion of oxygen, oxygen can be prevented from diffusing from the metal oxide 531 into the insulator 580. Moreover, with the insulator 522 having a function of inhibiting downward diffusion of oxygen, oxygen can be prevented from diffusing from the metal oxide 531 to the substrate side. In the above manner, oxygen is supplied to the channel formation region of the metal oxide 531. Accordingly, oxygen vacancies in the metal oxide 531 can be reduced, so that the transistor can be prevented from having normally-on characteristics.

As the insulator 554, an insulator containing an oxide of one or both of aluminum and hafnium is preferably deposited, for example. Note that as the insulator containing an oxide of one or both of aluminum and hafnium, aluminum oxide, hafnium oxide, an oxide containing aluminum and hafnium (hafnium aluminate), or the like is preferably used, for example.

The insulator 580 is provided over the insulator 524, the metal oxide 531, and the conductor 542 with the insulator 554 therebetween. The insulator 580 preferably includes silicon oxide, silicon oxynitride, silicon nitride oxide, silicon oxide to which fluorine is added, silicon oxide to which carbon is added, silicon oxide to which carbon and nitrogen are added, porous silicon oxide, or the like, for example. In particular, silicon oxide and silicon oxynitride, which are thermally stable, are preferable. In particular, materials such as silicon oxide, silicon oxynitride, and porous silicon oxide are preferably used, in which case a region containing oxygen to be released by heating can be easily formed.

The concentration of e.g., impurities such as water or hydrogen in the insulator 580 is preferably reduced. In addition, the top surface of the insulator 580 may be planarized.

Like the insulator 514 and the like, for example, the insulator 574 preferably functions as a barrier insulating film that inhibits entry of e.g., impurities such as water or hydrogen into the insulator 580 from above. As the insulator 574, for example, the insulator that can be used as the insulator 514, the insulator 554, or the like can be used.

The insulator 581 functioning as an interlayer film is preferably provided over the insulator 574. For example, as in the insulator 524 or the like, the concentration of e.g., impurities such as water or hydrogen in the insulator 581 is preferably reduced.

The conductor 545a and the conductor 545b are placed in openings formed in the insulator 581, the insulator 574, the insulator 580, and the insulator 554. The conductor 545a and the conductor 545b are provided to face each other with the conductor 560 therebetween. Note that the top surfaces of the conductor 545a and the conductor 545b may be on the same plane as the top surface of the insulator 581.

The insulator 541a is provided in contact with the inner wall of the opening in the insulator 581, the insulator 574, the insulator 580, and the insulator 554, and the first conductor of the conductor 545a is formed in contact with the side surface of the insulator 541a. The conductor 542a is positioned on at least part of the bottom portion of the opening, and the conductor 545a is in contact with the conductor 542a. Similarly, the insulator 541b is provided in contact with the inner wall of the opening in the insulator 581, the insulator 574, the insulator 580, and the insulator 554, and the first conductor of the conductor 545b is formed in contact with the side surface of the insulator 541b. The conductor 542b is positioned on at least part of the bottom portion of the opening, and the conductor 545b is in contact with the conductor 542b.

The conductor 545a and the conductor 545b are preferably formed using a conductive material containing tungsten, copper, or aluminum as its main component. The conductor 545a and the conductor 545b may have a stacked-layer structure.

In the case where the conductor 545 has a stacked-layer structure, the aforementioned conductor having a function of inhibiting diffusion of e.g., impurities such as water or hydrogen is preferably used as the conductor in contact with the conductor 542, the insulator 554, the insulator 580, the insulator 574, and the insulator 581. For example, tantalum, tantalum nitride, titanium, titanium nitride, ruthenium, ruthenium oxide, or the like is preferably used. The conductive material having a function of inhibiting diffusion of impurities such as water or hydrogen can be used as a single layer or stacked layers. The use of the conductive material can inhibit oxygen added to the insulator 580 from being absorbed by the conductor 545a and the conductor 545b. Moreover, impurities such as water or hydrogen, for example, can be inhibited from entering the metal oxide 531 through the conductor 545a and the conductor 545b from a layer above the insulator 581.

As the insulator 541a and the insulator 541b, for example, the insulator that can be used as the insulator 554 or the like can be used. Since the insulator 541a and the insulator 541b are provided in contact with the insulator 554, impurities such as water or hydrogen, for example, in the insulator 580 or the like can be inhibited from entering the metal oxide 531 through the conductor 545a and the conductor 545b. Furthermore, oxygen contained in the insulator 580 can be inhibited from being absorbed by the conductor 545a and the conductor 545b.

Although not illustrated, a conductor functioning as a wiring may be placed in contact with the top surface of the conductor 545a and the top surface of the conductor 545b. For the conductor functioning as a wiring, a conductive material containing tungsten, copper, or aluminum as its main component is preferably used. Furthermore, the conductor may have a stacked-layer structure and may be a stack of titanium or titanium nitride and the above conductive material, for example. Note that the conductor may be formed to be embedded in an opening provided in an insulator.

<Materials for Transistor>

Materials that can be used for the transistor will be described.

[Substrate]

As a substrate where the transistor 500 is formed, an insulator substrate, a semiconductor substrate, or a conductor substrate is used, for example. Examples of the insulator substrate include a glass substrate, a quartz substrate, a sapphire substrate, a stabilized zirconia substrate (e.g., an yttria-stabilized zirconia substrate), and a resin substrate. Examples of the semiconductor substrate include a semiconductor substrate of silicon, germanium, or the like and a compound semiconductor substrate of silicon carbide, silicon germanium, gallium arsenide, indium phosphide, zinc oxide, or gallium oxide. Another example is a semiconductor substrate in which an insulator region is included in the semiconductor substrate, e.g., an SOI (Silicon On Insulator) substrate. Examples of the conductor substrate include a graphite substrate, a metal substrate, an alloy substrate, and a conductive resin substrate. Other examples include a substrate including a metal nitride and a substrate including a metal oxide. Other examples include an insulator substrate provided with a conductor or a semiconductor, a semiconductor substrate provided with a conductor or an insulator, and a conductor substrate provided with a semiconductor or an insulator. Alternatively, these substrates provided with elements may be used. Examples of the elements provided for the substrates include a capacitor, a resistor, a switching element, a light-emitting element, and a memory element.

[Insulator]

Examples of an insulator include an oxide, a nitride, an oxynitride, a nitride oxide, a metal oxide, a metal oxynitride, and a metal nitride oxide, each of which has an insulating property.

With miniaturization and high integration of a transistor, for example, a problem such as generation of a leakage current may arise because of a thinner gate insulator. When a high-k material is used for the insulator functioning as a gate insulator, the voltage at the time of the operation of the transistor can be reduced while the physical thickness is maintained. By contrast, when a material with a low relative permittivity is used for the insulator functioning as an interlayer film, the parasitic capacitance generated between wirings can be reduced. Thus, a material is preferably selected depending on the function of an insulator.

Examples of the insulator having a high relative permittivity include gallium oxide, hafnium oxide, zirconium oxide, an oxide containing aluminum and hafnium, an oxynitride containing aluminum and hafnium, an oxide containing silicon and hafnium, an oxynitride containing silicon and hafnium, and a nitride containing silicon and hafnium.

Examples of the insulator having a low relative permittivity include silicon oxide, silicon oxynitride, silicon nitride oxide, silicon nitride, silicon oxide to which fluorine is added, silicon oxide to which carbon is added, silicon oxide to which carbon and nitrogen are added, porous silicon oxide, and a resin.

When a transistor using an oxide semiconductor is surrounded by insulators having a function of inhibiting passage of e.g., oxygen and impurities such as hydrogen (e.g., the insulator 514, the insulator 522, the insulator 554, and the insulator 574), the electrical characteristics of the transistor can be stable. An insulator having a function of inhibiting passage of e.g., oxygen and impurities such as hydrogen can be formed to have a single layer or a stacked layer including an insulator containing, for example, boron, carbon, nitrogen, oxygen, fluorine, magnesium, aluminum, silicon, phosphorus, chlorine, argon, gallium, germanium, yttrium, zirconium, lanthanum, neodymium, hafnium, or tantalum. Specifically, as the insulator having a function of inhibiting passage of e.g., oxygen and impurities such as hydrogen, a metal oxide such as aluminum oxide, magnesium oxide, gallium oxide, germanium oxide, yttrium oxide, zirconium oxide, lanthanum oxide, neodymium oxide, hafnium oxide, or tantalum oxide or a metal nitride such as aluminum nitride, aluminum titanium nitride, titanium nitride, silicon nitride oxide, or silicon nitride can be used.

An insulator functioning as a gate insulator is preferably an insulator including a region containing oxygen to be released by heating. For example, when a structure is employed in which silicon oxide or silicon oxynitride that includes a region containing oxygen to be released by heating is provided in contact with the metal oxide 531, oxygen vacancies included in the metal oxide 531 can be compensated for.

[Conductor]

For a conductor, for example, it is preferable to use a metal element selected from aluminum, chromium, copper, silver, gold, platinum, tantalum, nickel, titanium, molybdenum, tungsten, hafnium, vanadium, niobium, manganese, magnesium, zirconium, beryllium, indium, ruthenium, iridium, strontium, lanthanum, and the like; an alloy containing any of the above metal elements; an alloy containing a combination of the above metal elements; or the like. For example, it is preferable to use tantalum nitride, titanium nitride, tungsten, a nitride containing titanium and aluminum, a nitride containing tantalum and aluminum, ruthenium oxide, ruthenium nitride, an oxide containing strontium and ruthenium, an oxide containing lanthanum and nickel, or the like. Tantalum nitride, titanium nitride, a nitride containing titanium and aluminum, a nitride containing tantalum and aluminum, ruthenium oxide, ruthenium nitride, an oxide containing strontium and ruthenium, or an oxide containing lanthanum and nickel is preferable because they are oxidation-resistant conductive materials or materials that maintain their conductivity even after absorbing oxygen. A semiconductor having high electrical conductivity, typified by polycrystalline silicon containing an impurity element, e.g., phosphorus, or silicide such as nickel silicide may be used, for example.

A plurality of conductors formed using any of the above materials may be stacked. For example, a stacked-layer structure combining a material containing the above metal element and a conductive material containing oxygen may be employed. In addition, a stacked-layer structure combining a material containing the above metal element and a conductive material containing nitrogen may be employed. Furthermore, a stacked-layer structure combining a material containing the above metal element, a conductive material containing oxygen, and a conductive material containing nitrogen may be employed.

In the case where a metal oxide is used for the channel formation region of the transistor, the conductor functioning as the gate electrode preferably has a stacked-layer structure combining a material containing the above metal element and a conductive material containing oxygen. In that case, the conductive material containing oxygen is preferably provided on the channel formation region side. When the conductive material containing oxygen is provided on the channel formation region side, oxygen released from the conductive material is easily supplied to the channel formation region.

It is particularly preferable to use, for the conductor functioning as the gate electrode, a conductive material containing oxygen and a metal element contained in the metal oxide where the channel is formed. A conductive material containing the above metal element and nitrogen may be used. For example, a conductive material containing nitrogen, such as titanium nitride or tantalum nitride, may be used. Indium tin oxide, indium oxide containing tungsten oxide, indium zinc oxide containing tungsten oxide, indium oxide containing titanium oxide, indium tin oxide containing titanium oxide, indium zinc oxide, or indium tin oxide to which silicon is added may be used. Indium gallium zinc oxide containing nitrogen may be used. With the use of such a material, hydrogen contained in the metal oxide where the channel is formed can be captured in some cases. Alternatively, hydrogen entering from an external insulator or the like can be captured in some cases, for example.

At least part of this embodiment can be implemented in combination with the other embodiments described in this specification and the like as appropriate.

The structure described in this embodiment can be used in appropriate combination with any of the other structures described in the other embodiments.

Embodiment 5

In this embodiment, a metal oxide (hereinafter also referred to as an oxide semiconductor) that can be used for the OS transistor described in the above embodiment will be described.

The metal oxide used for the OS transistor preferably contains at least indium or zinc, and further preferably contains indium and zinc. A metal oxide preferably contains indium, M (M is one or more kinds selected from gallium, aluminum, yttrium, tin, silicon, boron, copper, vanadium, beryllium, titanium, iron, nickel, germanium, zirconium, molybdenum, lanthanum, cerium, neodymium, hafnium, tantalum, tungsten, magnesium, and cobalt), and zinc, for example. In particular, M is preferably one or more kinds selected from gallium, aluminum, yttrium, and tin, and is further preferably gallium.

For example, the metal oxide can be formed by a sputtering method, a chemical vapor deposition (CVD) method such as a metal organic chemical vapor deposition (MOCVD) method, an atomic layer deposition (ALD) method, or the like.

Hereinafter, an oxide containing indium (In), gallium (Ga), and zinc (Zn) is described as an example of the metal oxide. Note that an oxide containing indium (In), gallium (Ga), and zinc (Zn) may be referred to as an In—Ga—Zn oxide.

<Classification of Crystal Structure>

Amorphous (including completely amorphous), CAAC (c-axis-aligned crystalline), nc (nanocrystalline), CAC (cloud-aligned composite), single crystal, and polycrystalline (poly crystal) structures, and the like can be given as examples of a crystal structure of an oxide semiconductor.

Note that a crystal structure of a film or a substrate can be evaluated with an X-ray diffraction (XRD) spectrum. For example, evaluation is possible using an XRD spectrum that is obtained by GIXD (Grazing-Incidence XRD) measurement. Note that a GIXD method is also referred to as a thin film method or a Seemann-Bohlin method. Hereinafter, an XRD spectrum obtained from GIXD measurement is simply referred to as an XRD spectrum in some cases.

For example, the XRD spectrum of a quartz glass substrate shows a peak with a substantially bilaterally symmetrical shape. On the other hand, the peak of the XRD spectrum of the In—Ga—Zn oxide film having a crystal structure has a bilaterally asymmetrical shape. The bilaterally asymmetrical peak of the XRD spectrum clearly shows the existence of crystals in the film or the substrate. In other words, the crystal structure of the film or the substrate cannot be regarded as "amorphous" unless it has a bilaterally symmetrical peak in the XRD spectrum.

A crystal structure of a film or a substrate can also be evaluated with a diffraction pattern obtained by a nanobeam electron diffraction (NBED) method (such a pattern is also referred to as a nanobeam electron diffraction pattern). For example, a halo pattern is observed in the diffraction pattern of the quartz glass substrate, which indicates that the quartz glass substrate is in an amorphous state. Furthermore, not a halo pattern but a spot-like pattern is observed in the diffraction pattern of the In—Ga—Zn oxide film deposited at room temperature. Thus, the In—Ga—Zn oxide film deposited at room temperature is in an intermediate state, which is neither a single crystal nor polycrystal nor an amorphous state. Therefore, it is difficult to conclude that In—Ga—Zn oxide film is in an amorphous state.

[Structure of Oxide Semiconductor]

Note that oxide semiconductors might be classified in a manner different from the above-described one when classified in terms of the structure. Oxide semiconductors are classified into a single crystal oxide semiconductor and a non-single-crystal oxide semiconductor, for example. Examples of the non-single-crystal oxide semiconductor include the CAAC-OS and the nc-OS. Other examples of the non-single-crystal oxide semiconductors include a polycrystalline oxide semiconductor, an amorphous-like oxide semiconductor (a-like OS), and an amorphous oxide semiconductor.

Here, the CAAC-OS, the nc-OS, and the a-like OS are described in detail.

[CAAC-OS]

The CAAC-OS is an oxide semiconductor that has a plurality of crystal regions each of which has c-axis alignment in a particular direction. Note that the particular direction refers to the thickness direction of a CAAC-OS film, the normal direction of the surface where the CAAC-OS film is formed, or the normal direction of the surface of the CAAC-OS film. The crystal region refers to a region having a periodic atomic arrangement. Note that when an atomic arrangement is regarded as a lattice arrangement, the crystal region also refers to a region with a uniform lattice arrangement. The CAAC-OS has a region where a plurality of crystal regions are connected in the a-b plane direction, and the region has distortion in some cases. Note that distortion refers to a portion where the orientation of a lattice arrangement changes between a region with a uniform lattice arrangement and another region with a uniform lattice arrangement in a region where a plurality of crystal regions are connected. That is, the CAAC-OS is an oxide semiconductor having c-axis alignment and having no clear alignment in the a-b plane direction.

Note that each of the plurality of crystal regions described above is formed of one or more minute crystals (crystals each of which has a maximum diameter of less than 10 nm). In the case where the crystal region is formed of one minute crystal, the maximum diameter of the crystal region is less than 10 nm. In the case where the crystal region is formed of a plurality of minute crystals, the maximum diameter of the crystal region may be approximately several tens of nanometers.

In the case of an In—Ga—Zn oxide, the CAAC-OS tends to have a layered crystal structure (also referred to as a layered structure) in which a layer containing indium (In) and oxygen (hereinafter, an In layer) and a layer containing gallium (Ga), zinc (Zn), and oxygen (hereinafter, a (Ga,Zn) layer) are stacked. Note that indium and gallium can be replaced with each other. Therefore, indium may be contained in the (Ga,Zn) layer. In addition, gallium may be contained in the In layer. Note that zinc may be contained in the In layer. Such a layered structure is observed as a lattice image in a high-resolution TEM (Transmission Electron Microscope) image, for example.

When the CAAC-OS film is subjected to structural analysis by out-of-plane XRD measurement with an XRD apparatus using $\theta/2\theta$ scanning, for example, a peak indicating c-axis alignment is detected at $2\theta$ of 31° or around 31°. Note that the position of the peak indicating c-axis alignment (the value of $2\theta$) may change depending on the kind, composition, or the like of the metal element contained in the CAAC-OS, for example.

For example, a plurality of bright spots are observed in the electron diffraction pattern of the CAAC-OS film. Note that one spot and another spot are observed point-symmetrically with a spot of an incident electron beam passing through a sample (also referred to as a direct spot) as a symmetric center.

When the crystal region is observed from the particular direction described above, a lattice arrangement in the crystal region is basically a hexagonal lattice arrangement; however, a unit lattice is not always a regular hexagon and is a non-regular hexagon in some cases. For example, a pentagonal lattice arrangement, a heptagonal lattice arrangement, and the like are included in the distortion in some cases. Note that it is difficult to observe a clear grain boundary even in the vicinity of distortion in the CAAC-OS. That is, formation of a crystal grain boundary is inhibited by the distortion of lattice arrangement. This is probably because the CAAC-OS can tolerate distortion owing to a low density of arrangement of oxygen atoms in the a-b plane direction, an interatomic bond distance changed by substitution of a metal atom, and the like.

A crystal structure where a clear grain boundary is observed is what is called polycrystal. It is highly probable that the crystal grain boundary becomes a recombination center and traps carriers and thus decreases the on-state current and field-effect mobility of a transistor, for example. Thus, the CAAC-OS in which no clear crystal grain boundary is observed is one of crystalline oxides having a crystal structure suitable for a semiconductor layer of a transistor. Note that Zn is preferably contained to form the CAAC-OS. For example, an In—Zn oxide and an In—Ga—Zn oxide are suitable because they can inhibit generation of a crystal grain boundary as compared with an In oxide.

The CAAC-OS is an oxide semiconductor with high crystallinity in which no clear crystal grain boundary is observed. Thus, in the CAAC-OS, it can be said that a reduction in electron mobility due to the crystal grain boundary is unlikely to occur. Moreover, since the crystallinity of an oxide semiconductor might be decreased by entry of impurities, formation of defects, or the like, the CAAC-OS can be regarded as an oxide semiconductor that has small amounts of impurities and defects (e.g., oxygen vacancies). Thus, an oxide semiconductor including the CAAC-OS is physically stable. Therefore, the oxide semiconductor including the CAAC-OS is resistant to heat and has high reliability. In addition, the CAAC-OS is stable with respect to high temperatures in the manufacturing process (what is called thermal budget). Accordingly, the use of the CAAC-OS for the OS transistor can extend the degree of freedom of the manufacturing process.

[nc-OS]

In the nc-OS, a microscopic region (e.g., a region with a size greater than or equal to 1 nm and less than or equal to 10 nm, in particular, a region with a size greater than or equal to 1 nm and less than or equal to 3 nm) has a periodic atomic arrangement. In other words, the nc-OS includes a minute crystal. Note that the size of the minute crystal is, for example, greater than or equal to 1 nm and less than or equal to 10 nm, particularly greater than or equal to 1 nm and less than or equal to 3 nm; thus, the minute crystal is also referred to as a nanocrystal. Furthermore, there is no regularity of crystal orientation between different nanocrystals in the nc-OS. Thus, the orientation in the whole film is not observed. Accordingly, the nc-OS cannot be distinguished from an a-like OS or an amorphous oxide semiconductor depending on the analysis method. For example, when an nc-OS film is subjected to structural analysis by out-of-plane XRD measurement with an XRD apparatus using θ/2θ scanning, a peak indicating crystallinity is not detected. Furthermore, a diffraction pattern like a halo pattern is observed when the nc-OS film is subjected to electron diffraction (also referred to as selected-area electron diffraction) using an electron beam with a probe diameter greater than the diameter of a nanocrystal (e.g., greater than or equal to 50 nm). Meanwhile, in some cases, a plurality of spots in a ring-like region with a direct spot as the center are observed in the obtained electron diffraction pattern when the nc-OS film is subjected to electron diffraction (also referred to as nanobeam electron diffraction) using an electron beam with a probe diameter nearly equal to or smaller than the diameter of a nanocrystal (e.g., greater than or equal to 1 nm and smaller than or equal to 30 nm).

[a-like OS]

The a-like OS is an oxide semiconductor having a structure between those of the nc-OS and the amorphous oxide semiconductor. The a-like OS has a void or a low-density region. That is, the a-like OS has lower crystallinity than the nc-OS and the CAAC-OS. Moreover, the a-like OS has a higher hydrogen concentration in the film than the nc-OS and the CAAC-OS.

[Structure of Oxide Semiconductor]

Next, the above-described CAC-OS will be described in detail. Note that the CAC-OS relates to the material composition.

[CAC-OS]

The CAC-OS refers to one composition of a material in which elements included in a metal oxide are unevenly distributed with a size greater than or equal to 0.5 nm and less than or equal to 10 nm, preferably greater than or equal to 1 nm and less than or equal to 3 nm, or a similar size, for example. Note that a state in which one or more metal elements are unevenly distributed and regions including the metal element(s) are mixed with a size greater than or equal to 0.5 nm and less than or equal to 10 nm, preferably greater than or equal to 1 nm and less than or equal to 3 nm, or a similar size in a metal oxide is hereinafter referred to as a mosaic pattern or a patch-like pattern.

In addition, the CAC-OS has a composition in which materials are separated into a first region and a second region to form a mosaic pattern, and the first regions are distributed in the film (this composition is hereinafter also referred to as a cloud-like composition). That is, the CAC-OS is a composite metal oxide having a composition in which the first regions and the second regions are mixed.

Here, the atomic ratios of In, Ga, and Zn to the metal elements contained in the CAC-OS in an In—Ga—Zn oxide are denoted with [In], [Ga], and [Zn], respectively. For example, the first region in the CAC-OS in the In—Ga—Zn oxide has [In] higher than [In] in the composition of the CAC-OS film. Moreover, the second region has [Ga] higher than [Ga] in the composition of the CAC-OS film. For example, the first region has higher [In] and lower [Ga] than the second region. Moreover, the second region has higher [Ga] and lower [In] than the first region.

Specifically, the first region includes indium oxide, indium zinc oxide, or the like as its main component, for example. The second region includes gallium oxide, gallium zinc oxide, or the like as its main component, for example. That is, the first region can be rephrased as a region containing In as its main component. The second region can be rephrased as a region containing Ga as its main component.

Note that in some cases, it is difficult to observe a clear boundary between the first region and the second region.

In addition, in a material composition of a CAC-OS in an In—Ga—Zn oxide that contains In, Ga, Zn, and O, there are regions containing Ga as a main component in part of the CAC-OS and regions containing In as a main component in another part of the CAC-OS. These regions each form a mosaic pattern and are randomly present. Thus, it is suggested that the CAC-OS has a structure where metal elements are unevenly distributed.

The CAC-OS can be formed by a sputtering method under a condition where a substrate is not heated intentionally, for example. Furthermore, in the case where the CAC-OS is formed by a sputtering method, any one or more selected from an inert gas (typically, argon), an oxygen gas, and a nitrogen gas is used as a deposition gas. The proportion of the flow rate of an oxygen gas in the total flow rate of the deposition gas during deposition is preferably as low as possible. For example, the proportion of the flow rate of an oxygen gas in the total flow rate of the deposition gas during deposition is preferably higher than or equal to 0% and lower than 30%, further preferably higher than or equal to 0% and lower than or equal to 10%.

For example, energy dispersive X-ray spectroscopy (EDX) is used to obtain EDX mapping, and according to the EDX mapping, the CAC-OS in the In—Ga—Zn oxide has a structure where the region containing In as its main component (the first region) and the region containing Ga as its main component (the second region) are unevenly distributed and mixed.

Here, the first region is a region having higher conductivity than the second region. In other words, when carriers flow through the first region, the conductivity of a metal oxide is exhibited. Accordingly, when the first regions are distributed in a metal oxide like a cloud, high field-effect mobility (μ) can be achieved.

The second region is a region having a higher insulating property than the first region. In other words, when the second regions are distributed in a metal oxide, leakage current can be inhibited.

Thus, in the case where the CAC-OS is used for a transistor, a switching function (on state/off state switching function) can be given to the CAC-OS owing to the complementary action of the conductivity derived from the first region and the insulating property derived from the second region. That is, the CAC-OS has a conducting function in part of the material and has an insulating function in another part of the material; as a whole, the CAC-OS has a function of a semiconductor. Separation of the conducting function and the insulating function can maximize each function. Accordingly, when a CAC-OS is used for a transistor, high on-state current ($I_{on}$), a high field-effect mobility (μ), and favorable switching operation can be achieved.

A transistor using the CAC-OS has high reliability. Thus, the CAC-OS is most suitable for a variety of semiconductor devices such as a display apparatus.

An oxide semiconductor has various structures with different properties. Two or more kinds among an amorphous oxide semiconductor, a polycrystalline oxide semiconductor, an a-like OS, a CAC-OS, an nc-OS, and a CAAC-OS may be included in an oxide semiconductor of one embodiment of the present invention.

<Transistor Including Oxide Semiconductor>

Next, the case where the above oxide semiconductor is used for a transistor will be described.

When the above oxide semiconductor is used for a transistor, a transistor with high field-effect mobility can be achieved. In addition, a transistor with high reliability can be achieved.

It is particularly preferable to use an oxide containing indium (In), gallium (Ga), and zinc (Zn) (also referred to as "IGZO") for the semiconductor layer where a channel is formed. Alternatively, an oxide containing indium (In), aluminum (Al), and zinc (Zn) (also referred to as "IAZO") may be used for the semiconductor layer. Further alternatively, an oxide containing indium (In), aluminum (Al), gallium (Ga), and zinc (Zn) (also referred to as "IAGZO") may be used for the semiconductor layer.

An oxide semiconductor having a low carrier concentration is preferably used for a transistor. For example, the carrier concentration of an oxide semiconductor is lower than or equal to $1\times10^{17}$ cm$^{-3}$, preferably lower than or equal to $1\times10^{15}$ cm$^{-3}$, further preferably lower than or equal to $1\times10^{13}$ cm$^{-3}$, still further preferably lower than or equal to $1\times10^{11}$ cm$^{-3}$, yet further preferably lower than $1\times10^{10}$ cm$^{-3}$, and higher than or equal to $1\times10^{-9}$ cm$^{-3}$. In order to reduce the carrier concentration in an oxide semiconductor, the impurity concentration in the oxide semiconductor is reduced so that the density of defect states in the oxide semiconductor can be reduced. In this specification and the like, a state with a low impurity concentration and a low density of defect states is referred to as a highly purified intrinsic or substantially highly purified intrinsic state. Note that an oxide semiconductor having a low carrier concentration may be referred to as a highly purified intrinsic or substantially highly purified intrinsic oxide semiconductor.

A highly purified intrinsic or substantially highly purified intrinsic oxide semiconductor has a low density of defect states and thus has a low density of trap states in some cases.

Charge trapped by the trap states in the oxide semiconductor takes a long time to disappear and might behave like fixed charge. Thus, a transistor whose channel formation region is formed in an oxide semiconductor with a high density of trap states has unstable electrical characteristics in some cases.

Accordingly, in order to obtain stable electrical characteristics of a transistor, reducing the impurity concentration in an oxide semiconductor is effective. In order to reduce the impurity concentration in the oxide semiconductor, it is preferable that the impurity concentration in an adjacent film be also reduced. Examples of impurities include hydrogen, nitrogen, an alkali metal, an alkaline earth metal, iron, nickel, and silicon. Note that an impurity in an oxide semiconductor refers to, for example, elements other than the main components of the oxide semiconductor. For example, an element with a concentration lower than 0.1 atomic % can be regarded as an impurity.

<Impurity>

Here, the influence of each impurity in the oxide semiconductor will be described.

When silicon or carbon, which is one of Group 14 elements, is contained in the oxide semiconductor, defect states are formed in the oxide semiconductor. Thus, the concentration of silicon or carbon (the concentration obtained by secondary ion mass spectrometry (SIMS)) in the semiconductor layer is set lower than or equal to $2\times10^{18}$ atoms/cm$^3$, preferably lower than or equal to $2\times10^{17}$ atoms/cm$^3$.

When the oxide semiconductor contains an alkali metal or an alkaline earth metal, defect states are formed and carriers are generated in some cases. Accordingly, a transistor including an oxide semiconductor that contains an alkali metal or an alkaline earth metal tends to have normally-on characteristics. Thus, the concentration of an alkali metal or an alkaline earth metal in the oxide semiconductor, which is obtained by SIMS, is lower than or equal to $1\times10^{18}$ atoms/cm$^3$, preferably lower than or equal to $2\times10^{16}$ atoms/cm$^3$.

When the oxide semiconductor contains nitrogen, the oxide semiconductor easily becomes n-type by generation of electrons serving as carriers and an increase in carrier concentration. As a result, a transistor using an oxide semiconductor containing nitrogen as a semiconductor is likely to have normally-on characteristics. When nitrogen is contained in the oxide semiconductor, a trap state is sometimes formed. This might make the electrical characteristics of the transistor unstable. Therefore, the concentration of nitrogen in the oxide semiconductor, which is obtained by SIMS, is set lower than $5\times10^{19}$ atoms/cm$^3$, preferably lower than or equal to $5\times10^{18}$ atoms/cm$^3$, further preferably lower than or equal to $1\times10^{18}$ atoms/cm$^3$, still further preferably lower than or equal to $5\times10^{17}$ atoms/cm$^3$.

Hydrogen contained in the oxide semiconductor reacts with oxygen bonded to a metal atom to be water, and thus forms an oxygen vacancy in some cases. Entry of hydrogen into the oxygen vacancy generates an electron serving as a carrier in some cases. Furthermore, bonding of part of hydrogen to oxygen bonded to a metal atom causes generation of an electron serving as a carrier in some cases. Thus, a transistor using an oxide semiconductor containing hydrogen is likely to have normally-on characteristics. For this reason, hydrogen in the oxide semiconductor is preferably reduced as much as possible. Specifically, the concentration of hydrogen in the oxide semiconductor, which is measured by SIMS, is set lower than $1\times10^{20}$ atoms/cm$^3$, preferably lower than $1\times10^{19}$ atoms/cm$^3$, further preferably lower than $5\times10^{18}$ atoms/cm$^3$, still further preferably lower than $1\times10^{18}$ atoms/cm$^3$.

When an oxide semiconductor with sufficiently reduced impurities is used for the channel formation region of the transistor, stable electrical characteristics can be given.

The structure described in this embodiment can be used in appropriate combination with any of the other structures described in the other embodiments.

REFERENCE NUMERALS

10: display apparatus, 11: light source, 12: optical system, 13: optical device, 14: housing, 14a: opening, 14b: opening, 20: eyeball, 21: mirror, 22: mirror, 23: lens, 24: mirror, 25: lens, 31: light, 32: light, 33: light, 50: sensor portion, 51: sensor portion, 52: sensor region, 60: display region, 61: light-emitting element, 61R: light-emitting element, 61G: light-emitting element, 61B: light-emitting element, 61IR: light-emitting element, 62: light-receiving element, 70: display apparatus, 80: pixel, 95: display region, 100: electronic device, 101: housing, 103: wearing portion, 104: battery, 105: voltage generation portion, 106: control portion, 107: communication portion, 108: antenna, 121: earphone, 122: acoustic device, 130: control portion, 131: bus line, 140: arithmetic portion, 141: neural network, 150: memory portion, 160: input/output portion, 170: gaze sensing portion, 180: display apparatus, 188: eyeball, 190: light-emitting element, 191: light-receiving element, 230: pixel, 232: peripheral circuit region, 233: peripheral circuit region, 234: functional circuit region, 236: wiring, 237: wiring, 240: capacitor, 290: pixel, 292: peripheral circuit region, 293: peripheral circuit region, 296: wiring, 297: wiring, 310: transistor, 320: transistor, 370R: light-emitting element, 370G: light-emitting element, 370B: light-emitting element, 370IR: light-emitting element, 370PD: light-receiving element, 380A: display apparatus, 431: pixel circuit, 432: light-emitting element, 433: capacitor, 434: transistor, 435: wiring, 436: transistor, 437: wiring, 438: transistor, 491: pixel circuit, 492: light-receiving element, 493: transistor, 494: transistor, 495: wiring, 496: transistor, 497: wiring, 498: transistor, 499: wiring, 500: transistor, DL_n: signal line, GL_m: scan line, RS_p: row selection line, SE_p: row selection line, TX_p: row selection line, VL_a: potential supply line, VL_b: potential supply line, VL_c: potential supply line, VL_d: potential supply line, VL_e: potential supply line, WX_q: signal line, G: gaze point, S1: region, S2: region, S3: region, S210: step, S211: step, S212: step, S213: step, S214: step

The invention claimed is:

1. An optical device comprising a display apparatus and an optical system,
wherein the display apparatus comprises a display region and a sensor region,
wherein the optical system comprises a first mirror and a second mirror,
wherein the first mirror comprises a first surface and a second surface,
wherein the display region is configured to emit first light,
wherein the first mirror is provided on an optical path of the first light and is configured to transmit the first light incident on the first surface to the second surface and to reflect second light incident on the second surface,
wherein the second mirror is provided on an optical path of the second light and is configured to reflect the second light,
wherein the sensor region is configured to detect the second light via the first mirror and the second mirror, and
wherein the second mirror and the sensor region overlap with each other when seen from a user's eye, and the second mirror and the display region do not overlap with each other when seen from the user's eye.

2. The optical device according to claim 1,
wherein the optical system comprises a light source,
wherein the light source is configured to emit third light, and
wherein the second light is light reflected by an object irradiated with the third light.

3. The optical device according to claim 1,
wherein the display apparatus comprises a light source,
wherein the light source is configured to emit third light, and
wherein the second light is light reflected by an object irradiated with the third light.

4. The optical device according to claim 2, wherein the third light is infrared light.

5. The optical device according to claim 1, wherein the sensor region is provided to overlap with the display region.

6. The optical device according to claim 1,
wherein the optical system comprises a first lens, and
wherein the first lens is provided on the optical path of the first light and is configured to control the optical path of the first light.

7. The optical device according to claim 1,
wherein the display apparatus comprises a second lens, and
wherein the second lens is provided between the second mirror and the sensor region and is configured to control the optical path of the second light.

8. The optical device according to claim 1,
wherein the display apparatus comprises a pinhole, and
wherein the pinhole is provided between the second mirror and the sensor region and is configured to control the optical path of the second light.

9. The optical device according to claim 1,
wherein the display apparatus comprises a gaze sensing portion, and
wherein the gaze sensing portion is configured to sense a user's gaze with the use of imaging data obtained in the sensor region.

* * * * *